United States Patent
Yamato

(10) Patent No.: US 10,112,533 B2
(45) Date of Patent: Oct. 30, 2018

(54) VEHICLE DECORATIVE COMPONENT AND VEHICLE DECORATIVE COMPONENT INSTALLING METHOD

(71) Applicant: TS TECH CO., LTD., Asaka-shi, Saitama (JP)

(72) Inventor: Noriyuki Yamato, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 191 days.

(21) Appl. No.: 14/361,532

(22) PCT Filed: Nov. 29, 2012

(86) PCT No.: PCT/JP2012/080981
§ 371 (c)(1),
(2) Date: May 29, 2014

(87) PCT Pub. No.: WO2013/081070
PCT Pub. Date: Jun. 6, 2013

(65) Prior Publication Data
US 2014/0355285 A1   Dec. 4, 2014

(30) Foreign Application Priority Data

Nov. 30, 2011   (JP) .................................. 2011-262394

(51) Int. Cl.
*B60Q 3/54*   (2017.01)
*B60R 13/02*   (2006.01)
(Continued)

(52) U.S. Cl.
CPC .............. *B60Q 3/54* (2017.02); *B60Q 3/217* (2017.02); *B60Q 3/64* (2017.02); *B60R 13/0243* (2013.01);
(Continued)

(58) Field of Classification Search
CPC .... B60Q 3/0203; B60Q 3/004; B60Q 3/0216; B60Q 2500/10; B60R 13/0243; G02B 6/0088; G02B 6/0095
See application file for complete search history.

(56) References Cited

U.S. PATENT DOCUMENTS

| | | |
|---|---|---|
| 5,184,888 A | 2/1993 | Sakuma et al. |
| 6,160,475 A | 12/2000 | Hornung et al. |

(Continued)

FOREIGN PATENT DOCUMENTS

| | | |
|---|---|---|
| DE | 103 35 877 A1 | 3/2005 |
| EP | 1 344 688 A2 | 9/2003 |

(Continued)

OTHER PUBLICATIONS

Machine Translation of Yazaki (JP 2004-090897), 2004.*
(Continued)

*Primary Examiner* — Sharon Payne
(74) *Attorney, Agent, or Firm* — Drinker Biddle & Reath LLP

(57) ABSTRACT

A vehicle decorative component functions as a decorating illumination while harmonizing with peripheral members. In a light emitting ornament having a light emitting region that emits light and a non-light emitting region adjacent to the light emitting region, the light emitting region includes an irradiation body including a lamp and a light guiding body, an ornament base material through which the light emitted from the irradiation body is transmitted at a front position of the irradiation body, and a decorative film formed at a front position of the ornament base material and exposed on the vehicle interior side, the decorative film through which the light transmitted through the ornament base material is capable of being transmitted, and a decoration style of a surface of the decorative film exposed on the vehicle interior (Continued)

side is the same as a decoration style of a surface of the non-light emitting region.

15 Claims, 38 Drawing Sheets

(51) Int. Cl.
    *F21V 8/00*           (2006.01)
    *B60Q 3/64*         (2017.01)
    *B60Q 3/217*       (2017.01)

(52) U.S. Cl.
    CPC ........ *G02B 6/0088* (2013.01); *B60Q 2500/10* (2013.01); *G02B 6/0095* (2013.01)

(56) References Cited

U.S. PATENT DOCUMENTS

| | | | |
|---|---|---|---|
| 6,464,381 B2 * | 10/2002 | Anderson, Jr. | B60Q 3/0283 362/153 |
| 2007/0177397 A1 * | 8/2007 | Sakakibara | B60Q 3/004 362/488 |
| 2007/0258255 A1 * | 11/2007 | Kessler | A47L 23/266 362/487 |
| 2008/0138561 A1 * | 6/2008 | Umezawa | B60Q 1/34 428/61 |
| 2009/0080208 A1 | 3/2009 | Droste et al. | |
| 2010/0302804 A1 | 12/2010 | Inagaki et al. | |
| 2011/0157908 A1 | 6/2011 | Iwai et al. | |
| 2011/0228553 A1 | 9/2011 | Igoe et al. | |

FOREIGN PATENT DOCUMENTS

| | | |
|---|---|---|
| JP | H02-068224 U | 5/1990 |
| JP | 2004-090897 A | 3/2004 |
| JP | 2005-205669 A | 8/2005 |
| JP | 2005-280657 A | 10/2005 |
| JP | 2005-319585 A | 11/2005 |
| JP | 2007-160984 A | 6/2007 |
| JP | 2007-196919 A | 8/2007 |
| JP | 2008-001130 A | 1/2008 |
| JP | 2009-018747 A | 1/2009 |

OTHER PUBLICATIONS

Machine Translation of Sekisui (2009-018747), 2009.*
Supplementary Partial European Search Report issued for EP 12852545.8 (dated Jul. 3, 2015).
Extended European Search Report issued for related application EP 12852545.8, dated Nov. 17, 2015, 16 pages.
Office Action issued in related application JP 2013-547219, dated Apr. 4, 2017, with machine generated English language translation, 10 pages.
Office Action issued in related application JP 2017-193742, dated Jul. 3, 2018, with machine generated English language translation, 6 pages.

* cited by examiner

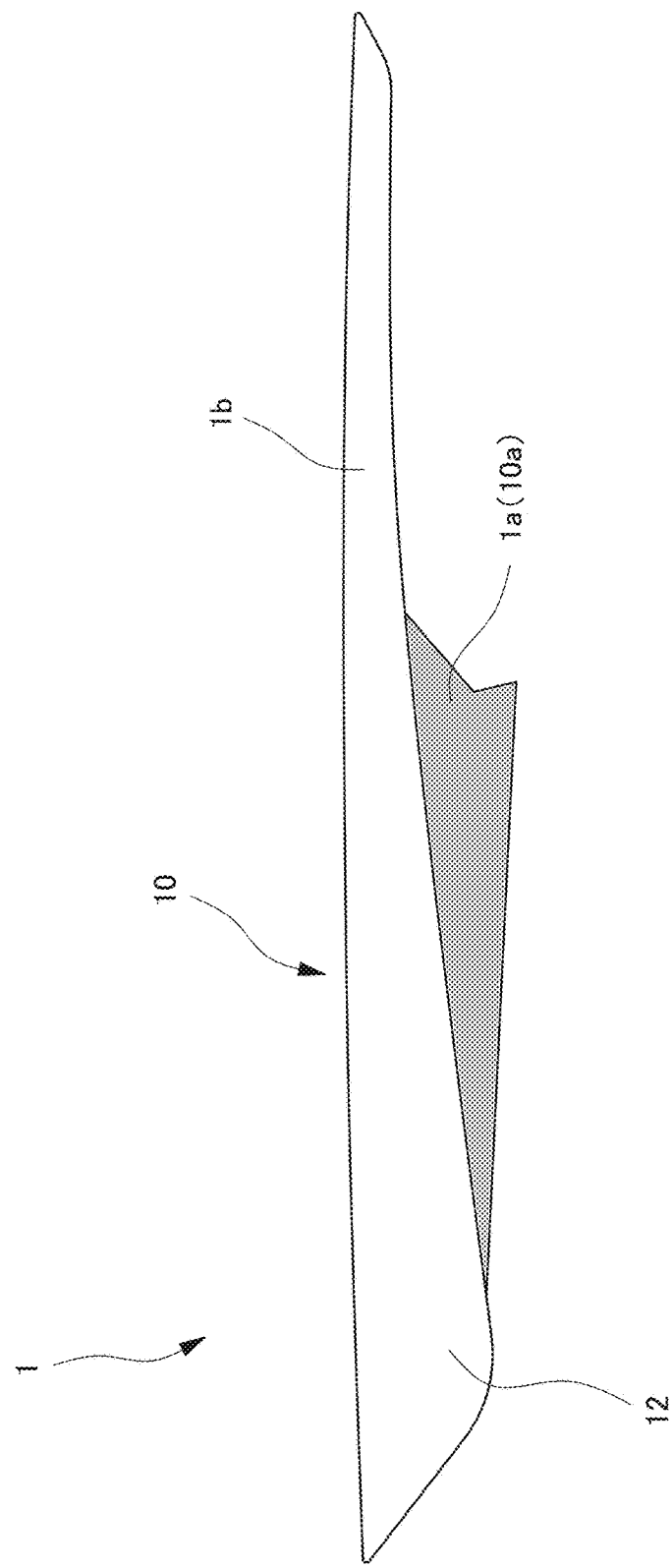

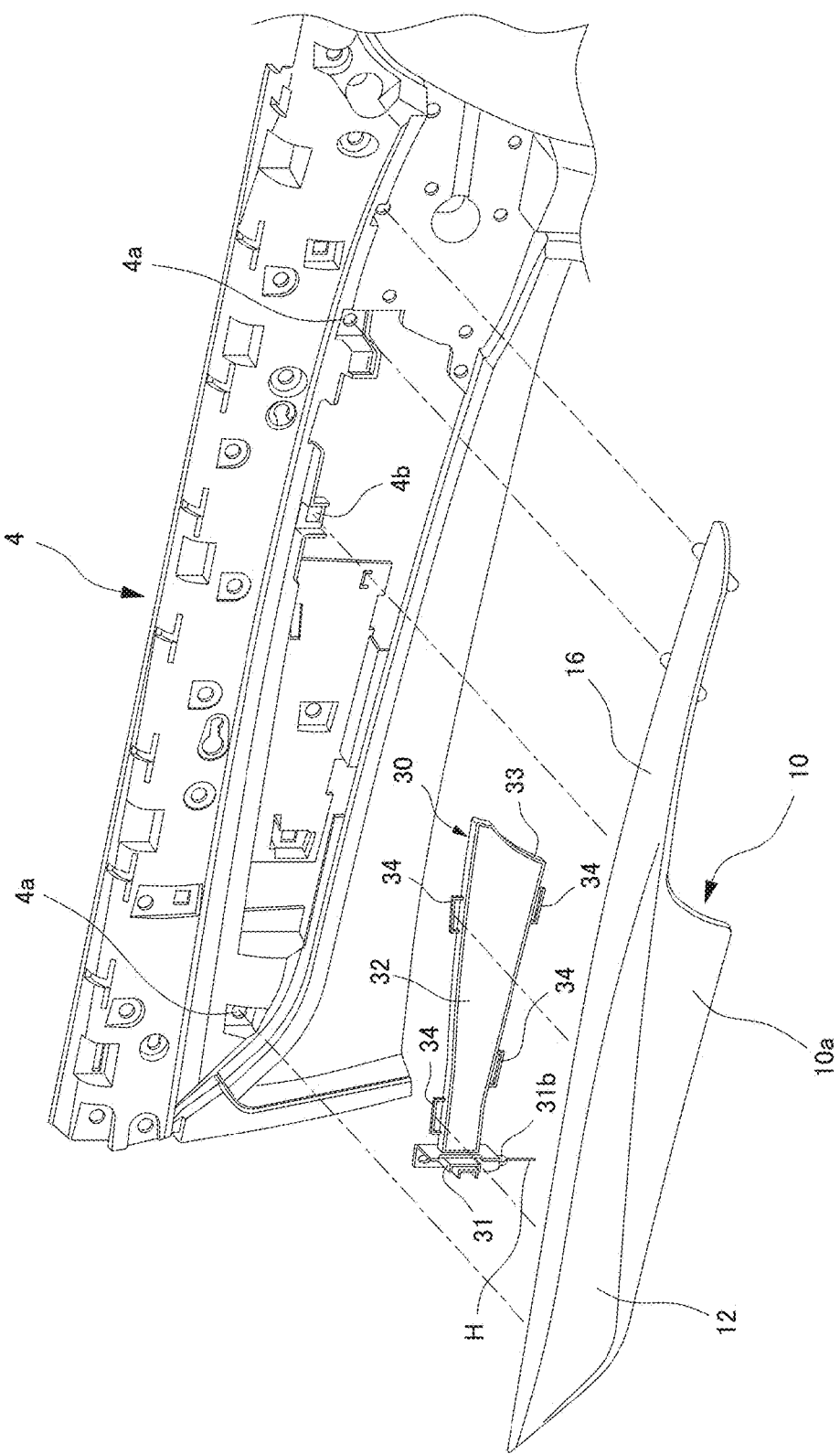

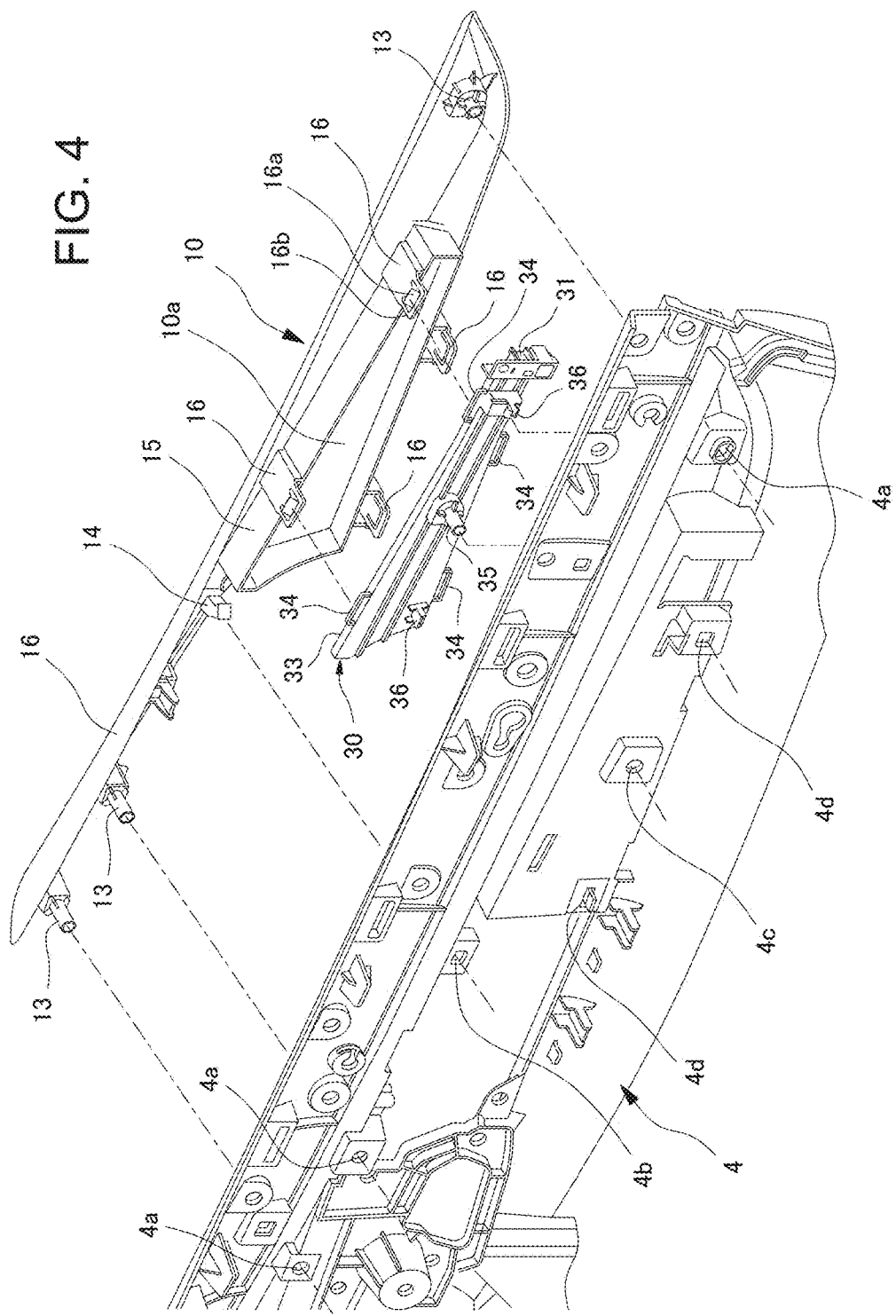

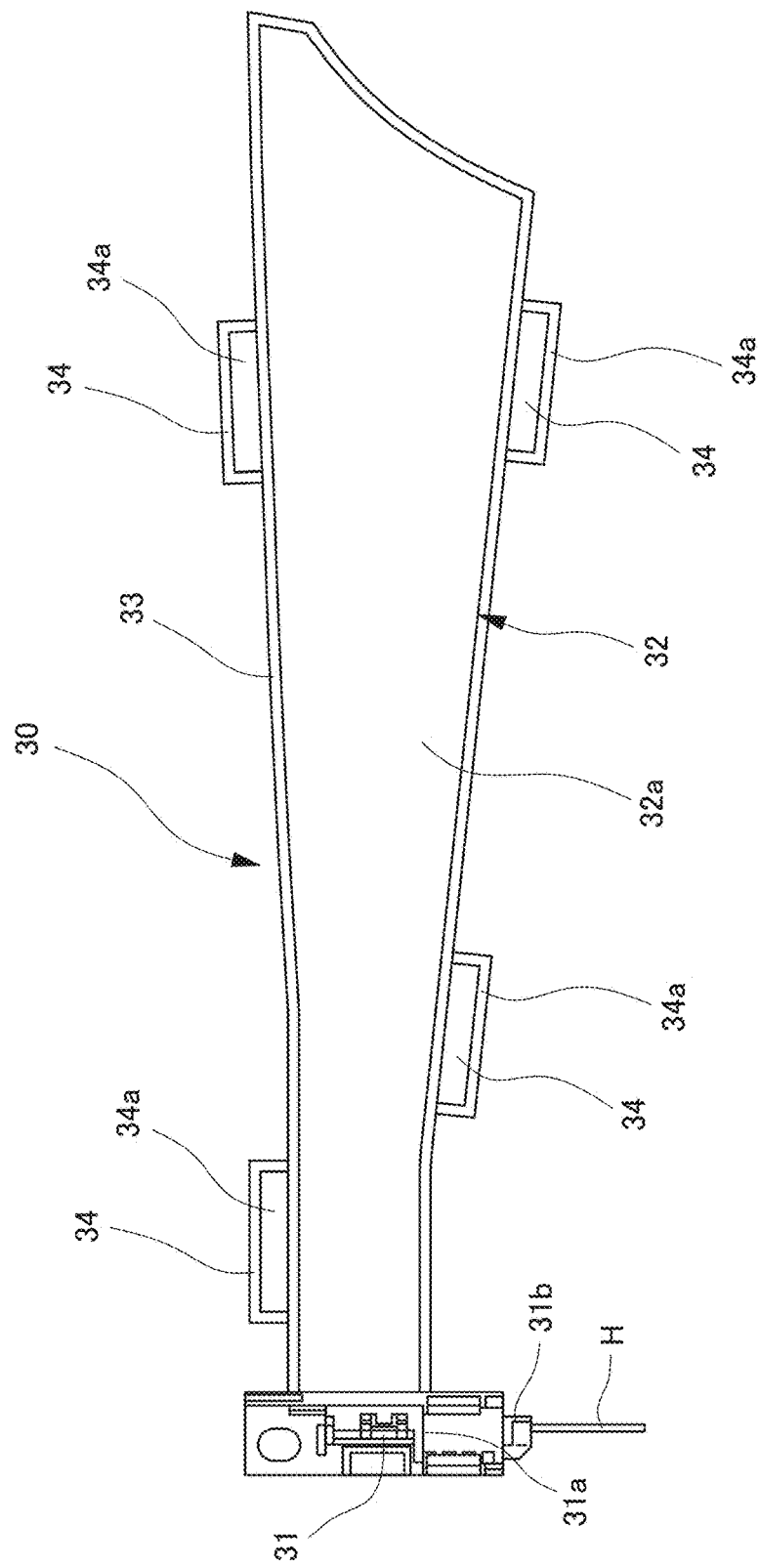

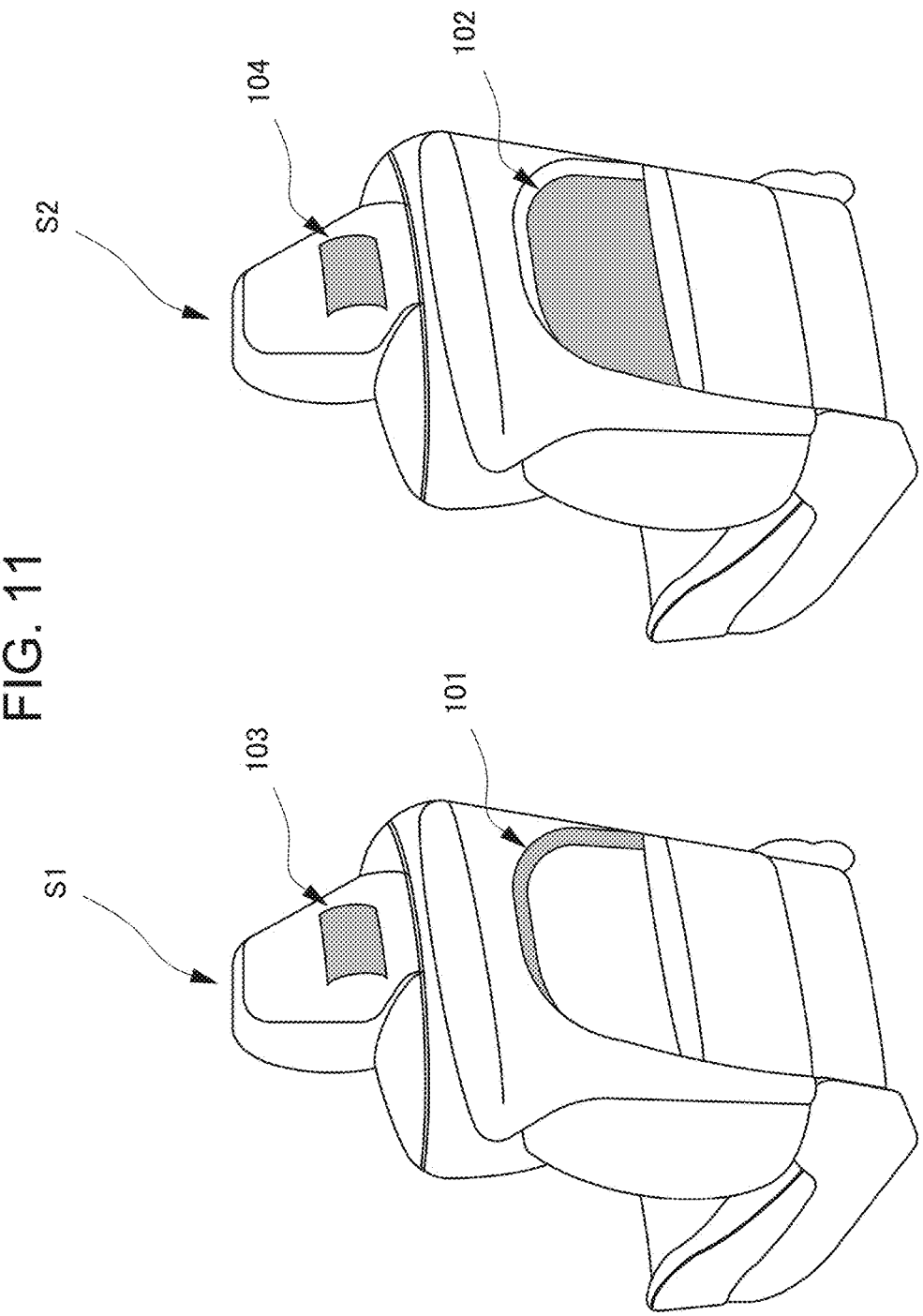

VEHICLE DECORATIVE COMPONENT AND VEHICLE DECORATIVE COMPONENT INSTALLING METHOD

CROSS-REFERENCE TO RELATED APPLICATIONS

This application is the U.S. national phase of the International Patent Application No. PCT/JP2012/080981, filed Nov. 29, 2012, which claims the benefit of Japanese Patent Application No. 2011-262394, filed Nov. 30, 2011, the contents of which are incorporated by reference herein in their entirety.

BACKGROUND

Disclosed herein is a vehicle decorative component and a vehicle decorative component installing method, and particularly a vehicle decorative component provided with a design property (decorative property) as a decorative component, the vehicle decorative component for exerting a practical function, and a method of installing the vehicle decorative component.

A vehicle decorative component such as a decorating component used for a vehicle lining is already known, and some function as a decorating illumination in a case where it gets dark in a vehicle interior such as nighttime. As one example of a vehicle decorative component provided with an illumination function in such a way, a courtesy lamp attached to the vehicle interior side of a vehicle door (for example, refer to Japanese Patent Document No. 2005-280657 A ("the '657 Document")). In general, this courtesy lamp is lit when the door is opened to illuminate around feet of a passenger and support getting-on/off, and to notify the following vehicle or person of a state where the door is opened.

However, the above courtesy lamp has a different look from other peripheral members in order to exert the above effect as the illumination. For example, unlike a color tone of the peripheral members, only the courtesy lamp has a milky white lens. Therefore, the courtesy lamp at the time of lights-out does not harmonize with the peripheral members, but rather appears to stand out. In such a way, the courtesy lamp serving as the conventional decorating illumination lacks unity with the peripheral members and has a poor design property.

A light-emitting vehicle decorative component has a problem different from the above problem. Specifically speaking, a use of the light-emitting vehicle decorative component includes, for example, a use as a decorating illumination. However, usage of the light-emitting vehicle decorative component is desirably more variable. In particular, effective utilization of the vehicle decorative component for enhancing elaborateness of an indoor environment of a vehicle is required.

Another problem of the light-emitting vehicle decorative component is considered. Specifically speaking, in a case where the vehicle decorative component has a light source and a light guiding body, efficient incidence of light from the light source on the light guiding body is required. That is, when the light from the light source can be efficiently incident on the light guiding body, the installing number of the light source can also be reduced. For efficient incidence of the light from the light source on the light guiding body, there is a need for constantly maintaining a clearance between the light source and the light guiding body.

As a further problem of the light-emitting vehicle decorative component, in a case where the vehicle decorative component has a light source, a light guiding body, and a holder that holds these parts as constituent components, and when the light guiding body is assembled to the holder by snap-fit, a gap is formed between the light guiding body and the holder and backlash is sometimes generated due to the gap. When such backlash is generated, there is a concern that a noise is generated. As a method of suppressing the above backlash, it is thought to fill the gap by putting an unwoven cloth or the like into the gap between the light guiding body and the holder. However, cost is increased due to an increase in the number of components. Further, by putting the unwoven cloth or the like, the light leaked out from the light guiding body is not reflected on a surface of the holder. Thus, there is a possibility that the light is not properly emitted from the light guiding body.

In addition to the problems as described above, the vehicle decorative component also has a problem relating to an installing method thereof. Specifically speaking, regarding an installing task of the vehicle decorative component, the task is desirably easier and the man-hours are desirably smaller. At the time of setting up the vehicle decorative component, when the directions of assembling constituent members of the vehicle decorative component are diverse, time and effort, such as changing postures of the members to match the assembling directions every time the constituent members are assembled, are required.

In a case where the vehicle decorative component has the light source, the light guiding body, and the holder that holds these parts, the light source and the light guiding body are sometimes assembled to the holder at positions adjacent to each other. With such a configuration, for example when the light source and the light guiding body are assembled to the holder in such a manner that a clearance between the light source and the light guiding body becomes a relatively short distance, depending on an assembling method, there is a fear that the light source and the light guiding body are not property assembled to the holder due to interference between the light source and the light guiding body.

SUMMARY

Various embodiments of the invention disclosed herein address the above problems, and an object thereof is to provide a vehicle decorative component capable of functioning as a decorating illumination while harmonizing with peripheral members at the time of lights-out from a view of improving a design property.

Another object is to provide a vehicle decorative component capable of being utilized for the purpose of enhancing elaborateness of an indoor environment of a vehicle as a light-emitting vehicle decorative component.

Still another object is, in a vehicle decorative component having a light source and a light guiding body, to let light from the light source efficiently shine incident on the light guiding body, and further to constantly maintain a clearance between the light source and the light guiding body.

Yet another object is, in a vehicle decorative component having a light source, a light guiding body, and a holder that holds these parts as constituent components, to suppress generation of backlash in the light guiding body held by the holder without using a separate member.

Further, another object is to provide a vehicle decorative component installing method in which a task is easier and the man-hours can be reduced. Further, in a case where a vehicle decorative component has a light source, a light guiding body, and a holder that holds these parts, the object is to provide a vehicle decorative component installing method capable of avoiding interference between the light source and the light guiding body and properly assembling the light source and the light guiding body to the holder.

The above problems are solved by a vehicle decorative component disclosed herein. According to various embodiments, the vehicle decorative component is a vehicle decorative component installed in a vehicle, the vehicle decorative component having a light emitting region that emits light, wherein the light emitting region includes an irradiation body that irradiates the light toward the front side of the light emitting region, a transmissive body through which the light emitted from the irradiation body is transmitted at a front position of the irradiation body, and a decorative layer formed at a front position of the transmissive body in a state where a surface is exposed, the decorative layer through which the light transmitted through the transmissive body is capable of being transmitted, and wherein a decoration style of the exposed surface of the decorative layer is a same as a decoration style of a surface of a non-light emitting region adjacent to the light emitting region.

By the vehicle decorative component with the above configuration, the light emitting region that emits the light and the non-light emitting region adjacent to the light emitting region harmonize with each other to produce unification as an interior component and improve a design property thereof. That is, with this vehicle decorative component, in a situation where an illumination function is not required during daytime or the like, existence of the light emitting region can be hidden focusing on the design property (specifically, the light emitting region and the non-light emitting region harmonize with each other and are not easily distinguished), and in a situation where the illumination function is required during nighttime or the like, the light emitting region can emit the light to effectively exert the illumination function.

In the above configuration, the vehicle decorative component may be installed on the indoor side of the vehicle, the decorative layer may be a decorative film attached to the transmissive body, the decorative film may have a transmissive portion through which the light transmitted through the transmissive body is transmitted, and a blocking portion by which the light transmitted through the transmissive body is blocked, and on a back surface of the decorative film positioned on the opposite of the exposed surface on the indoor side, a part corresponding to the transmissive portion may be transparent, and a part corresponding to the blocking portion may be a color-painted part.

With the above configuration, the decorative layer in which the transmissive portion through which the light is transmitted and the blocking portion by which the light is blocked can be freely arranged and can be easily formed.

In the above configuration, the transmissive body may be formed by a resin molded item containing a diffusion material.

With the above configuration, the light is diffused at the time of passing through the transmissive body. As a result, surface-emission with high light evenness can be realized to exert a favorable illumination effect.

In the above vehicle decorative component, the irradiation body may have a light source, and a light guiding body including a light emission surface that emits the light from the light source, the light source and the light guiding body may be integrated as a light source unit, the non-light emitting region may be adjacent to the light emitting region, the transmissive body, the decorative layer, and the non-light emitting region may be integrated as a decorative unit, and the light source unit may be arranged at a position sandwiched between a base member to which the vehicle decorative component is attached and the decorative unit.

With the above configuration, the light source unit can be compactly arranged in a limited space. As a result, hiding of the light source can be effectively realized. Further, attachment rigidity of the base member can also be ensured.

In the above vehicle decorative component, the light source unit may be assembled on the side of an opposing surface of the decorative unit to the base member in such a manner that a gap between the light guiding body and the transmissive body becomes a predetermined distance, and the decorative unit may include a positioning portion to be abutted with the light source unit at time of assembling the light source unit to the decorative unit, to place the light source unit at such a position that the gap becomes the predetermined distance.

With the above configuration, the gap between the light source unit and the transmissive body is adjusted to be a proper distance for obtaining a favorable illumination effect so that the light source unit can be placed at a position after the adjustment.

In the above vehicle decorative component, the positioning portion may be a rib extending from the opposing surface of the decorative unit to the base member, and the rib may be provided to surround the light source unit when the light source unit is assembled to the decorative unit.

With the above configuration, rigidity of the decorative unit can be ensured, and leakage of the light from the light source unit in the direction away from a front surface of the light source unit can be suppressed.

In the above vehicle decorative component, at least a part of the rib that surrounds the light source unit when the light source unit is assembled to the decorative unit may extend from a part of the opposing surface of the decorative unit to the base member, the part where the non-light emitting region is placed.

With the above configuration, even when a sink is generated in the decorative unit by providing the rib, the design property can be maintained by making the sink stand out less.

In the above vehicle decorative component, the light source unit may have a light source unit side fixing portion formed on a surface of the light guiding body on the opposite side of the light emission surface, and may be fixed to the base member by fastening the light source unit side fixing portion and the base member.

With the above configuration, the light source unit is assembled to the decorative unit and also fixed to the base member. Thus, the light source unit can be more firmly fixed.

In the above vehicle decorative component, the decorative unit may have a fixing portion that fixes the light source unit, the light source unit may have an engaged portion with which the fixing portion is engageable, and by engaging the fixing portion with the engaged portion, the light source unit may be assembled to the decorative unit.

With the above configuration, in comparison to a configuration that a light source unit is assembled to a decorative unit by screwing, the number of components can be reduced.

In the above vehicle decorative component, the decorative unit may have a decorative unit side fixing portion extending from an opposing surface of the non-light emitting region to the base member, and may be fixed to the base member by fastening the decorative unit side fixing portion and the base member.

With the above configuration, the decorative unit can be attached to the base member without preventing light emission of the light emitting region.

In the above vehicle decorative component, the light guiding body may be a lengthy light guiding plate, the longitudinal direction of the light guiding plate may be along the front to back direction of the vehicle in a state where the vehicle decorative component is installed in the vehicle, and a power input portion of the light source may be attached to the side of an end placed on the front side in the front to back direction of the vehicle among both ends in the longitudinal direction of the light guiding plate.

In a general vehicle, a power source that supplies power to a light source is disposed in a front side part of a vehicle. Therefore, with the above configuration, length of a harness extended from the power source to the power input portion of the light source can be reduced so that manufacturing cost of the vehicle decorative component can be minimized.

In the above vehicle decorative component, an information display screen that displays at least one information among still image information, moving image information, and text information may be formed in the light emitting region, the at least one information may be displayed on the information display screen when the irradiation body irradiates the light, and the information to be displayed on the information display screen may be switched by a switching operation performed by a passenger of the vehicle.

With the above configuration, by displaying various information on the information display screen formed in the light emitting region, comfort in an interior of the vehicle can be improved. For example, when a passenger of the vehicle displays still images and moving images of his/her preference, an entertainment or amusement property in the interior of the vehicle can be enhanced. When information of homepages and advertisement of enterprises on the internet are displayed, the information can be acquired in the vehicle so that convenience for the passenger is improved.

In the above vehicle decorative component, the irradiation body may have a light source, a light guiding body including a light emission surface that emits the light from the light source, and a holder that holds the light source and the light guiding body, and the holder may have a claw portion to be hooked onto a locking surface provided in an outer edge of the light guiding body on a same side as the light emission surface, and an abutment portion to be abutted with a surface of the light guiding body provided on the opposite side of the light emission surface in a state where the claw portion is hooked onto the locking surface.

With the above configuration, the light guiding body is sandwiched between the claw portion and the abutment portion in a state where the light guiding body is assembled to the holder. Thus, without requiring a separate member, backlash of the light guiding body with respect to the holder can be suppressed.

In the above vehicle decorative component, the holder may further have an enclosing portion that encloses the claw portion in order to suppress leakage of the light from the claw portion.

With the above configuration, even when the above claw portion is provided in the holder, the leakage of the light from the claw portion can be suppressed. Thus, while suppressing the leakage of the light, the light guiding body can be properly assembled to the holder.

In the above vehicle decorative component, the irradiation body may have a light source, and a light guiding body that emits the light from the light source, the light source and the light guiding body may be arranged at positions adjacent to each other, and a protruding portion protruding toward the light source may be formed in an end of the light guiding body on the side adjacent to the light source.

With the above configuration, the part of the light guiding body on which the light from the light source is incident can be brought closer to the light source. Thus, the light from the light source is efficiently incident on the light guiding body. As a result, even when the number of the light sources in use is small, the light can be properly emitted from the light guiding body.

In the above vehicle decorative component, the irradiation body further may have a holder that holds the light source and the light guiding body, the holder may have a positioning hole formed in order to position the light guiding body, and the light guiding body may have a convex portion protruding in the direction crossing the protruding direction of the protruding portion in the end on the side adjacent to the light source, and may be positioned with respect to the holder by fitting the convex portion into the positioning hole.

With the above configuration, the light guiding body is positioned with respect to the holder. Thus, for example, even when vibration is generated at the time of vehicle running, a clearance between the light guiding body and the light source can be constantly maintained.

In the above vehicle decorative component, the irradiation body may have a light source, a light guiding body including a light emission surface that emits the light from the light source, and a holder that holds the light source and the light guiding body, the holder may have an engagement projection to be engaged with an outer edge of the light guiding body at the time of assembling the light guiding body to the holder, and a part of the outer edge with which the engagement projection is engaged may be a part onto which a push-out pin is pressed at the time of taking out the injection-molded light guiding body from a mold.

With the above configuration, at the time of taking out the injection-molded light guiding body from the mold, the push-out pin is pressed onto the part that is different from the light emission surface of the light guiding body. Thus, an influence on light emission from the light emission surface can be suppressed.

In the above vehicle decorative component, the vehicle decorative component may be installed in a region in a part of a door of the vehicle facing the indoor side, the region excluding a region where a side impact pad is arranged between an inner panel of the door and a lower base, a region where a speaker is arranged between the inner panel and the lower base, a region where a pull handle of the door is arranged, a region where a switch panel embedded in the door lining is arranged, and a region where a pocket portion is formed in the door.

By installing the vehicle decorative component while excluding the above regions, without deteriorating functions of the parts of the vehicle door, the vehicle decorative component can be properly installed while suppressing unnecessary enlargement of the parts of the vehicle door.

The above problems are solved by a vehicle decorative component installing method according to various embodiments of the invention. Here, the vehicle decorative component installing method is a vehicle decorative component installing method of setting up a vehicle decorative component having an irradiation body that irradiates light and a transmissive body through which the irradiation light from the irradiation body is transmitted and installing the vehicle decorative component in a vehicle, including an irradiation body set-up step of assembling a light guiding body to a holder fixed to a base member to which the vehicle decorative component is attached to set up the irradiation body, a transmissive body assembling step of assembling the transmissive body to the holder of the set-up irradiation body, and a holder fixing step of fixing the holder to which the irradiation body and the transmissive body are assembled to the base member, wherein in the irradiation body set-up step, the light guiding body is brought close and assembled to the holder from a front side of a surface of the holder on the opposite side of a part fixed to the base member, and wherein in the transmissive body assembling step, the transmissive body is brought close and assembled to the holder from the front side of a light emission surface provided in the light guiding body.

With the above method, the assembling directions and the orientations of the components to be assembled to the holder are matched. Thus, the irradiation body set-up step and the transmissive body assembling step can be more easily performed, and the manufacturing man-hours can also be reduced. As a result, the vehicle decorative component can be more easily set up and more easily fixed to the base member.

The above problems are solved by a vehicle decorative component installing method of various embodiments of the present invention. Here, the vehicle decorative component installing method is a vehicle decorative component installing method of setting up an irradiation body that irradiates light, a transmissive body through which the irradiation light from the irradiation body is transmitted, and a vehicle decorative component, and installing the vehicle decorative component in a vehicle, including an irradiation body set-up step of assembling a light source and a light guiding body to a holder fixed to a base member to which the vehicle decorative component is attached to set up the irradiation body, a transmissive body assembling step of assembling the transmissive body to the holder of the set-up irradiation body, and a holder fixing step of fixing the holder to which the irradiation body and the transmissive body are assembled to the base member, wherein in the irradiation body set-up step, after the light guiding body is assembled to the holder, the light source is brought close to the holder from the side of the holder, and assembled to the holder to be adjacent to a protruding portion protruding toward the light source in one end of the light guiding body.

With the above method, the light source and the light guiding body can be properly assembled to the holder while avoiding interference between the light source and the protruding portion of the light guiding body.

According to a first aspect, in a situation where the illumination function is not required during daytime or the like, the existence of the light emitting region can be hidden focusing on the design property and the light emitting region and the non-light emitting region can harmonize with each other, to produce the unification as the interior component, and in a situation where the illumination function is required during nighttime or the like, the light emitting region can emit the light to effectively exert the illumination function.

According to a second aspect, the decorative layer in which the transmissive portion through which the light is transmitted and the blocking portion by which the light is blocked can be freely arranged can be easily formed.

According to a third aspect, the light is diffused at the time of passing through the transmissive body. As a result, a favorable illumination effect can be exerted with high light evenness.

According to a fourth aspect, the light source unit can be compactly arranged in the limited space. As a result, the hiding of the light source can be effectively realized. Further, the attachment rigidity of the base member can also be ensured.

According to a fifth aspect, the gap between the light source unit and the transmissive body is adjusted to be the proper distance for obtaining a favorable illumination effect so that the light source unit can be placed at the position after the adjustment.

According to a sixth aspect, the rigidity of the decorative unit can be ensured, and the leakage of the light from the light source unit in the direction away from the front surface of the light source unit can be suppressed.

According to a seventh aspect, even when the sink is generated in the decorative unit by providing the rib, the design property can be maintained by making the sink so it stands out less.

According to an eighth aspect, the light source unit is assembled to the decorative unit and also fixed to the base member. Thus, the light source unit can be more firmly fixed.

According to a ninth aspect, in comparison to the configuration in which the light source unit is assembled to the decorative unit by screwing, the number of components can be reduced.

According to a tenth aspect, the decorative unit can be attached to the base member without preventing the light emission of the light emitting region.

According to an eleventh aspect, the length of the harness extended from the power source to the power input portion of the light source can be reduced so that the manufacturing cost of the vehicle decorative component can be minimized.

According to a twelfth aspect, the comfort in the interior of the vehicle can be improved, the entertainment or amusement property in the interior of the vehicle can be enhanced, and by acquiring the information in the vehicle, the convenience for the passenger can be improved.

According to a thirteenth aspect, without requiring a separate member, the backlash of the light guiding body with respect to the holder can be suppressed.

According to a fourteenth aspect, even when the claw portion for assembling the light guiding body is provided in the holder, the light guiding body can be properly assembled to the holder while suppressing the leakage of the light from the claw portion.

According to a fifteenth aspect, the light from the light source is efficiently incident on the light guiding body. As a result, even when the using number of the light source is small, the light can be properly emitted from the light guiding body.

According to a sixteenth aspect, even when the vibration is generated at the time of the vehicle running, the clearance between the light guiding body and the light source can be constantly maintained.

According to a seventeenth aspect, at the time of taking out the injection-molded light guiding body from the mold, the push-out pin is pressed onto the part that is different from the light emission surface of the light guiding body. Thus, the influence on the light emission from the light emission surface can be suppressed.

According to an eighteenth aspect, without deteriorating the functions of the parts of the vehicle door, the vehicle decorative component can be properly installed while suppressing the unnecessary enlargement of the parts of the vehicle door.

According to a nineteenth aspect the vehicle decorative component can be more easily set up and more easily fixed to the base member.

According to a twentieth aspect, the light source and the light guiding body can be properly assembled to the holder while avoiding the interference between the light source and the protruding portion of the light guiding body.

BRIEF DESCRIPTION OF THE DRAWINGS

Various embodiments of the invention are illustrated in the drawings described below.

FIG. 2A is a front view of the vehicle decorative component according to the present embodiment;

FIG. 3 is an exploded perspective view of the vehicle decorative component according to the present embodiment (No. 1);

FIG. 4 is an exploded perspective view of the vehicle decorative component according to the present embodiment (No. 2);

FIG. 7 is a front view of a light source unit according to the present embodiment;

FIG. 11 is a perspective view showing a second application example regarding the vehicle decorative component;

DETAILED DESCRIPTION

Vehicle Decorative Component According to One Embodiment of the Present Invention Hereinafter, one embodiment of the present invention (referred to as the present embodiment below) will be described with reference to FIGS. 1 to 10C. In the following description, the front to back direction of a vehicle indicates the front to back direction at the time of normal running, the inner side of the vehicle (also simply referred to as the inner side below) indicates the vehicle interior side (interior side of the vehicle), and the outer side of the vehicle (also simply referred to as the outer side below) indicates the vehicle exterior side. Further, in the following description, the upper side (lower side) indicates the upper side (lower side) in a state where a part is assembled to a vehicle main body.

Hereinafter, as one example of a vehicle decorative component according to the present embodiment, a use, a configuration, and the like of an interior component (referred to as the light emitting ornament 1 below) used in a door lining, that is, a vehicle door lining R, will be described.

Before describing the light emitting ornament 1, first, the entire configuration of the vehicle door lining R including the light emitting ornament 1 will be briefly described with reference to FIG. 1.

Entire Configuration of Vehicle Door Lining R

The vehicle door lining R decorates the inner side of a vehicle door, and is formed by a group of components attached to a door inner panel (not shown). As components forming the vehicle door lining R, there are the light emitting ornament 1, a pocket rim 2, a door armrest 3, and the like as shown in FIG. 1, and these are attached to the inner side of a door base.

The door base is a part that covers an inner side surface of the door inner panel and forms a decoration surface of the vehicle door lining R. The door base according to the present embodiment is formed by combining an upper base and a lower base 4 (refer to FIG. 3 or 4) in the up and down direction. The light emitting ornament 1, the pocket rim 2, and the door armrest 3 are attached to an inner side surface of the lower base 4. The lower base 4 serves as one example of a base member, and is formed by a hard resin plate in the present embodiment. However, a material of the lower base is not limited to resin but the lower base may be made of metal for example.

In the vehicle door lining R, an accommodation space is formed between the door inner panel and the lower base 4. A side impact pad that absorbs an impact at the time of side surface collision, a speaker, and the like (not shown) are accommodated in the accommodation space. The side impact pad is arranged in a range denoted by the reference sign T1 in FIG. 1, and the speaker is arranged in a range denoted by the reference sign T2 in FIG. 1.

Figure 1:
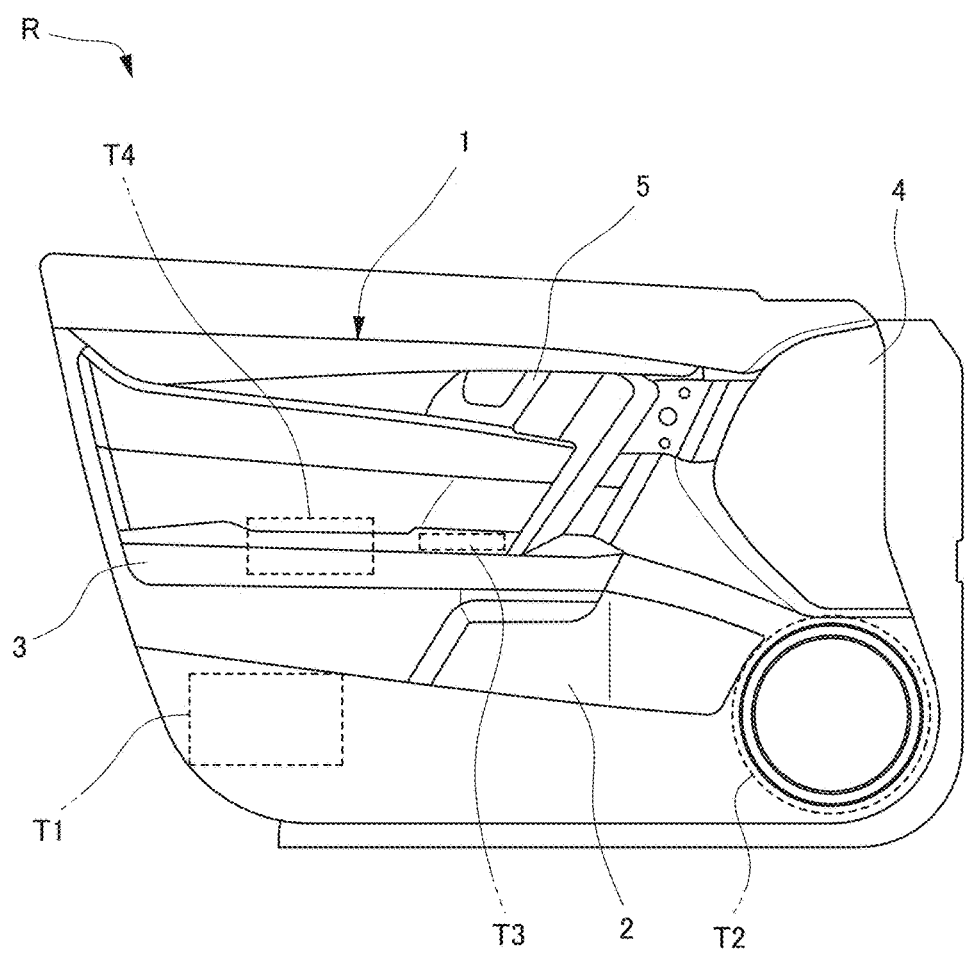
FIG. 1 is a perspective view showing a vehicle door lining utilizing a vehicle decorative component according to the present embodiment.

A switch panel to be operated for adjusting opening/closing of a window is provided on an upper surface of a rear end of the door armrest 3 (in a range denoted by the reference sign T3 in FIG. 1). Further, a cavity (pull pocket) into which a passenger inserts his/her hand for opening/closing the door is formed between the lower base 4 and a front end of the door armrest 3 (in a range denoted by the reference sign T4 in FIG. 1).

Outline of Light Emitting Ornament 1

Figure 2B:
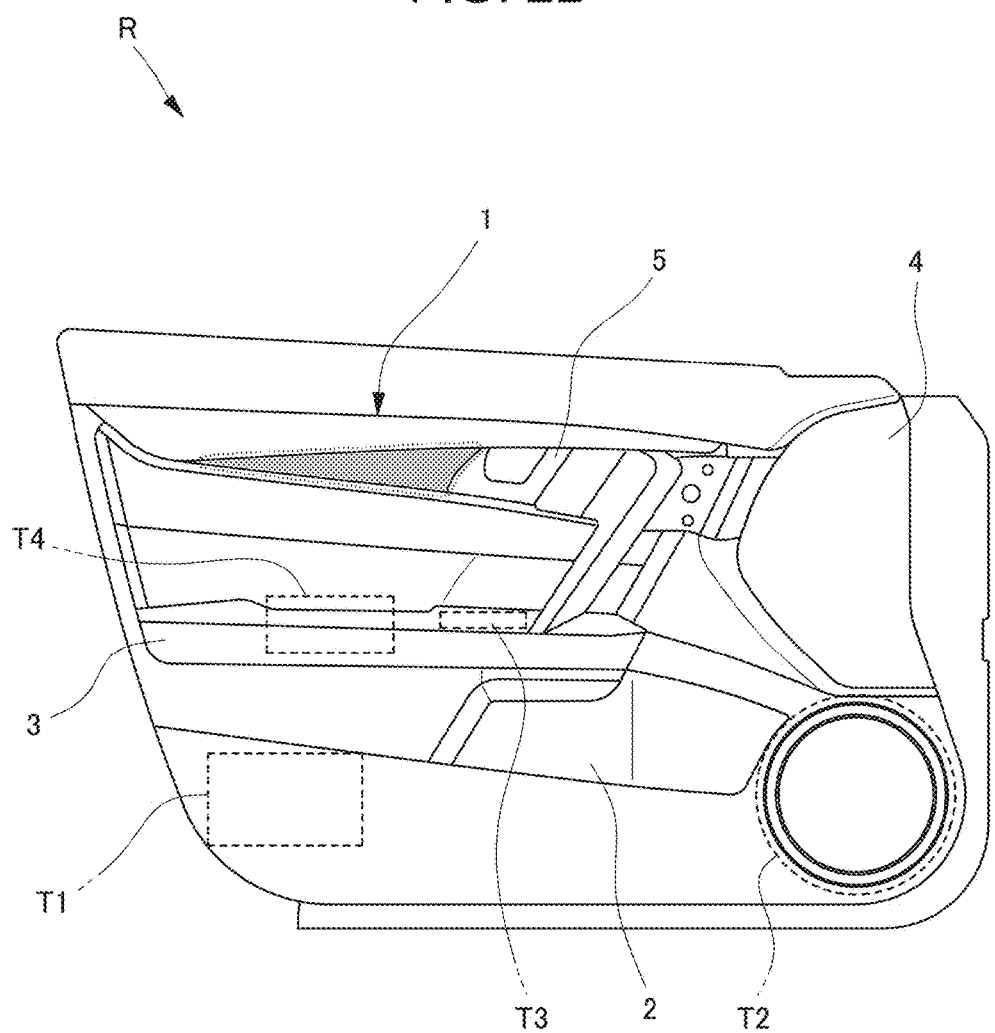
FIG. 2B is a perspective view showing a state where the vehicle decorative component according to the present embodiment functions as a vehicle illumination.

Next, an outline of the light emitting ornament 1 will be described with reference to FIGS. 2A and 2B.

The light emitting ornament 1 is a door lining component attached to a part beside a pull handle 5 on the inner side of the lower base 4. This light emitting ornament 1 functions as an illumination device in the vehicle door lining R, and is lit when it gets dark in a vehicle interior, such as nighttime. By this illumination function of the light emitting ornament 1, for example, when the door is opened, the following vehicle or person can be notified of a state where the door is opened.

In the present embodiment, when the light emitting ornament 1 exerts the illumination function, only a lower part of the light emitting ornament 1 emits light, and an upper part of the light emitting ornament 1 does not emit the light. Specifically speaking, as shown in FIG. 2A, the light emitting ornament 1 has a long knife shaped outer shape along the front to back direction of the vehicle. A light emitting region 1a (gray-colored part in FIG. 2A) developed in a substantially triangle shape from the slightly rear side of a front end is formed in a lower end of the light emitting ornament. A light source (specifically, a lamp 31 to be described later) is arranged on the back side (outer side) of the light emitting region 1a. When the light source is lit, the light emitting region 1a emits the light with predetermined brightness.

A non-light emitting region 1b that does not emit the light is formed in a part of the light emitting ornament 1 excluding the light emitting region 1a. This non-light emitting region 1b is adjacent to the light emitting region 1a on the upper side of the light emitting region 1a (more specifically, neighboring the light emitting region 1a), and does not emit the light even when the light source of the light emitting ornament 1 is lit.

Further, the light emitting ornament 1 functions as a decorative component (interior item) for improving a design property of the door in a situation where the illumination function is not required during daytime or the like. In the light emitting ornament 1 according to the present embodiment, the light emitting region 1a in a non-light emitting state has the same look as the non-light emitting region 1b. That is, a decoration style of an inside surface of the light emitting region 1a is the same as a decoration style of an inside surface of the non-light emitting region 1b. Specifically, the surfaces are metallic-colored. The decoration style indicates a visual characteristic expressed by decoration processing on the surfaces such as color combination, patterns, gloss, and texture.

As described above, since the decoration style of the inside surface of the light emitting region 1a is the same as the decoration style of the inside surface of the non-light emitting region 1b, the light emitting region 1a and the non-light emitting region 1b adjacent to the light emitting region 1a harmonize with each other, to produce unification as the interior component. As a result, the design property of the door is improved. That is, with the light emitting ornament 1 according to the present embodiment, in a situation where the illumination function is not required during daytime or the like, existence of the light emitting region 1a can be hidden focusing on the design property (specifically, the light emitting region 1a and the non-light emitting region 1b harmonize with each other and are not easily distinguished), and in a situation where the illumination function is required during nighttime or the like, the light emitting region 1a can emit the light to effectively exert the illumination function as shown in FIG. 2B. Such a property is called as the stealth property. In the light emitting ornament 1 according to the present embodiment, the above stealth property is greatly improved in comparison to the conventional vehicle illumination device.

As described above, the inside surfaces of both the light emitting region 1a and the non-light emitting region 1b are metallic-colored in the present embodiment. However, the present invention is not limited to this. For example, a wood grain or carbon fiber effect may be given to the surfaces, or, in addition, the color combination or the patterns may be the same.

Configuration of Light Emitting Ornament 1

Next, a configuration of the light emitting ornament 1 will be described in detail with reference to the drawings.

As shown in FIG. 3, the light emitting ornament 1 has an ornament unit 10 and a light source unit 30 as major constituent elements. The ornament unit 10 is a plate shaped member exposed on the vehicle interior side. That is, the ornament unit 10 regulates the outer shape of the light emitting ornament 1, and is placed on the vehicle interior side to express a decorative property of the light emitting ornament 1.

The ornament unit 10 corresponds to a decorative unit, and has a part that emits the light when the light source of the light emitting ornament 1 is lit, and a part that does not emit the light. The part that does not emit the light of the ornament unit 10 serves as the non-light emitting region 1b described above. On the other hand, the part that emits the light of the ornament unit 10 (referred to as the light emittable region 10a below) corresponds to a part of the light emitting region 1a described above, the part of the light emitting region 1a excluding the light source unit 30. As described above, the non-light emitting region 1b and the light emittable region 10a are integrated as the ornament unit 10 in the present embodiment.

The ornament unit 10 is fixed to the inner side surface of the lower base 4. The ornament unit 10 is fixed to the lower base 4 by using both a fixing method with screwing and a fixing method with snap-fit.

The light source unit 30 has the lamp 31 serving as the light source, and a light guiding body 32 including a light emission surface 32a that emits the light from the lamp 31, and is arranged on the back side (outer side) of the ornament unit 10. That is, in the present embodiment, the light source unit 30 is arranged at a position to be sandwiched between the lower base 4 and the ornament unit 10.

More specifically speaking, the light source unit 30 is assembled to a back surface of the light emittable region 10a (outside surface serving as an opposing surface to the lower base 4) of the ornament unit 10. In the present embodiment, the light source unit 30 is assembled to the light emittable region 10a by using the fixing method with the snap-fit engagement. The ornament unit 10 to which the light source unit 30 is assembled is fixed to the lower base 4.

In such a way, the light source unit 30 is arranged at the position to be sandwiched between the lower base 4 and the ornament unit 10 in the present embodiment. Thus, the light source unit 30 can be compactly arranged in a limited space such as an interior of the vehicle door. As a result, hiding of the lamp 31 provided in the light source unit 30 as the light source can be effectively realized. Therefore, the property of hiding the existence of the light emitting region 1a (stealth property) in a situation where the illumination function is not required during daytime or the like is improved.

Since the light source unit 30 is arranged at the position to be sandwiched between the lower base 4 and the ornament unit 10, attachment rigidity of the lower base 4 around the light source unit 30 is ensured.

Hereinafter, each of the ornament unit 10 and the light source unit 30 will be described in more detail.

(1) Ornament Unit 10

As described above, the ornament unit 10 has the light emittable region 10a and the non-light emitting region 1b as shown in FIGS. 3 and 4. Both the light emittable region 10a and the non-light emitting region 1b are formed by a base material (referred to as the ornament base material 11) made of a resin material, and a decorative film 12 attached to a surface (inner surface) of the ornament base material 11.

Figure 5:
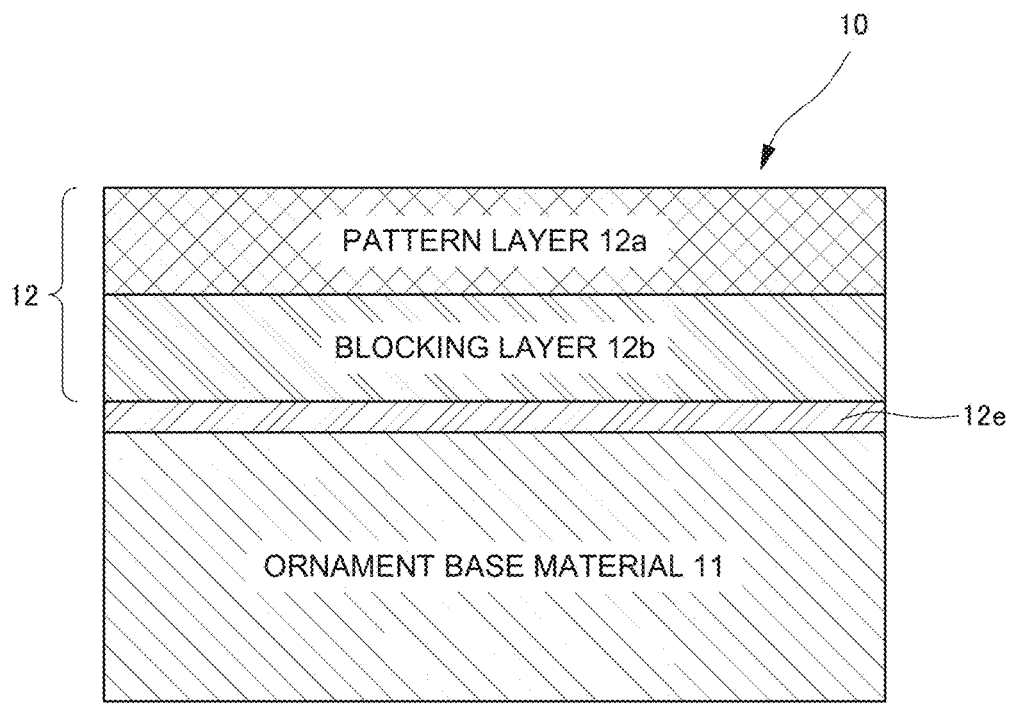
FIG. 5 is a schematic side view showing a lamination structure of a decorative unit according to the present embodiment.

That is, both the light emittable region 10a and the non-light emitting region 1b are formed in a layer structure as shown in FIG. 5, the structure in which the decorative film 12 is attached to the surface of the ornament base material 11. A layer of an adhesive (adhesive layer 12e) applied for attaching the decorative film 12 is formed on the surface of the ornament base material 11.

The ornament base material 11 is a translucent and transparent resin molded item, and ABS resin, PC resin, PMMA resin, and the like can be utilized as a material. Regarding a resin material used as the material of the ornament base material 11, the most preferable material may be selected in consideration with thermal resistance, chemical resistance, shock resistance, burn resistance, and the like of the material. In the present embodiment, PC resin is used as the material for molding the ornament base material 11.

In the present embodiment, an ornament base material 11 forming the light emittable region 10a and an ornament base material 11 forming the non-light emitting region 1b are integrally molded. However, the present invention is not limited to this but the ornament base material 11 forming the light emittable region 10a and the ornament base material 11 forming the non-light emitting region 1b may be respectively individually molded.

The light source unit 30 is arranged on the back side of the ornament base material 11 forming the light emittable region 10a. That is, the ornament base material 11 forming the light emittable region 10a corresponds to a transmissive body through which the light from the light source unit 30 (specifically, the light emitted from the light guiding body 32) is transmitted at a front position of the light source unit 30. The ornament base material 11 according to the present embodiment contains a diffusion material, and the light passing through the ornament base material is diffused. As a result, when the lamp 31 provided in the light source unit 30 is lit, the light thereof is transmitted while being diffused in the ornament base material 11 forming the light emittable region 10a. Thus, the entire light emittable region 10a can emit the light. A known diffusion material (light diffusing agent) can be utilized as the diffusion material.

The decorative film 12 is placed on the most vehicle interior side of the ornament unit 10, and gives the decorative property to the ornament unit 10. This decorative film 12 is a film made of polymethylmethacrylate resin (PMMA) or polyethylene terephthalate (PET), the film being colorless, transparent, and translucent before printing and the like are performed. That is, the decorative film 12 serves as a decorative layer formed at a front position of the ornament base material 11 and exposed on the vehicle interior side, the decorative layer through which the light transmitted through the ornament base material 11 can be transmitted.

Figure 6A:
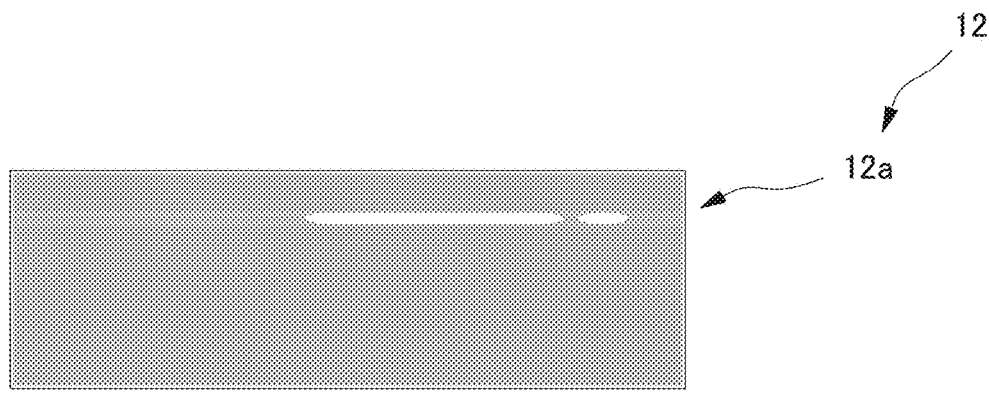
FIG. 6A is a pictorial view showing a surface of a decorative film according to the present embodiment.

Specifically speaking, the surface side of the decorative film 12 (side of the surface exposed to the vehicle interior) is metallic-colored as shown in FIG. 6A. Thereby, the front side (inner side) of the ornament unit 10 produces metallic texture. As described above, a pattern layer 12a is formed on the surface side of the decorative film 12.

The pattern layer 12a is formed by printing processing such as gravure printing or silk-screen printing, and translucent ink, pigments, and the like are used in this processing. Therefore, the light transmitted through the ornament base material 11 can pass through the pattern layer 12a.

The back surface side of the decorative film 12 (side of the surface placed on the opposite of the exposed surface on the vehicle interior side and attached to the ornament base material 11) has different aspects for the light emittable region 10a and the non-light emitting region 1b. Regarding the non-light emitting region 1b, the entire back surface of the decorative film 12 is color-painted with black ink by the printing processing such as the gravure printing or the silk-screen printing. This part color-painted with the black ink forms a non-translucent blocking layer 12b and blocks the light transmitted through the ornament base material 11. As described above, in the non-light emitting region 1b, the decorative film 12 in which the blocking layer 12b is formed on the entire back surface is attached to the ornament base material 11. As a result, while the light emitting ornament 1 emits the light, the non-light emitting region 1b does not emit the light.

Figure 6B:
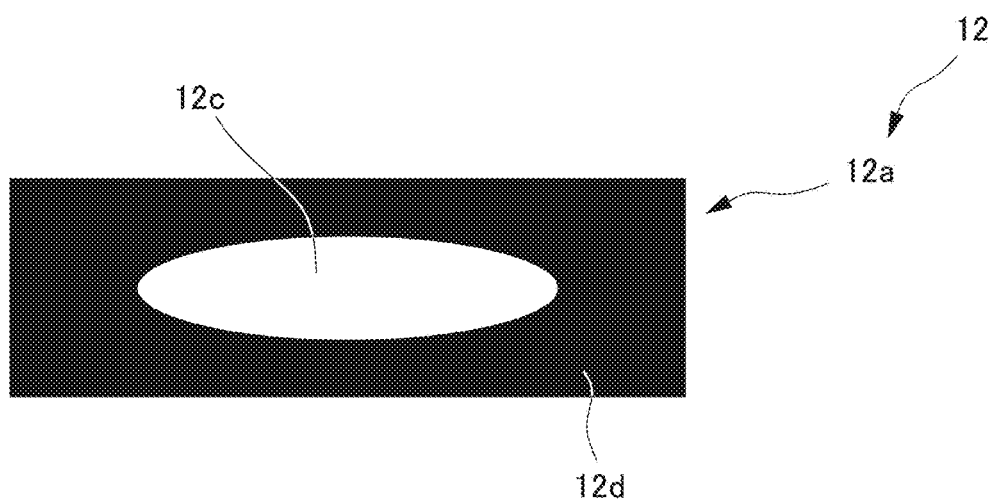
FIG. 6B is a pictorial view showing a back surface of the decorative film according to the present embodiment.
Figure 6C:
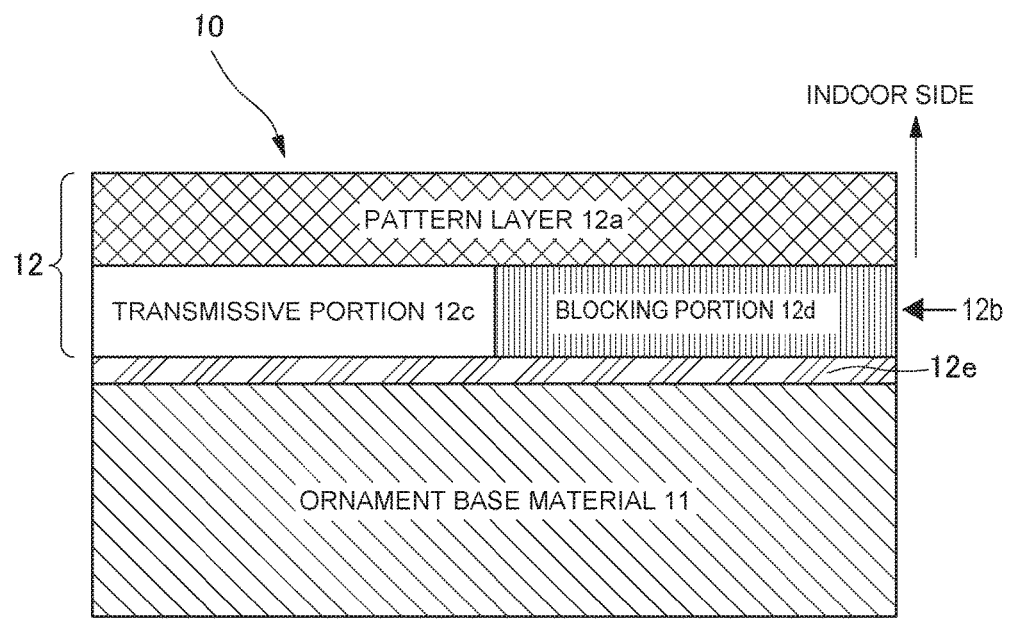
FIG. 6C is another schematic side view showing a lamination structure of a decorative unit with a borderline between a transmissive portion and blocking portion, according to the present embodiment.

Regarding the light emittable region 10a, color-painting is performed in such a manner that a center part of the back surface of the decorative film 12 is left in a substantially oval shape as shown in FIG. 6B. Therefore, in the blocking layer 12b formed on the back surface of the decorative film 12 belonging to the light emittable region 10a, a colorless and transparent part without the black ink and a part color-painted with the black ink are mixed. That is, the decorative film 12 belonging to the light emittable region 10a has a transmissive portion 12c through which the light is transmitted, and a blocking portion 12d by which the light is blocked, as shown in FIG. 6C. On the back surface of the decorative film 12, a part corresponding to the transmissive portion 12c is colorless and transparent, and a part corresponding to the blocking portion 12d is the part color-painted with the black ink. In the configuration that the part corresponding to the transmissive portion 12c is transparent, the term "transparent" means "colorless and transparent" and "semitransparent" which is slightly milky colored.

In the light emittable region 10a in which the decorative film 12 having the transmissive portion 12c and the blocking portion 12d is attached as shown in FIG. 6C, the light transmitted through the ornament base material 11 cannot be transmitted through the blocking portion 12d of the decorative film 12, and the light transmitted through the ornament base material 11 is transmitted only through the transmissive portion 12c. As a result, while the light emitting ornament 1 emits the light, the light emitting region 1a (that is, the light emittable region 10a of the ornament unit 10) emits the light, and in particular, only the part of the decorative film 12 where the transmissive portion 12c is placed emits the light. Thereby, only a predetermined part of the light emitting region 1a can emit the light so that a decoration property given by an illumination effect of the light emitting ornament 1 is improved.

Further, when the light from the light source unit 30 is irradiated from the ornament unit 10 (more specifically, the light emittable region 10a), the light is transmitted through the ornament base material 11 containing the diffusion material. As a result, an irradiation range of the light irradiated from the ornament unit 10 is extended. In comparison to a case where the diffusion material is not contained, while irradiating over a wide range centering on the light emitting ornament 1, irradiation intensity thereof is substantially uniform over an irradiation range (that is, surface-emission with high light evenness is realized), to exert a favorable illumination effect.

In the present embodiment, a borderline between the transmissive portion 12c and the blocking portion 12d is clear as shown in FIG. 6B and FIG. 6C. However, the transmissive portion 12c may be gradually changed to the blocking portion 12d in order to dim the light irradiated from the ornament unit 10 by blurring the border line between the transmissive portion 12c and the blocking portion 12d, specifically speaking, a gradation may be provided in printing color density of the blocking portion 12d in such a manner that the printing color is denser as the blocking portion is more distant from the transmissive portion 12c.

As described above, in the present embodiment, by attaching the decorative film 12 on the surface of the ornament base material 11, the decorative layer is formed on the surface of the ornament base material 11. However, a method of forming the decorative layer on the surface of the ornament base material 11 is not limited to a case of using the decorative film 12. For example, in a case where the surface of the ornament unit 10 is metallic-colored, vapor deposition processing or mirror ink processing may be performed directly onto a resin surface of the ornament base material 11. However, the above formation of the decorative layer by attaching the decorative film 12 is preferable in that the decorative layer is more easily formed in such a manner that the transmissive portion 12c and the blocking portion 12d of the light can be freely arranged.

On the back surface side of the ornament unit 10, bosses 13 and an engagement projection 14 for fixing the ornament unit 10 to the lower base 4 are formed (refer to FIG. 4). The bosses 13 are parts fitted into boss holes 4a formed on the lower base 4 at corresponding positions, and screwed and fixed in such a state. The engagement projection 14 is a part fitted into a fitting hole 4b formed on the lower base 4 at a corresponding position, and snap-fit combined to the lower base 4. The above bosses 13 and the engagement projection 14 correspond to a decorative unit side fixing portion, and extend from the back surface of the ornament unit 10, that is, from the opposing surface to the lower base 4.

In the present embodiment, the bosses 13 and the engagement projection 14 are provided in the region of the ornament unit 10 excluding the light emittable region 10a, that is, the non-light emitting region 1b. In particular, in the present embodiment, the bosses and the engagement projection are provided in both ends in the longitudinal direction of the ornament unit 10 as shown in FIG. 4. That is, in the present embodiment, the bosses 13 and the engagement projection 14 extend from a back surface of the non-light emitting region 1b (that is, an opposing surface to the lower base 4). By fastening these parts to the lower base 4, the ornament unit 10 is fixed to the lower base 4. Since the bosses 13 and the engagement projection 14 are provided in the non-light emitting region 1b in such a way, the ornament unit 10 can be attached and fixed to the lower base 4, to not interfere with irradiation of the light from the light emittable region 10a (in other words, to not prevent light emission in the light emitting region 1a).

As shown in FIG. 4, a rib 15 stands on the back surface (that is, the opposing surface to the lower base 4) of the ornament unit 10. This rib 15 is provided for ensuring rigidity of the ornament unit 10, extends from the back surface of the ornament unit 10, and is formed in an endless shape to form a substantially trapezoid outline when the back surface of the ornament unit 10 is seen from the front side. More specifically speaking, the shape of the rib 15 when the back surface of the ornament unit 10 is seen from the front side is a similar shape formed by slightly enlarging an outer shape of the light source unit 30 (excluding engagement hole forming portions 34 to be described later) as shown in FIG. 4.

The above rib 15 surrounds the light source unit 30 when the light source unit 30 is assembled to the ornament unit 10. In other words, the light source unit 30 is assembled to the ornament unit 10 to be accommodated in a space surrounded by the rib 15 in the present embodiment. Thereby, the light source unit 30 can be more compactly arranged in a limited space such as the interior of the vehicle door. As a result, thickness of the vehicle door can be more reduced even on the premise that the light source unit 30 is accommodated inside the door.

Since the light source unit 30 assembled to the ornament unit 10 is surrounded by the rib 15, the light from the light source unit 30 is irradiated only to a part of the ornament unit 10 placed at the front position (front surface) of the light source unit 30, that is, the part surrounded by the rib 15. As described above, in the present embodiment, the rib 15 provided on the back surface of the ornament unit 10 can ensure the rigidity of the ornament unit 10 and also suppress leakage of the light from the light source unit 30 to a part of the ornament unit 10 out of the front surface of the light source unit 30 (out of the part surrounded by the rib 15).

A part of the above rib 15 placed on the upper side of the light source unit 30 in a state where the rib surrounds the light source unit 30 assembled to the ornament unit 10 extends from a part of the back surface (that is, the opposing surface to the lower base 4) of the ornament unit 10, the part in which the non-light emitting region 1b is placed. In particular, in the present embodiment, the part of the rib 15 placed on the upper side of the light source unit 30 is arranged in the vicinity of a border position between the non-light emitting region 1b and the light emittable region 10a. With a part of the rib 15 being arranged in the vicinity of a position of the non-light emitting region 1b, in particular, the border position from the light emittable region 10a, even when a sink is generated by providing the rib 15 on the back surface of the ornament unit 10, the sink can be made to stand out less so that deterioration of a function as a decorative component can be suppressed.

For exerting the above effect of making the sink generated by providing the rib 15 on the back surface of the ornament unit 10 to stand out less, at least a part of the rib 15 surrounding the light source unit 30 assembled to the ornament unit 10 may be arranged in the vicinity of the position of the non-light emitting region 1b, in particular, the border position from the light emittable region 10a. However, in the present embodiment in which the light emittable region 10a is provided in a lower end of the ornament unit 10, in order to more effectively exert the above effect, the part of the above rib 15 placed on the upper side of the light source unit 30 is preferably arranged in the non-light emitting region 1b.

In the present embodiment, the transmissive portion 12c is formed in the light emittable region 10a of the ornament unit 10. With such a configuration, the effect of setting a generation point of the sink in the non-light emitting region 1b and making the sink to stand out less becomes more fruitful. That is, in the present embodiment, the transmissive portion 12c through which the light is transmitted is provided in the light emittable region 10a. When the sink is generated at such a position where the transmissive portion 12c is provided, the sink easily stands out. Therefore, by setting a generation position of the sink out of the transmissive portion 12c, even when the sink is generated, the sink can be made to stand out less.

(2) Light Source Unit 30

The light source unit 30 forms the light emittable region 10a of the ornament unit 10 (more specifically, the ornament base material 11 and the decorative film 12 forming the light emittable region 10a), and the light emitting region 1a of the light emitting ornament 1. As described above, the light source unit 30 has the lamp 31 and the light guiding body 32 including the light emission surface 32a that emits the light from the lamp 31. These components (specifically, the lamp 31 and the light guiding body 32) are held by a holder 33 to be described later, and unitized via the holder 33. In other words, the lamp 31 and the light guiding body 32 described above are held by the holder 33 to be integrated as the light source unit 30.

The light source unit 30 is placed on the back side of the light emittable region 10a of the ornament unit 10, and functions as an irradiation body that irradiates the light toward the front side of the light emittable region 10a (in other words, toward the front side of the light emitting region 1a).

The lamp 31 according to the present embodiment is preferable as a light source of a vehicle illumination such as a LED lamp. The light guiding body 32 according to the present embodiment is a lengthy light guiding plate, and as shown in FIG. 7, width thereof (length in the direction orthogonal to the longitudinal direction) is gradually extended from one end in the longitudinal direction to the other end. In a state where the light emitting ornament 1 is installed on the vehicle interior side, the longitudinal direction of the light guiding body 32 is along the front to back direction of the vehicle. The one end in the longitudinal direction of the light guiding body 32 is an end (front end) placed on the general front side in the front to back direction of the vehicle, and the other end in the longitudinal direction of the light guiding body 32 is an end (rear end) placed on the general rear side.

The light guiding plate serving as the light guiding body 32 is fitted into the holder 33 serving as a frame body molded to match an outer shape of the light guiding plate, and held by the holder 33. This holder 33 is preferably white-colored to favorably reflect the light emitted from the light guiding plate. For example, the holder is molded with a material in which a white pigment is mixed in PC resin. In particular, in the present embodiment, the holder is molded by a mixing amount of the white pigment which is about twice more than a mixing amount at the time of manufacturing a general white resin molded item.

The lamp 31 is attached to the holder 33 at a position adjacent to the one end (front end) in the longitudinal direction of the light guiding body 32. When the lamp 31 is attached at the position adjacent to the end of the longitudinal direction of the light guiding body 32 in such a way, the advancing direction of the light matches the light guiding direction of the light guiding body 32. Thus, a favorable light guiding effect can be obtained. In particular, in the present embodiment, in the one end in the longitudinal direction on the side where the lamp 31 is attached among both the ends in the longitudinal direction of the light guiding body 32, the width is narrower than the other end in the longitudinal direction. That is, on the more downstream side in the advancing direction of the light, the width of the light guiding plate is more extended. Thus, the light from the lamp 31 spreading in a fan shape can be more properly guided.

In the present embodiment, the lamp 31 is attached only on the side of the one end in the longitudinal direction of the light guiding body 32. However, the present invention is not limited to this. For example, in a case where length of the light guiding body 32 (length in the longitudinal direction) is relatively long or the like, the lamp 31 may be attached beside each of both the ends in the longitudinal direction of the light guiding body 32 (that is, two lamps 31 may be provided).

Further, in the present embodiment, the lamp 31 is attached on the side of the end placed on the rather front side in the front to back direction of the vehicle among both the ends in the longitudinal direction of the light guiding body 32. Thereby, length of a harness H extended from a power source that supplies power to the lamp 31 to the lamp 31 can be reduced so that manufacturing cost of the light emitting ornament 1 is suppressed.

Specifically speaking, a jack 31a serving as a power input portion is provided in the lamp 31 in order to receive the power supplied from the power source (not shown). A connector 31b attached to a terminal end of the harness H which is extended from the above power source is installed in this jack 31a. In a case of a general vehicle, the above power source is disposed in a front side part (front part) of the vehicle. Therefore, when the jack 31a of the lamp 31 is attached on the side of the end close to the front side part of the vehicle among both the ends in the longitudinal direction of the light guiding plate serving as the light guiding body 32, in comparison to a configuration that the jack is attached on the side of the end close to a rear side part (rear part) of the vehicle, the length of the harness H can be more reduced, and accordingly, the manufacturing cost of the light emitting ornament 1 can be suppressed.

In a state where the light emitting ornament 1 is installed on the vehicle interior side, an opening of the jack 31a is formed to face the lower side in the vertical direction. Therefore, at the time of inserting the connector 31b into the jack 31a, the connector 31b is inserted from the lower side of the jack 31a (lower side of the lamp 31). With such a configuration, in a case where liquid water such as rainwater unintentionally invades an interior space of the vehicle door (specifically, a gap between the lower base 4 and the ornament unit 10), a contact part (not shown) with the connector 31b in the lamp 31 can be suppressed from being wet by the above liquid water.

As described above, the light source unit 30 with the above configuration is assembled to the back surface side of the ornament unit 10 by a snap-fit method. More specifically speaking, as shown in FIG. 7, the light source unit 30 is provided with the engagement hole forming portions 34 protruding upward or downward from an outer edge of the holder 33. The engagement hole forming portions 34 have a portal outer shape, and form rectangular engagement holes 34a. The engagement holes 34 formed by the engagement hole forming portions 34 correspond to an engaged portion, and serve as holes to be engageable with claw portions 16 provided on the side of the ornament unit 10.

In the present embodiment, the plurality of engagement hole forming portions 34 is formed on the outer edge of the holder 33. Formation positions of the engagement hole forming portions 34 are set as preferable positions for assembling the light source unit 30 to the ornament unit 10 in a well-balanced manner in consideration with a gravity center position of the light source unit 30. In the present embodiment, the engagement hole forming portions 34 are formed at total of four points including two points in an upper end of the holder 33 and two points in a lower end of the holder 33.

Figure 8:
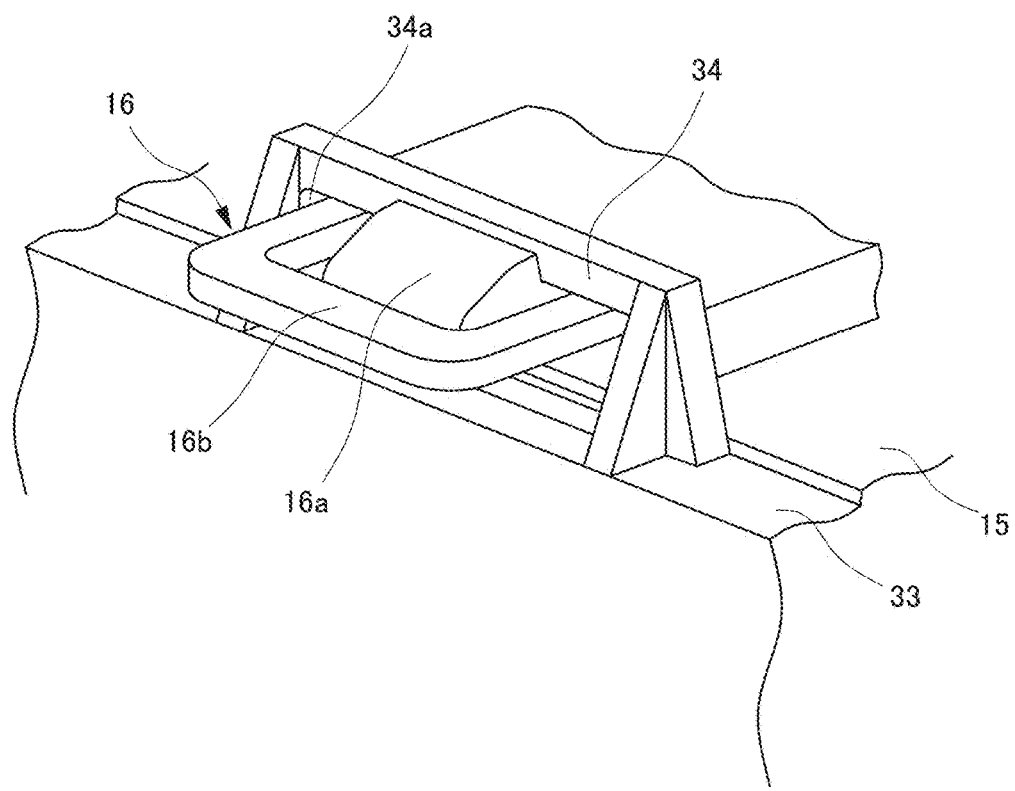
FIG. 8 is a perspective view showing an assembling mechanism of the light source unit and the decorative unit according to the present embodiment.
Figure 9:
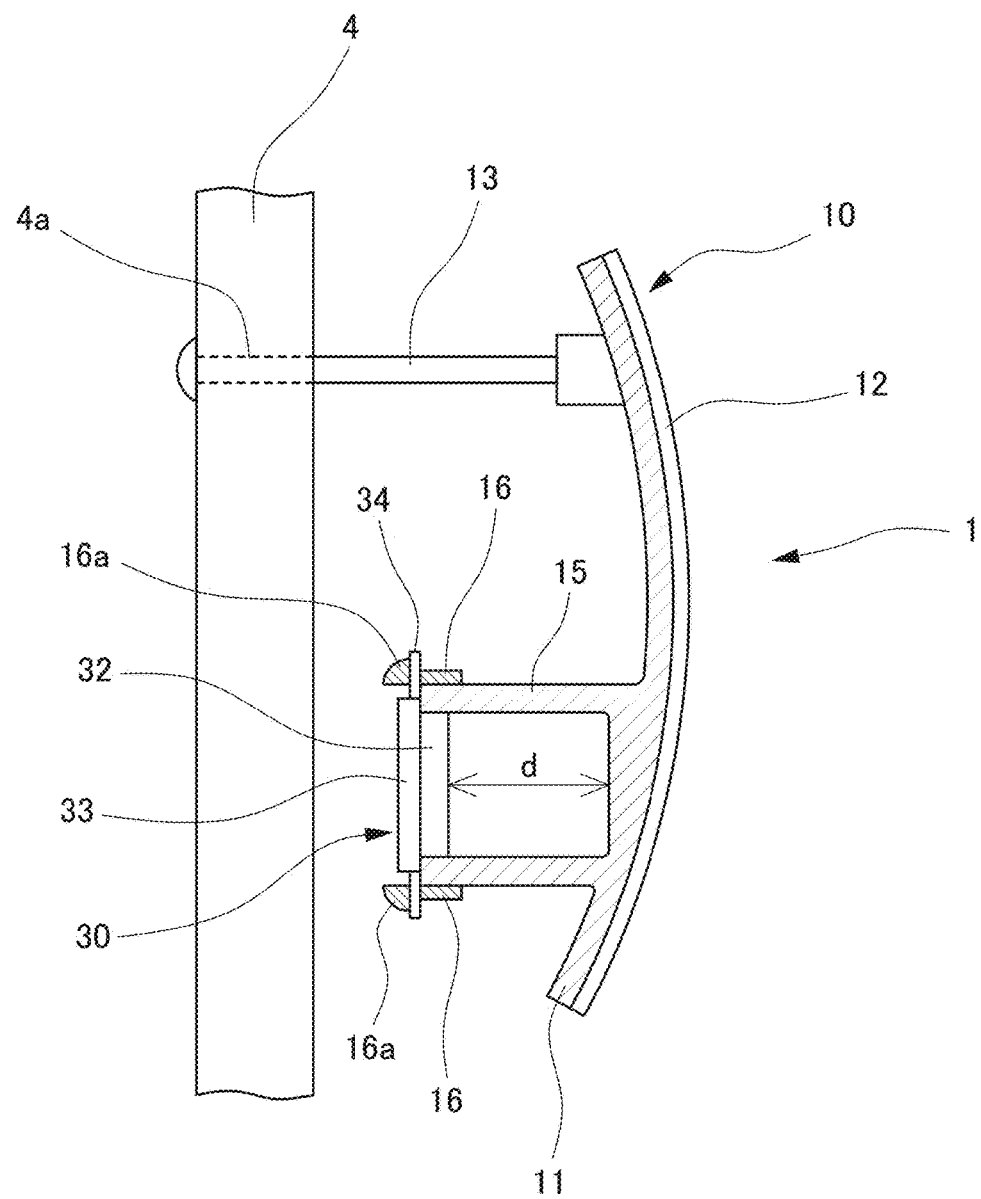
FIG. 9 is a sectional view showing a state where the vehicle decorative component according to the present embodiment is attached to a base member.

The claw portions 16 provided on the side of the ornament unit 10 are parts extending toward the outer side from an outer edge of the rib 15 as shown in FIG. 4, and are provided at positions corresponding to the engagement holes 34a. That is, the claw portions 16 correspond to a fixing portion that fixes the light source unit 30, and are engaged with the engagement holes 34a for assembling the light source unit 30 to the ornament unit 10 as shown in FIG. 8. As described above, the plurality of engagement hole forming portions 34 is formed in the light source unit 30. As many claw portions 16 as the engagement hole forming portions 34 are formed in the ornament unit 10. Formation positions of the claw portions are positions corresponding to the engagement hole forming portions 34.

A shape of each of the claw portions 16 will be described in detail. A substantially U shaped groove is formed in a part of the claw portion 16 extending out from the rib 15. A hook shaped portion 16a whose leading end has a hook shape is formed inside this groove, and a surrounding portion 16b that surrounds the hook shaped portion 16a is formed outside the groove part (refer to FIG. 8).

For assembling the light source unit 30 to the ornament unit 10, when the light source unit 30 is pressed onto the back surface of the ornament unit 10 in a state where the light source unit 30 is set at a predetermined position, the hook shaped portions 16a of the claw portions 16 are abutted with the engagement hole forming portions 34 of the light source unit 30. Thereby, the hook shaped portions 16a are warped so that the leading ends are introduced into the engagement holes 34a. After that, the hook shaped portions 16a are restored to the original state (state before being warped) at the time point when the hook shaped portions are completely inserted into the engagement holes 34a. Thereby, the hook shaped portions 16a are engaged with the engagement holes 34a (in other words, the hook shaped portions 16a are hanged onto the engagement hole forming portions 34).

As described above, in the present mode, the claw portions 16 are provided on the side of the ornament unit 10, the engagement holes 34a are provided on the side of the light source unit 30, and by engaging the claw portions 16 with the engagement holes 34a, the light source unit 30 is assembled to the ornament unit 10 by the snap-fit method. By adopting the assembling method by the snap-fit method in such a way, in comparison to a configuration that the light source unit 30 is assembled to the ornament unit 10 by screwing, the number of components can be reduced. Further, in the present embodiment, the engagement hole forming portions 34 forming the engagement holes 34a extend upward or downward from the outer edge of the holder 33. Thus, the light source unit 30 can be assembled to the ornament unit 10 to not block the light emitted from the light emission surface 32a of the light guiding body 32.

When the light source unit 30 is assembled to the ornament unit 10, a part of the light source unit 30 (more specifically, the engagement hole forming portions 34 formed on the outer edge of the holder 33) is abutted with the rib 15. Thereby, the light source unit 30 is positioned with respect to the ornament unit 10, and the lamp 31 and the light guiding body 32 are accommodated in the rib 15. In a state where the light source unit 30 is positioned with respect to the ornament unit 10, a gap (denoted by the reference sign d in FIG. 9) between the light guiding body 32 and the ornament unit 10 (specifically, the ornament base material 11 of the light emittable region 10a) is adjusted to become a predetermined distance. The predetermined distance is a distance of the gap between the light guiding body 32 and the ornament unit 10, the distance being set in such a manner that illumination intensity at the time of emitting the light by the light emitting region 1a becomes desired illumination intensity to obtain a favorable illumination effect.

That is, in the present embodiment, the rib 15 extending from the back surface of the ornament unit 10 is abutted with the light source unit 30 (specifically, the engagement hole forming portions 34 formed on the outer edge of the holder 33) at the time of assembling the light source unit 30 to the ornament unit 10, and functions as a positioning portion that places the light source unit 30 at such a position that the above gap d becomes the predetermined distance. By providing such a rib 15 serving as the positioning portion on the side of the ornament unit 10, the light source unit 30 is assembled to the back surface side of the ornament unit 10 in such a manner that the above gap d becomes the predetermined distance.

At the time of bringing the light source unit 30 into contact with the rib 15, when a gap (gap between the light source unit 30 and the rib 15) exists in the vicinity of the contact part, backlash of the light source unit 30 is generated. Thus, in order to suppress this backlash, a member for filling the above gap such as an unwoven cloth may be installed.

After the light source unit 30 is assembled to the ornament unit 10, as described above, the ornament unit 10 is fixed to the lower base 4. At this time, the bosses 13 and the engagement projection 14 provided on the side of the ornament unit 10 are fastened to the lower base 4. The part to be fastened to the lower base 4 is also provided on the side of the light source unit 30. Specifically speaking, a boss 35 and engagement projections 36 are formed on a back surface (that is, the surface on the opposite side of the light emission surface 32a) of the light guiding plate serving as the light guiding body 32 (refer to FIG. 4). The boss 35 is a part fitted into a boss hole 4c formed on the lower base 4 at a corresponding position, and screwed and fixed in such a state. The engagement projections 36 are parts fitted into fitting holes 4d formed on the lower base 4 at corresponding positions, and snap-fit combined to the lower base 4.

The boss 35 and the engagement projections 36 described above correspond to a light source unit side fixing portion, and extend outward from the back surface (that is, the surface on the opposite side of the light emission surface 32a) of the light guiding plate serving as the light guiding body 32. By fastening the boss 35 and the engagement projections 36 described above to the lower base 4, the light source unit 30 is fixed to the lower base 4. When the boss 35 and the engagement projections 36 are provided on the side of the light source unit 30 in such a way and these are fastened to the lower base 4, the light source unit 30 is assembled to the ornament unit 10 and also fixed to the lower base 4. Thus, the light source unit 30 can be more firmly fixed.

In the present embodiment, the boss 35 is formed in a center part in the longitudinal direction of the light guiding plate serving as the light guiding body 32 and in a center part in the direction crossing the longitudinal direction (refer to FIG. 4). The engagement projections 36 are respectively formed on the ends in the longitudinal direction of the light guiding plate (refer to FIG. 4). However, the present invention is not limited to this. As in FIG. 10A, the bosses 35 and the engagement projections 36 may be provided at positions along an outer edge of the light guiding plate, the positions being slightly close to the center from the outer edge. Alternatively, as in FIG. 10B, the bosses 35 and the engagement projections 36 may be provided to extend outward from the outer edge of the light guiding plate (strictly speaking, the outer edge of the holder 33).

Figure 10A:
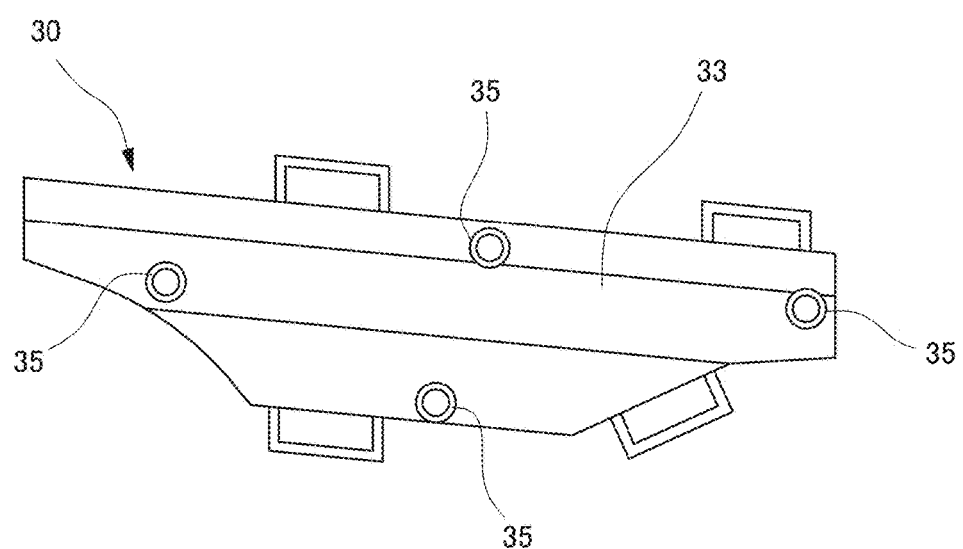
FIG. 10A is a front view showing a first modified example of a light guiding plate according to the present embodiment.
Figure 10B:
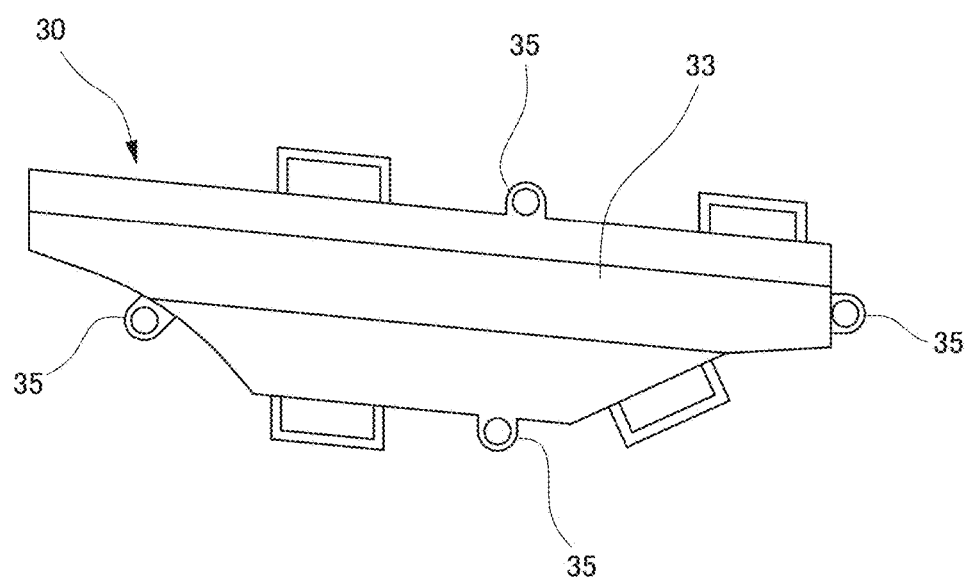
FIG. 10B is a front view showing a second modified example of the light guiding plate according to the present embodiment.
Figure 10C:
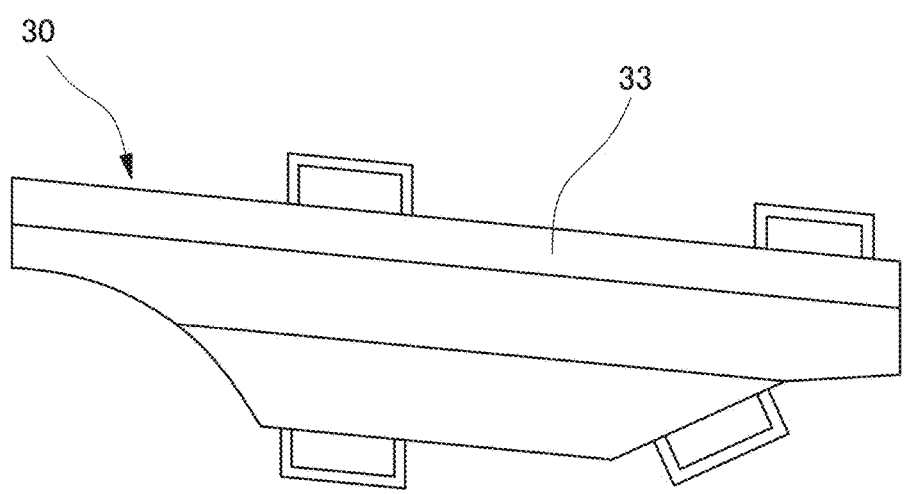
FIG. 10C is a front view showing a third modified example of the light guiding plate according to the present embodiment.

Further, as in FIG. 10C, the bosses 35 and the engagement projections 36 may be not provided on the side of the light source unit 30. That is, while assembling the light source unit 30 to the ornament unit 10, the light source unit may be not fixed to the lower base 4. However, from a point of more firmly fixing the light source unit 30, the above embodiment (that is, the configuration that the boss 35 and the engagement projections 36 are provided on the side of the light source unit 30) is preferable.

Assembling of Light Emitting Ornament 1

Next, assembling of the light emitting ornament 1 with the configuration described so far to the vehicle main body will be described.

Firstly, the parts forming the light emitting ornament 1 (specifically, the ornament unit 10 and the light source unit 30 described above) are prepared. After that, the light source unit 30 is assembled to the back surface side of the ornament unit 10. Specifically, the claw portions 16 provided on the rib 15 which extends from the back surface of the ornament unit 10 are engaged with the engagement holes 34a formed by the engagement hole forming portions 34 which protrude from the outer edge of the holder 33 of the light source unit 30.

When the claw portions 16 are engaged with the engagement holes 34a corresponding to the claw portions 16, the light source unit 30 is abutted with the above rib 15 and positioned with respect to the ornament unit 10. Thereby, the light source unit 30 is assembled to the ornament unit 10 in such a manner that the gap d between the light guiding plate serving as the light guiding body 32 and the light emittable region 10a of the ornament unit 10 becomes the predetermined distance. In such a stage, the light source unit 30 is surrounded by the rib 15 and arranged behind the light emittable region 10a of the ornament unit 10. Further, the harness H is extended for supplying the power source to the lamp 31 of the light source unit 30, and the connector 31b attached to the terminal end of the harness H is inserted into the jack 31a of the lamp 31.

Next, the ornament unit 10 to which the light source unit 30 is assembled, that is, the light emitting ornament 1 is attached and fixed to the lower base 4. Specifically, the bosses 13 and the engagement projection 14 extending from the back surface of the ornament unit 10 are fastened to the lower base 4. Further, in the present embodiment, as described above, the boss 35 and the engagement projections 36 are also formed on the side of the light source unit 30 (specifically, on the back surface of the light guiding plate), and these are fastened to the lower base 4.

By the above procedure, the light emitting ornament 1 is attached at a predetermined position of the vehicle door in a predetermined posture. More specifically speaking, in the present embodiment, the light emitting ornament 1 is attached at a position adjacent to the pull handle 5 in such a posture that the end on the side where the lamp 31 is attached in the longitudinal direction of the light emitting ornament 1 is placed on the front side of the vehicle.

In the present embodiment, as described above, before fixing the ornament unit 10 to the lower base 4, the light source unit 30 is assembled to the ornament unit 10. In such a way, by performing a task of assembling the light source unit 30 to the ornament unit 10 before a task of fixing the ornament unit 10 to the lower base 4, workability is somewhat improved in comparison to a case where the task of assembling is performed after implementing the task of fixing.

Vehicle Decorative Component According to Modified Example

In the above embodiment (also referred to as the basic example below), the configuration that the ornament unit 10 to which the light source unit 30 is assembled is fixed to the lower base 4 by the bosses 13 and the engagement projection 14 formed on the back surface thereof is described. However, an attachment style of the vehicle decorative component which is different from the style of the basic example is considered.

Hereinafter, as a modified example of a vehicle decorative component according to and embodiment of the present invention, a light emitting ornament 41 in which a different attachment style from the basic example is adopted will be described with reference to FIGS. 17 to 33. Except points to be described below, a configuration of the light emitting ornament 41 according to the modified example is the substantially same as the configuration of the light emitting ornament 1 according to the basic example.

Figure 17:
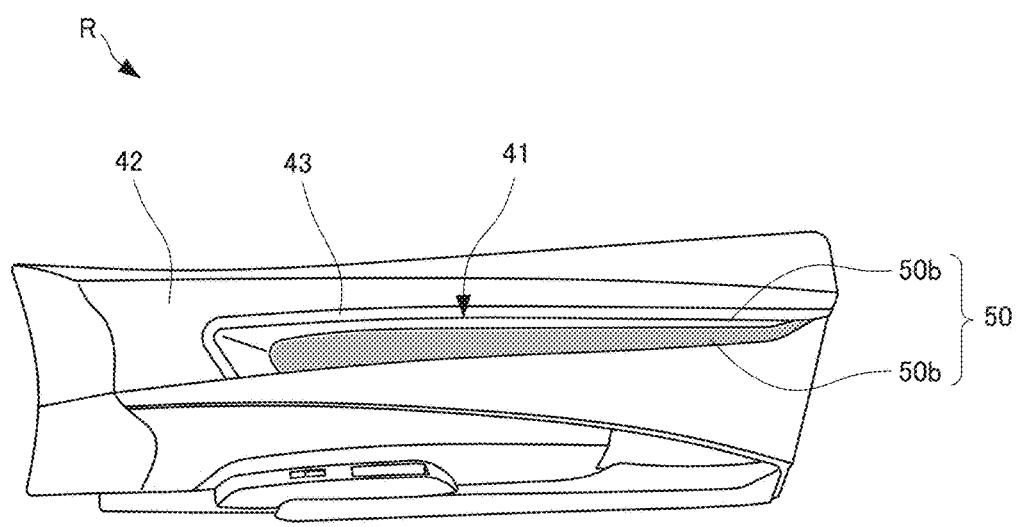
FIG. 17 is a perspective view showing a vehicle door lining utilizing a vehicle decorative component according to a modified example.
Figure 18:
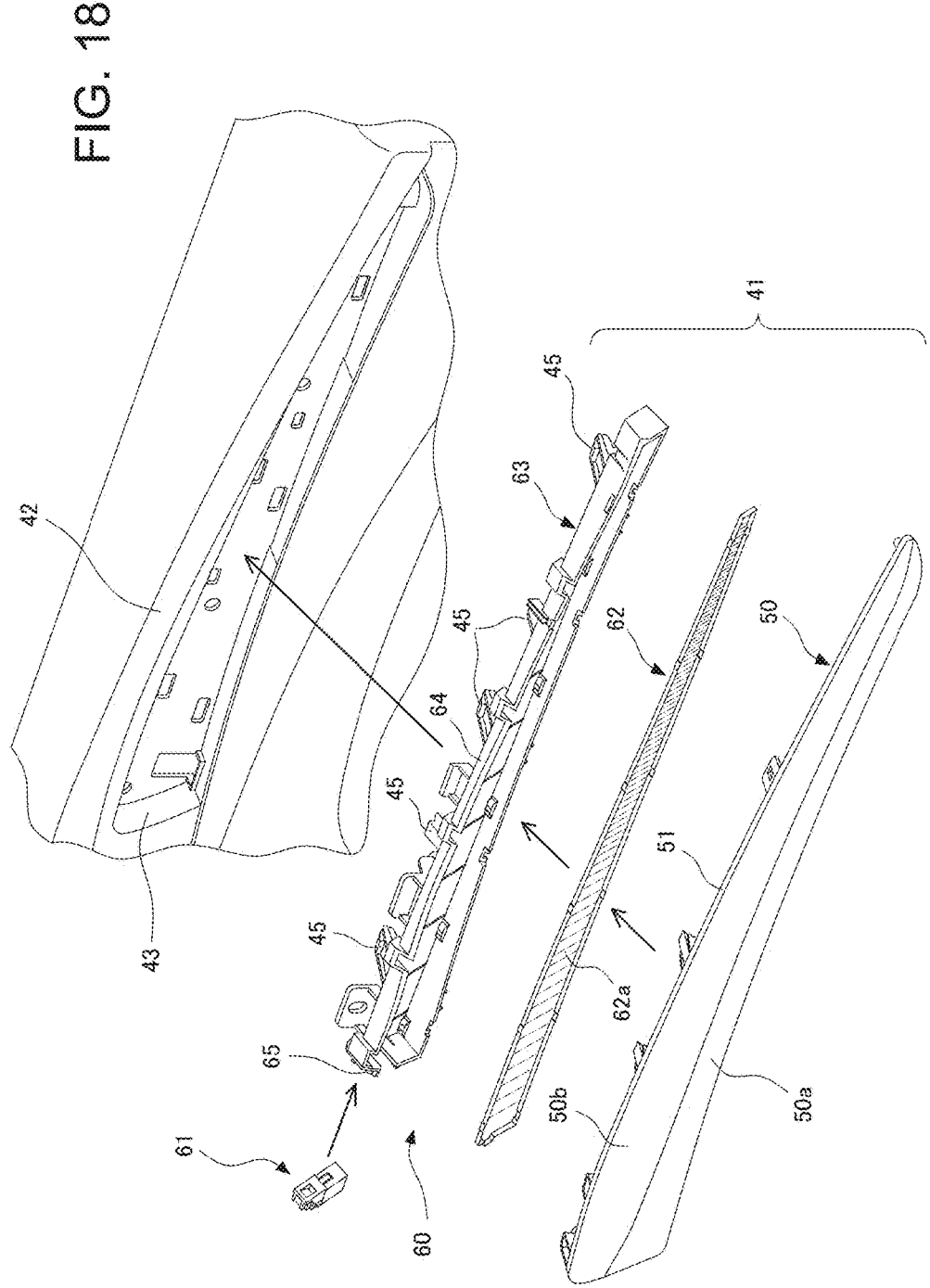
FIG. 18 is an exploded perspective view of the vehicle decorative component according to the modified example.

The light emitting ornament 41 according to the modified example (referred to as the light emitting ornament 41 below) is a door lining component of a vehicle door as shown in FIG. 17, and functions as an illumination device. In such a point, the light emitting ornament 41 is common to the light emitting ornament 1 according to the basic example. As shown in FIG. 18, the light emitting ornament 41 is attached to an accommodation case 43 provided in a door lining main body 42. The door lining main body 42 is a part of the vehicle door lining R excluding the light emitting ornament 41, and corresponds to a base member in the modified example.

Figure 19:
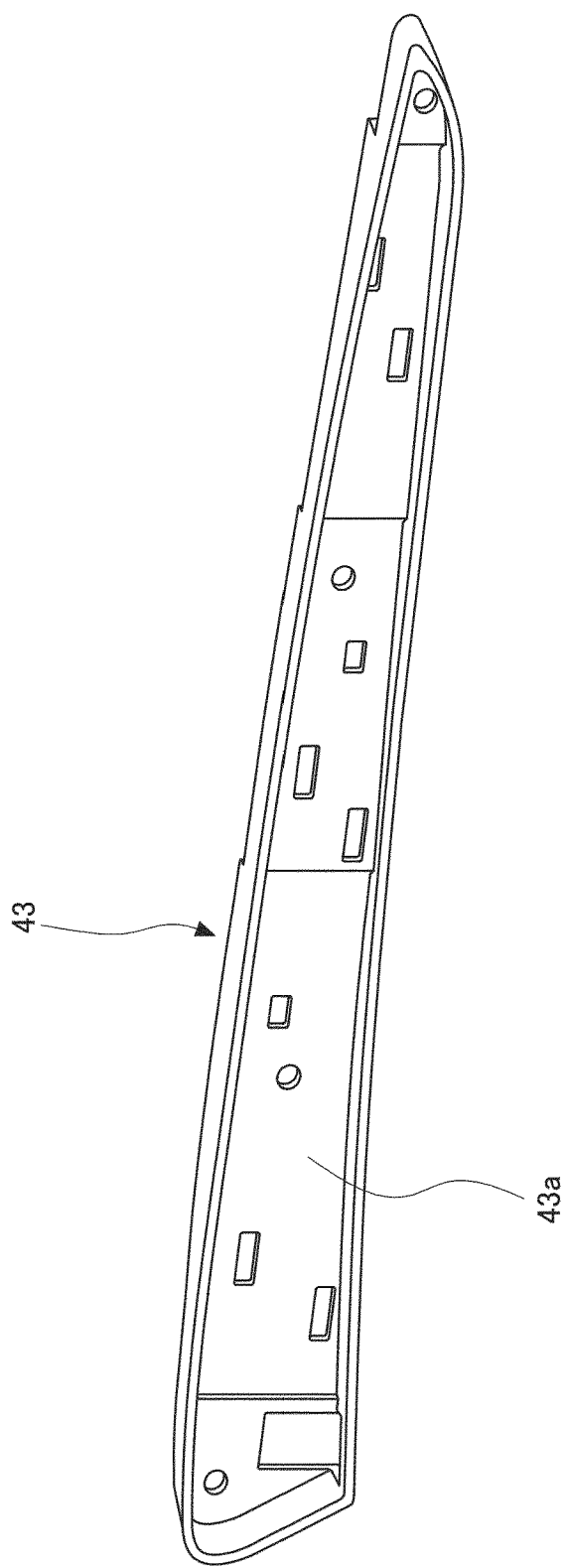
FIG. 19 is a perspective view of an accommodation case.

More specifically speaking, the accommodation case 43 is a frame body formed along an outer shape of the light emitting ornament 41. As shown in FIG. 19, the accommodation case is provided with an opening on the vehicle interior side and has a bottom wall 43a on the opposite side of the opening. The light emitting ornament 41 is attached to the door lining main body 42 by being fitted inside the accommodation case 43 from the above opening.

Figure 20:
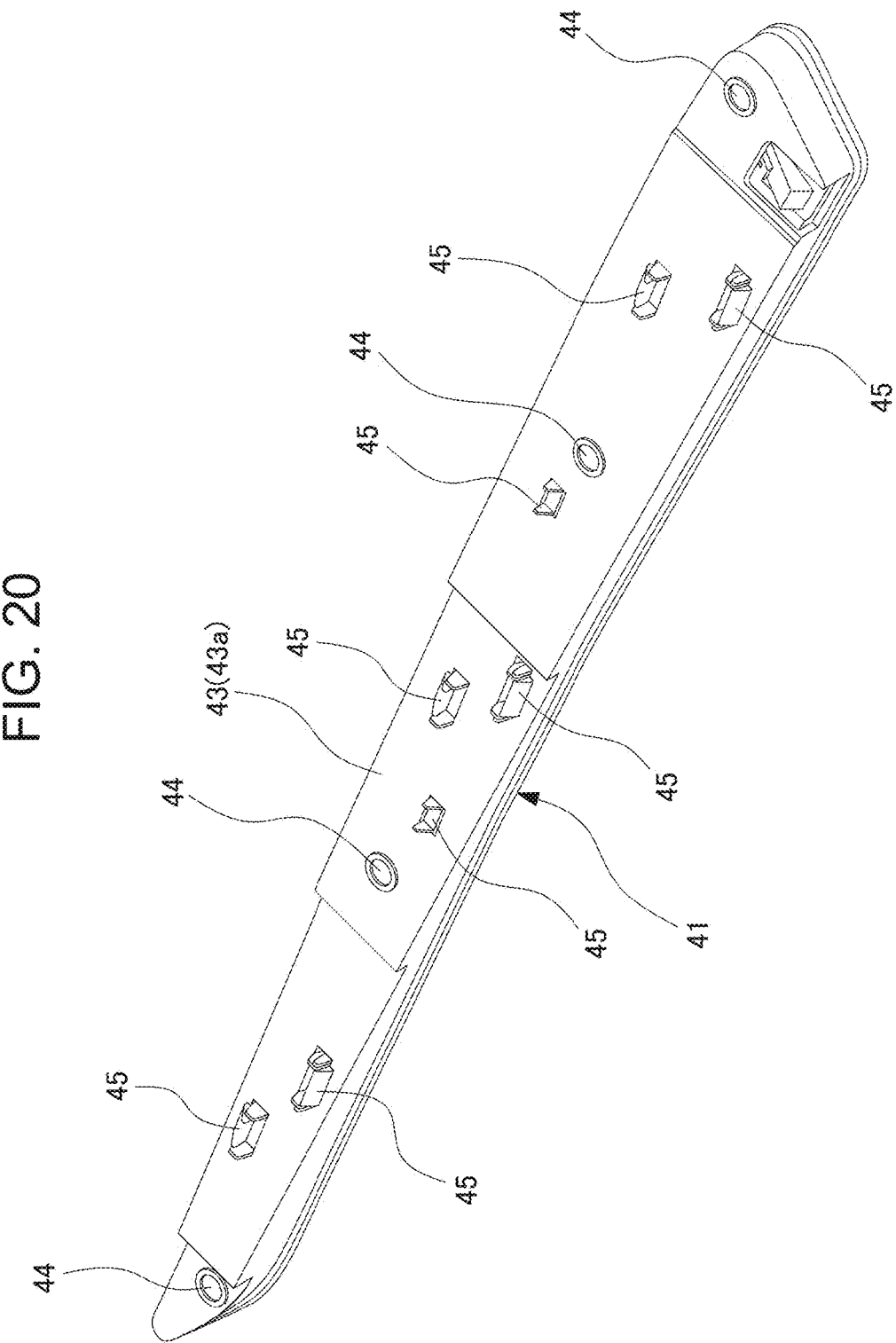
FIG. 20 is a perspective view showing the back side of the vehicle decorative component according to the modified example.

In order to fix the light emitting ornament 41 in a state where the light emitting ornament is fitted into the accommodation case 43, as shown in FIG. 19, a plurality of holes is formed on the bottom wall 43a of the accommodation case 43. As shown in FIG. 20, by inserting screws 44 into the above holes, fitting protruding claws 45 protruding from a back surface of the light emitting ornament 41 (more specifically, a holder 63 to be described later) into the above holes, or the like, the light emitting ornament 41 is fixed to the accommodation case 43.

The light emitting ornament 41 will be described in detail. As shown in FIG. 18, the light emitting ornament 41 is a module formed by combining an ornament unit 50 serving as a decorative unit, and a light source unit 60 serving as an irradiation body. An assembling task of the light emitting ornament 41 will be described later in detail.

The ornament unit 50 includes an ornament base material and a decorative film as well as the ornament unit 10 according to the basic example, and has a light emittable region 50a that emits the light and the a non-light emitting region 50b that does not emit the light as shown in FIG. 17. A part of the ornament base material corresponding to the light emittable region 50a corresponds to a transmissive body in the modified example.

In a state where the light emitting ornament 41 is set up, the ornament unit 50 is placed on the front side of the light source unit 60. More specifically speaking, the ornament unit 50 is brought close and assembled to the holder 63 from the front side of the holder 63 to be described later. The front side of the holder 63 indicates the near side when seen from a light emission surface 62a provided in a light guiding body 62 in a state where the light guiding body 62 is assembled to the holder 63.

As a method of assembling the ornament unit 50 to the holder 63, a known method can be utilized. However, for assembling the ornament unit 50 from the front side of the holder 63, the snap-fit method, a convexo-concave fitting method, and the like are preferable.

Figure 21:
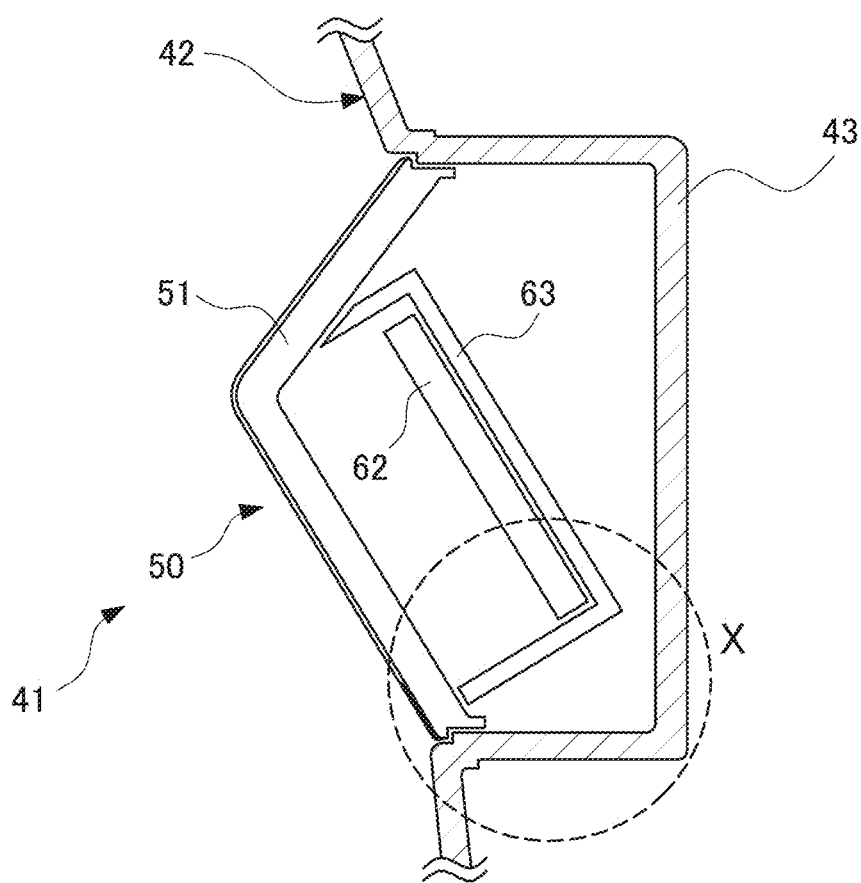
FIG. 21 is a sectional view showing an attachment structure of the vehicle decorative component according to the modified example.

When the light emitting ornament 41 is attached to the door lining main body 42, as shown in FIG. 21, an outer edge of the ornament unit 50 is bonded to the door lining main body 42, more specifically to a marginal part of the opening formed in the accommodation case 43. When a gap is provided at a bonding point between the ornament unit 50 and the door lining main body 42 at the time of irradiating the light by the light source unit 60 in the light emitting ornament 41, there is a possibility that the light is leaked out through the gap. As a method of suppressing such leakage of the light, a leakage prevention member such as an unwoven cloth is thought to be tucked into the bonding point between the ornament unit 50 and the door lining main body 42. However, when the leakage prevention member is used, the number of components accordingly increases and the cost increases.

Figure 22:
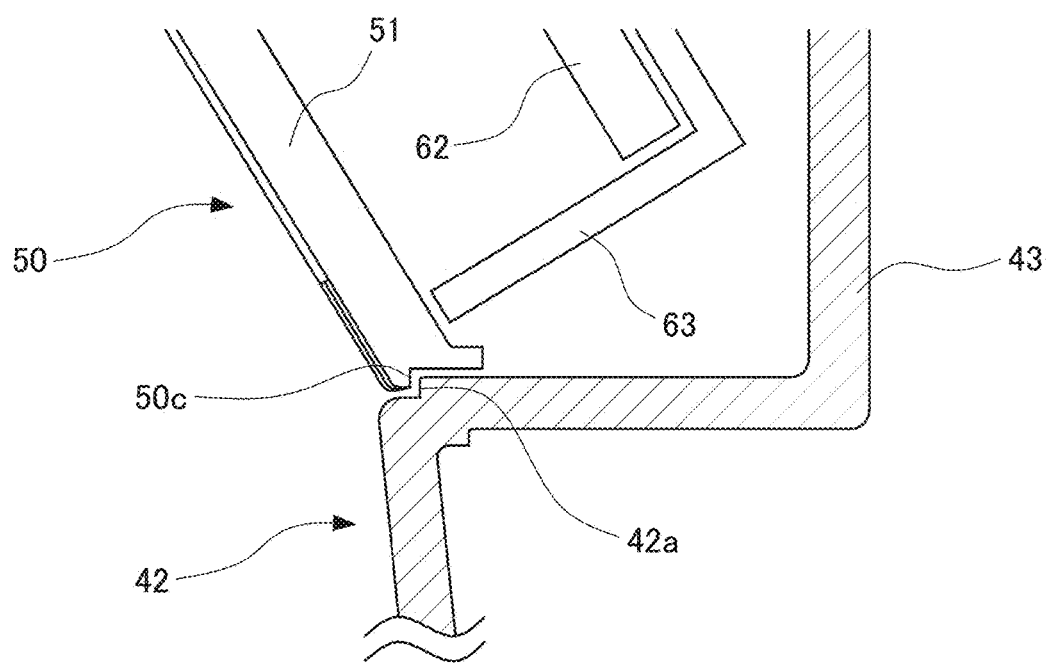
FIG. 22 is an enlarged view of a range X of FIG. 21.

In the modified example, in order to suppressed the above leakage of the light, a part of the door lining main body 42 to be butted with the outer edge of the ornament unit 50 is slightly recessed on the opposite side of the side where the ornament unit 50 is placed to form a step portion 42a as shown in FIG. 22. A step portion 50c opposing to the step portion 42a is also formed on the outer edge of the ornament unit 50. The light emitting ornament 41 is attached to the door lining main body 42 in such a manner that the step portions 42a and 50c are bonded to each other. Thereby, the light emitted from the light source unit 60 in the light emitting ornament 41 can be suppressed from being leaked out from the bonding point between the ornament unit 50 and the door lining main body 42.

Figure 23:
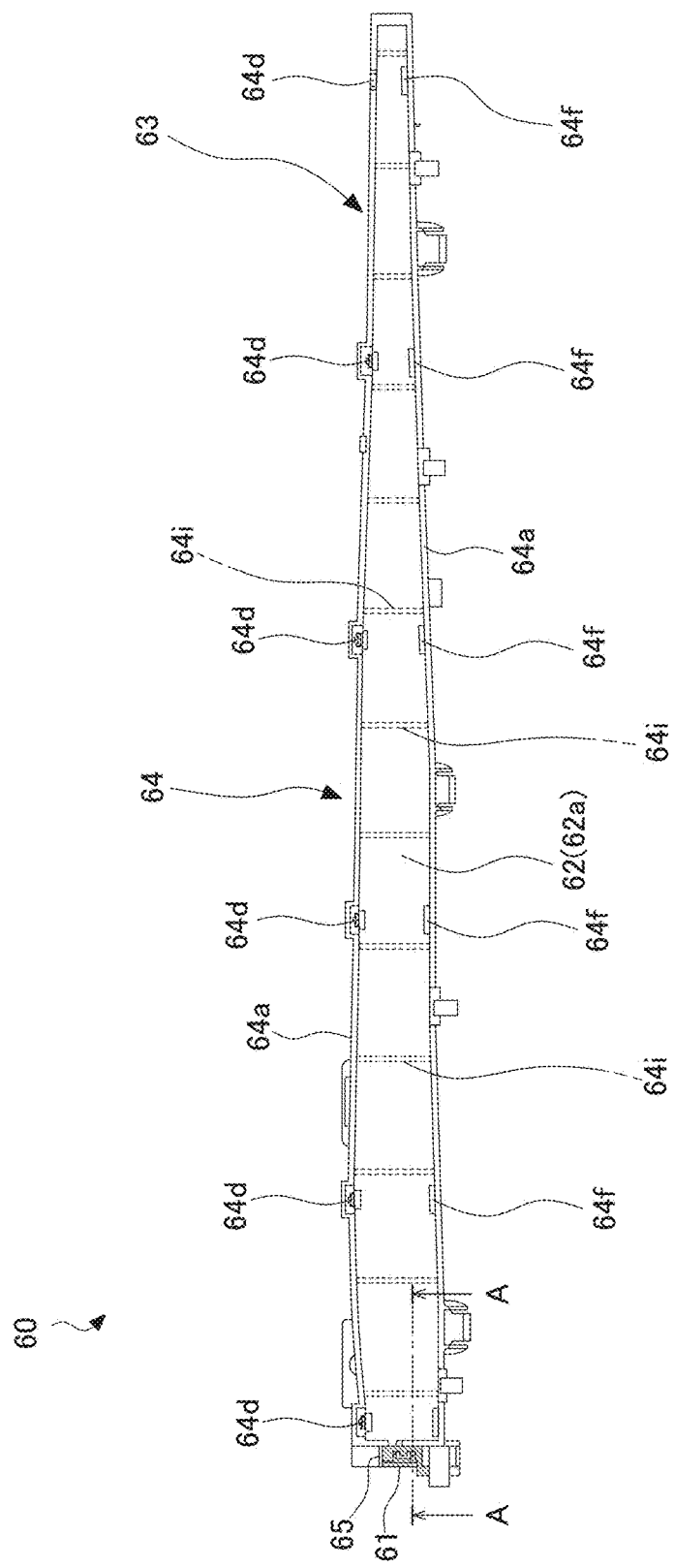
FIG. 23 is a front view of a light source unit according to the modified example.

As shown in FIG. 23, the light source unit 60 has a LED lamp (simply referred to as the lamp below) 61 serving as a light source, the light guiding body 62 including the light emission surface 62a that emits the light from the lamp 61, and the holder 63 that holds the lamp 61 and the light guiding body 62. The light guiding body 62 according to the modified example is formed by a light guiding plate elongated in the predetermined direction as well as the basic example.

Figure 24:
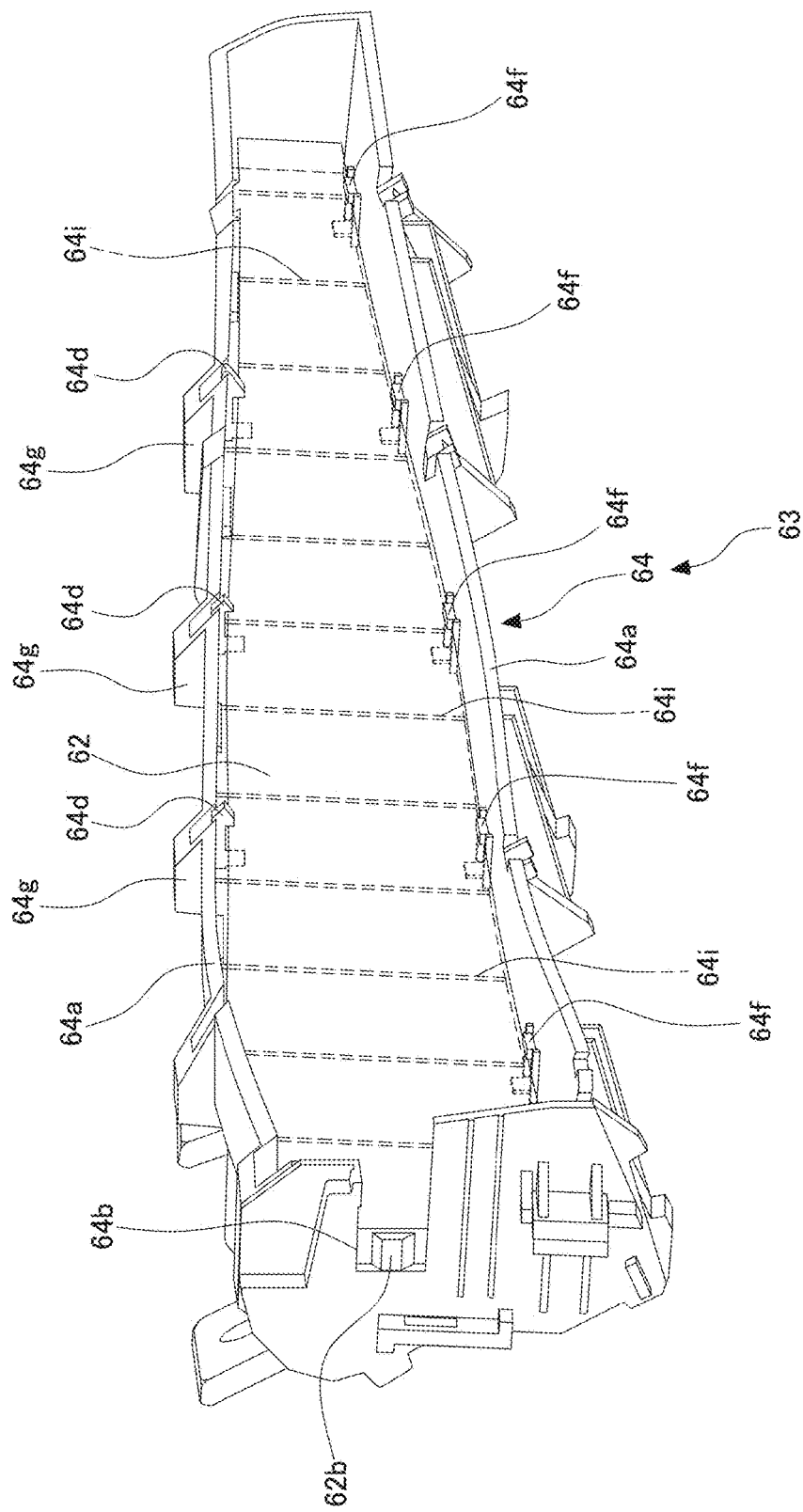
FIG. 24 is a perspective view showing a state where a light guiding body is held by a light guiding body holding portion of a holder according to the modified example.
Figure 25:
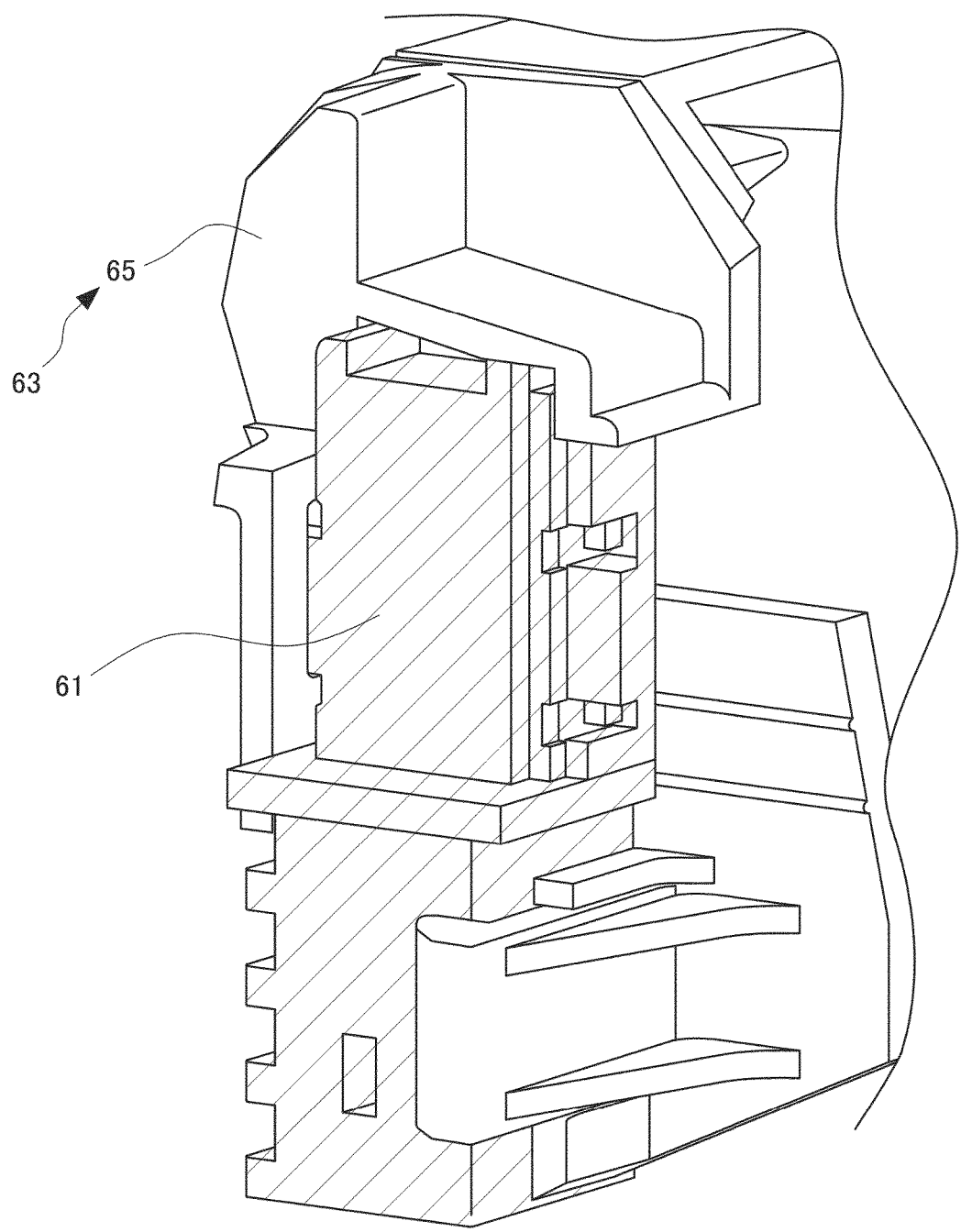
FIG. 25 is a perspective view showing where a lamp is held by a lamp holding portion of the holder according to the modified example.

In the light source unit 60, the lamp 61 and the light guiding body 62 are arranged at positions adjacent to each other. More specifically speaking, a lengthy case shaped light guiding body holding portion 64 shown in FIG. 24 is formed in the holder 63, and further, a lamp holding portion 65 shown in FIG. 25 is formed in one end in the longitudinal direction of the light guiding body holding portion 64. When the light guiding body 62 is assembled to the light guiding body holding portion 64 and the lamp 61 is assembled to the lamp holding portion 65, the lamp 61 is arranged at a position adjacent to one end in the longitudinal direction of the light guiding body 62. When the lamp 61 is lit in such a state, the light from the lamp 61 is incident on the one end in the longitudinal direction of the light guiding body 62 and advances toward the other end in the longitudinal direction of the light guiding body 61 while being diffused in the light guiding body 62. Thereby, the light from the light emission surface 62a of the light guiding body 62 is incident toward the front side of the light emission surface 62a.

As shown in FIG. 18, the light guiding body 62 is brought close to the holder 63 from the front side of the holder 63 and assembled to the light guiding body holding portion 64. The front side of the holder 63 indicates the near side in the direction passing through the paper plane in FIG. 23.

As shown in FIG. 18, the lamp 61 is brought close to the holder 63 from the side of the holder 63, more specifically, from the side of the lamp holding portion 65, and assembled to the lamp holding portion 65.

When the light from the lamp 61 can be efficiently incident on the light guiding body 62, the light can be properly emitted from the light emission surface 62a of the light guiding body 62 by a fewer number of lamp 61. From such a reason, in the modified example, a highly efficient lamp 61 is used as the light source, and further, a protruding portion 62b protruding toward the lamp 61 is formed in the one end in the longitudinal direction of the light guiding body 62, the end being adjacent to the lamp 61.

The above protruding portion 62b will be described with reference to FIG. 26. In a state where the lamp 61 and the light guiding body 62 are held by the holder 63, the protruding portion 62b is arranged at a position adjacent to the lamp 61 over a predetermined clearance. More specifically speaking, a cutout 64b is formed in a part of a frame wall 64a formed to surround the light guiding body 62 in the light guiding body holding portion 64, the part being adjacent to the lamp 61. In a state where the light guiding body 62 is assembled to the light guiding body holding portion 64, the protruding portion 62b is arranged in the above cutout 64b to face the lamp 61.

Since the above protruding portion 62b is formed in the one end in the longitudinal direction of the light guiding body 62 as described above, the part of the light guiding body 62 on which the light from the lamp 61 is incident can be brought closer to the lamp 61. Thereby, the light from the lamp 61 can be efficiently incident on the light guiding body 62. As a result, even when one lamp 61 is used, the light can be properly emitted from the light emission surface 62a of the light guiding body 62.

For efficiently letting the light from the lamp 61 incident on the light guiding body 62, there is a need for constantly maintaining the clearance between the light guiding body 62 (strictly speaking, the protruding portion 62b) and the lamp 61. here is a possibility that the above clearance spreads due to vibration unavoidably generated at the time of vehicle running. Therefore, in the modified example, a mechanism of positioning the light guiding body 62 with respect to the holder 63 is provided.

Figure 26:
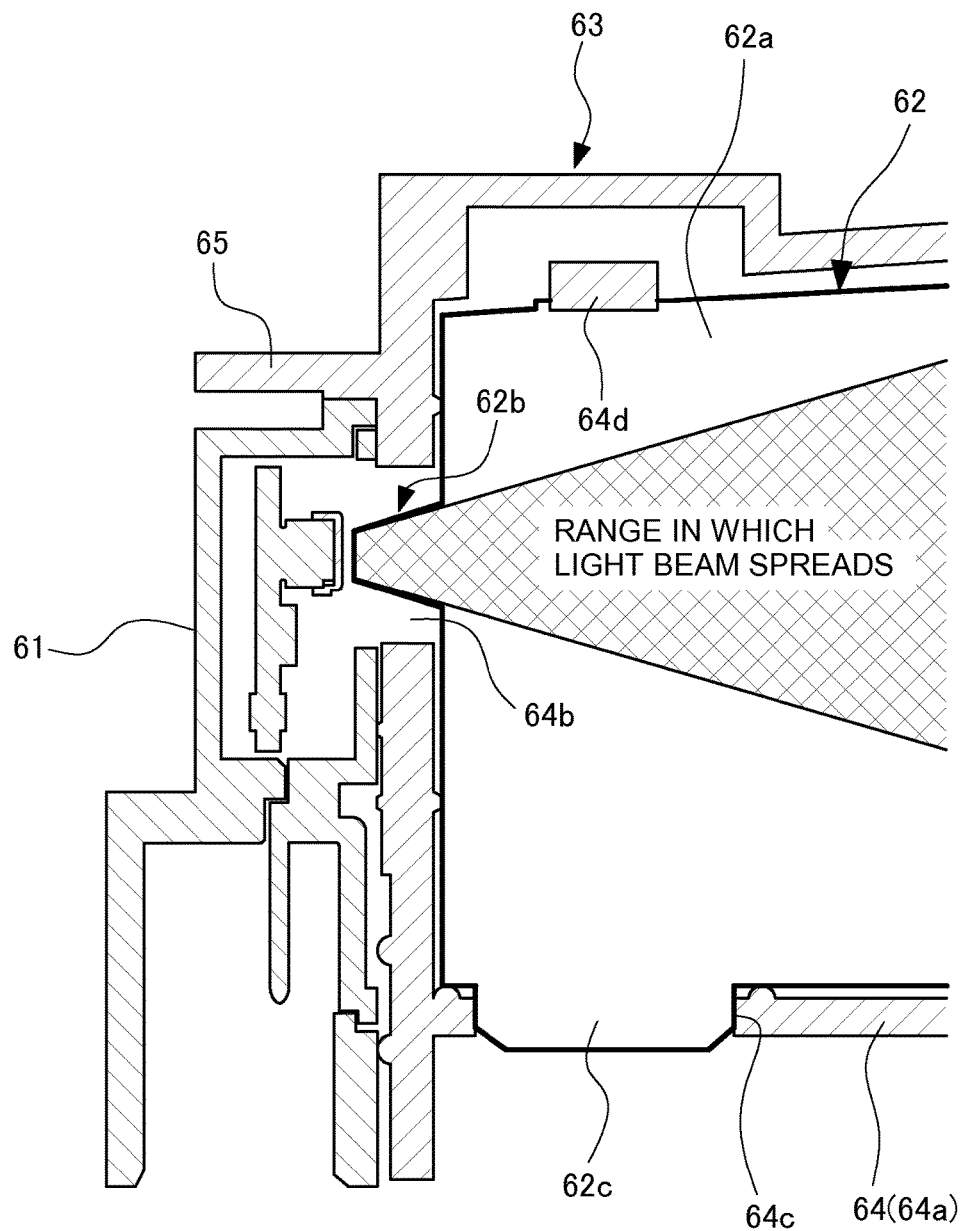
FIG. 26 is a sectional view showing the lamp held by the holder according to the modified example and a peripheral structure thereof.

Specifically speaking, as shown in FIG. 26, the holder 63 has a positioning hole 64c formed for positioning the light guiding body 62. This positioning hole 64c is formed in an end of the frame wall 64a provided in the light guiding body holding portion 64, the end on the side close to the lamp 61. The light guiding body 62 has a convex portion 62c in the one end in the longitudinal direction adjacent to the lamp 61. This convex portion 62c protrudes in the direction crossing the protruding direction of the above protruding portion 62b, specifically in the height direction of the light guiding body 62. At the time of assembling the light guiding body 62 to the light guiding body holding portion 64, the above convex portion 62c is fitted into the positioning hole 64c of the holder 63. Thereby, the light guiding body 62 is positioned with respect to the holder 63. Even when the vibration is generated at the time of the vehicle running, the clearance between the light guiding body 62 and the lamp 61 can be constantly maintained.

The part of the light guiding body 62 where the convex portion 62c is provided is the one end in the longitudinal direction, that is, the end on the side adjacent to the lamp 61. Thus, the light guiding body 62 can be positioned without influencing the light emission. More specifically speaking, the light from the lamp 61 spreads in a radial manner as shown in FIG. 26. Therefore, as shown in the figure, the light from the lamp 61 is not delivered to an upper end and a lower end of the one end in the longitudinal direction of the light guiding body 62. When the convex portion 62c for positioning is formed in such a part, the light guiding body 62 can be positioned without influencing the light emission.

Figure 27:
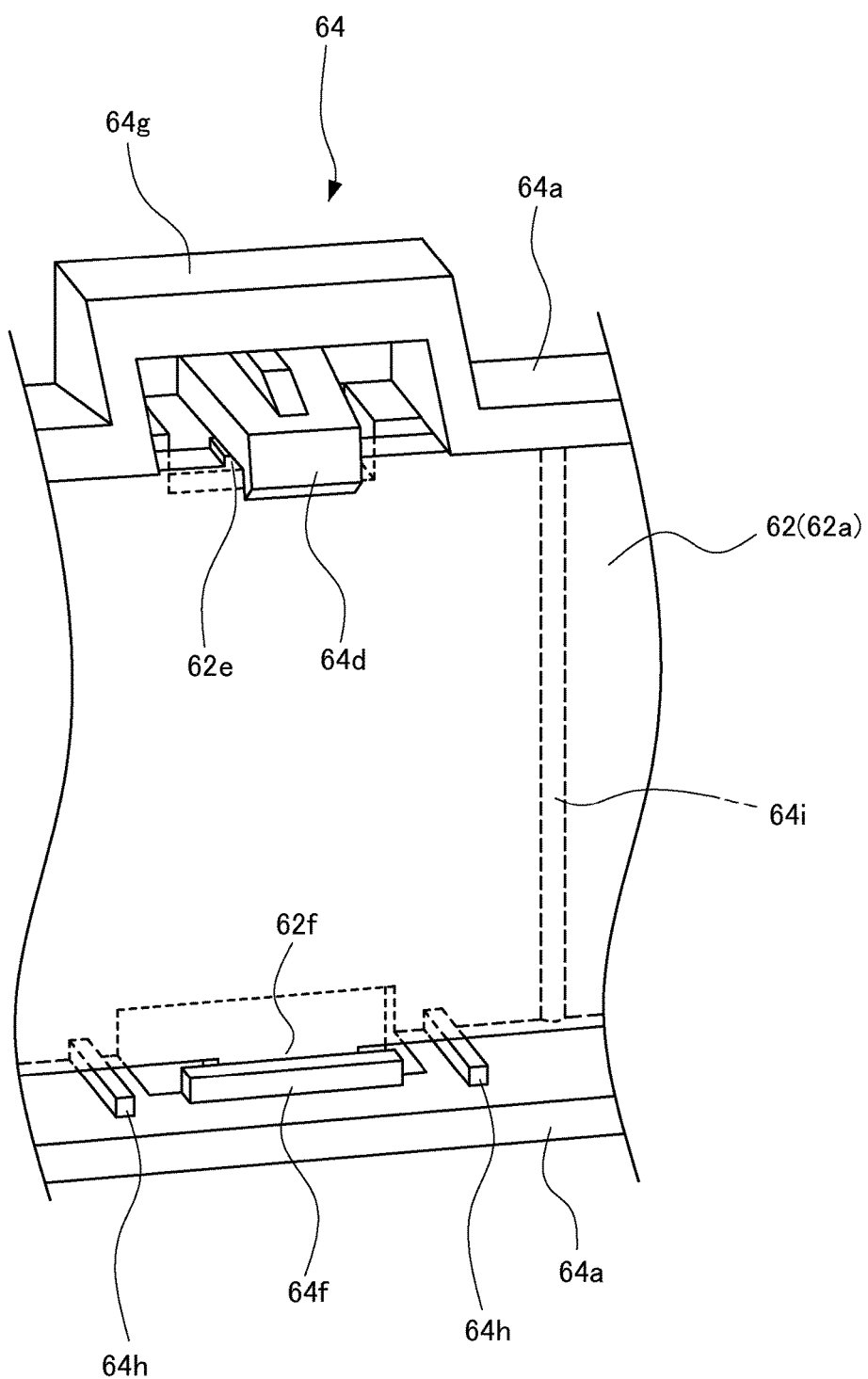
FIG. 27 is a perspective view showing an assembling mechanism for assembling the light guiding body to the holder according to the modified example.

As a method of assembling the light guiding body 62 to the light guiding body holding portion 64 of the holder 63, the snap-fit method is adopted as shown in FIG. 27. That is, by hooking engagement claw portions 64d formed in the light guiding body holding portion 64 onto the light guiding body 62, the light guiding body 62 is held by the holder 63. In a case where the light guiding body 62 is assembled to the light guiding body holding portion 64 by the snap-fit method, a gap is unavoidably generated between a surface of the light guiding body 62 provided on the opposite side of the light emission surface 62a, that is, a back surface and the light guiding body holding portion 64. With such a gap, backlash is caused in the light guiding body 62, and a noise is generated. In particular, the backlash of the light guiding body 62 is furthermore remarkably generated at the time of the vehicle running As a way for suppressing the backlash of the light guiding body 62 as described above, for example, it is thought that a seal member such as an unwoven cloth is used to fill the above gap. However, due to use of the seal member, the number of components is increased and the cost is increased. When the light advancing in the light guiding body 62 comes out from the back surface of the light guiding body 62 to the gap, the light is reflected by the holder 63 to be incident into the light guiding body 62 again. However, the seal member is provided in the gap, the light cannot be properly reflected in a part where the seal member is provided.

For this, in the modified example, a backlash suppression mechanism is provided in the holder 63 itself so that the backlash of the light guiding body 62 can be suppressed while covering the above disadvantage. Hereinafter, the backlash suppression mechanism provided in the holder 63 itself will be described.

For describing the backlash suppression mechanism provided in the holder 63 itself, first, a configuration of the light guiding body 62 in the modified example will be described.

Figure 28:
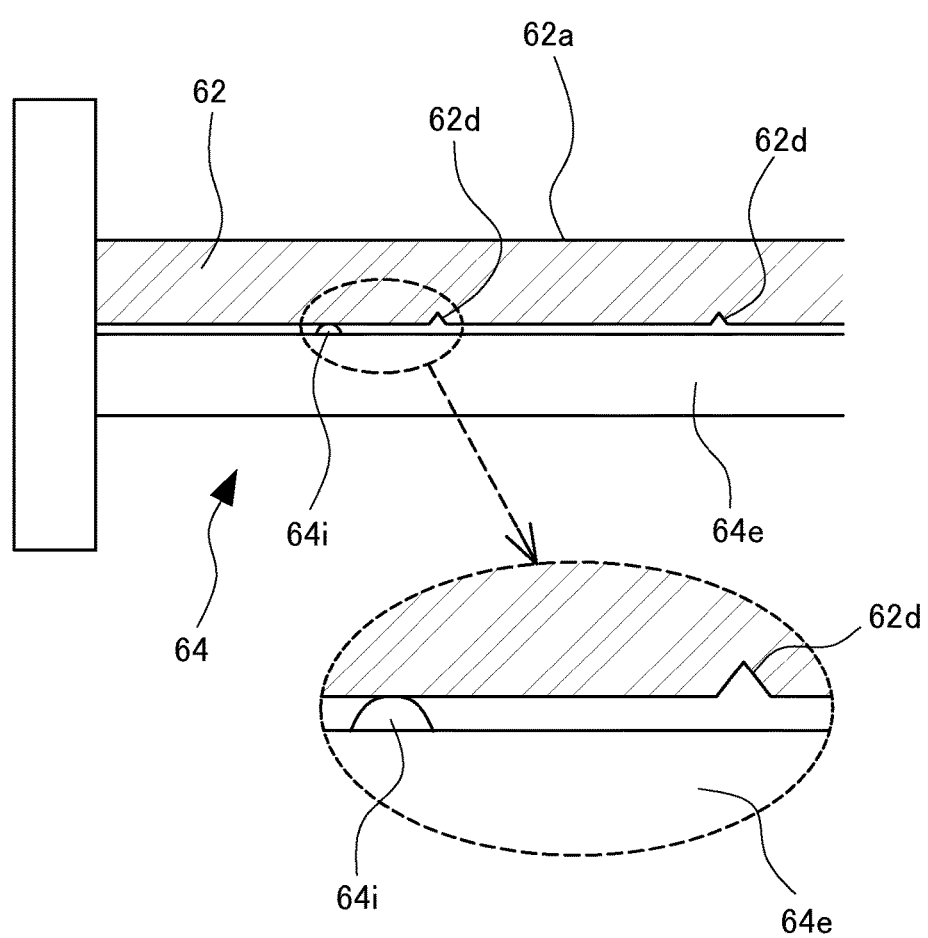
FIG. 28 is a top view in which the holder according to the modified example and the light guiding body are seen from the upper side.

The light guiding body 62 in the modified example is formed by the lengthy light guiding plate as described above, and manufactured by injection molding in particular. A plurality of wedge shaped cutouts (referred to as the prism portions 62d below) shown in FIG. 28 is provided on the back surface of the light guiding body 62. As shown in FIG. 28, the prism portions 62d are formed along the height direction of the light guiding body 62, and the plurality of prism portions is provided side by side along the longitudinal direction of the light guiding body 62. Thereby, the light advancing toward the other end in the longitudinal direction from the one end in the longitudinal direction of the light guiding body 62 is appropriately reflected at intermediate positions so that intensity of the light emitted from parts of the light emission surface 62a of the light guiding body 62 can be made uniform. A pitch between the prism portions 62d is set to be a value determined as an optimal pitch for making uniform the intensity of the light emitted from the parts of the light emission surface 62a by optical simulation.

Figure 29:
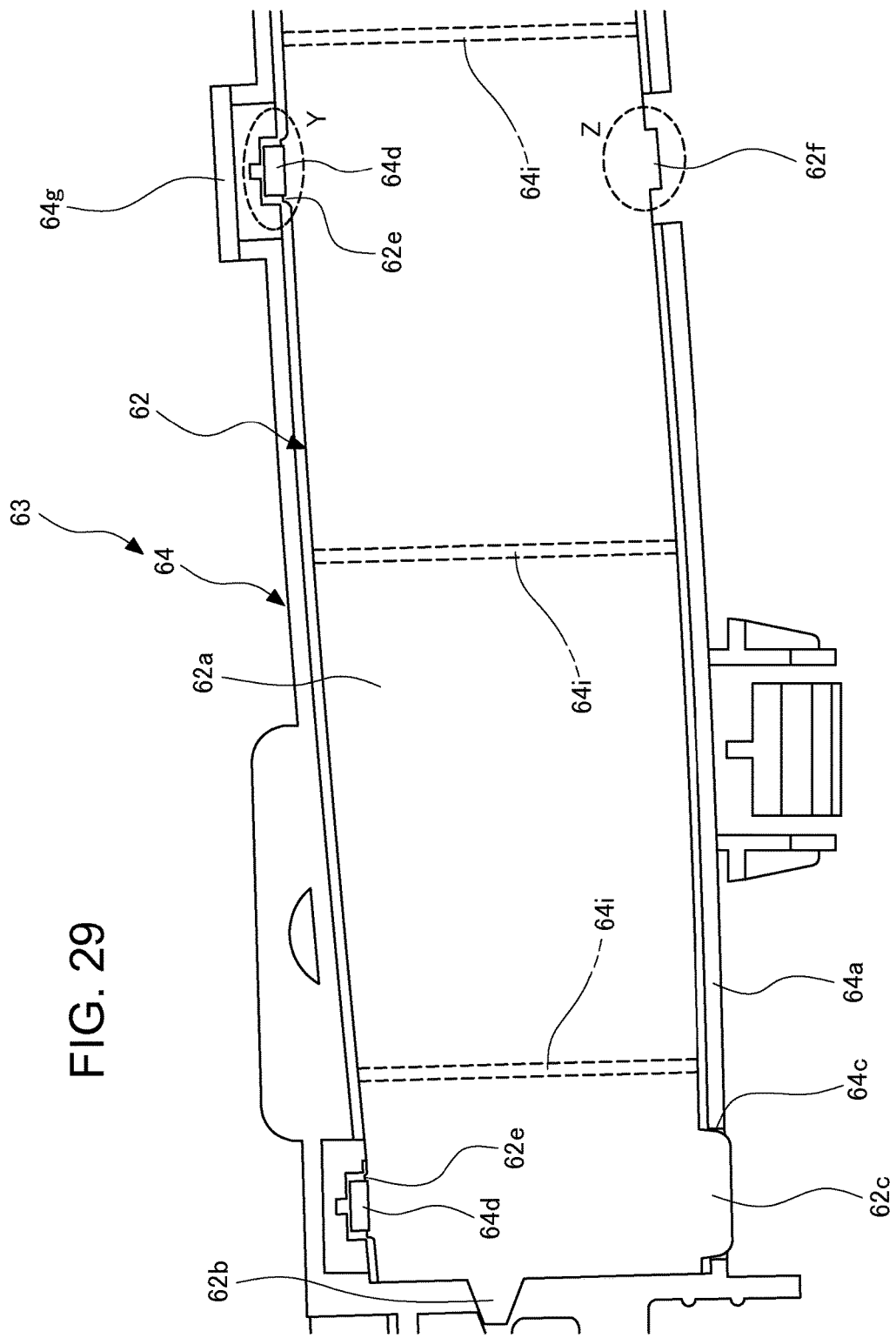
FIG. 29 is a front view showing an assembling mechanism for assembling the light guiding body to the holder according to the modified example.
Figure 30:
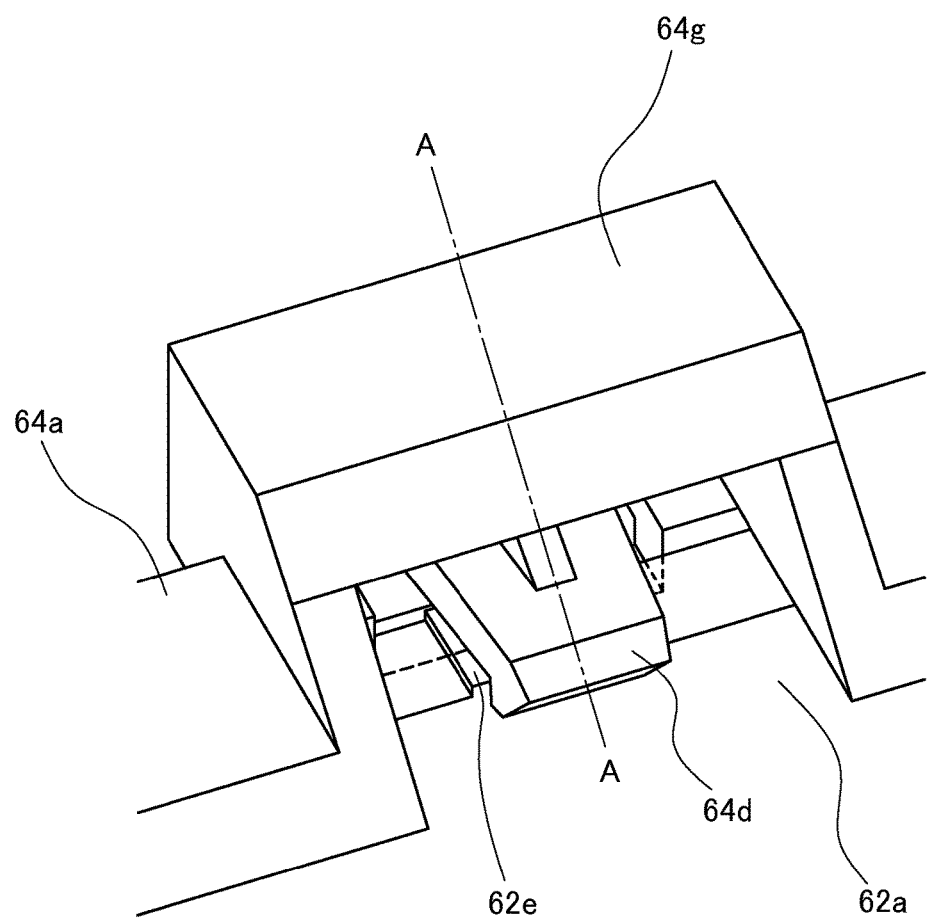
FIG. 30 is an enlarged perspective view of a range Y of FIG. 29.
Figure 31:
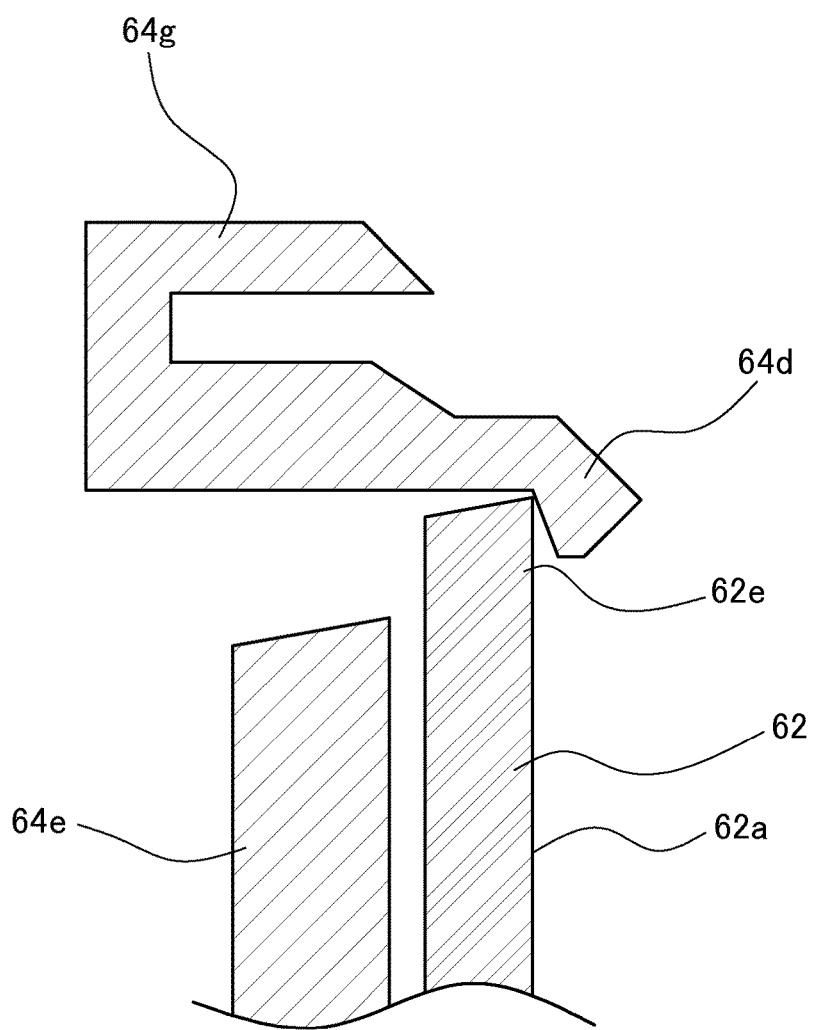
FIG. 31 is a schematic view showing a section taken along the line A-A of FIG. 30.

In an upper part of an outer edge of the light guiding body 62, upper side projections 62e slightly protruding upward are formed as shown in FIGS. 29 to 31. Engagement claw portions 64d formed in the holder 63 as engagement projections are engaged with the upper side projections 62e. Specifically, as shown in FIG. 31, a leading end of each of the engagement claw portions 64d is hooked onto a locking surface of each of the upper side projections 62e on the same side as the light emission surface 62a. That is, the upper side projections 62e correspond to parts of the outer edge of the light guiding body 62, the part with which the engagement projections formed in the holder 63 are engaged.

Figure 32:
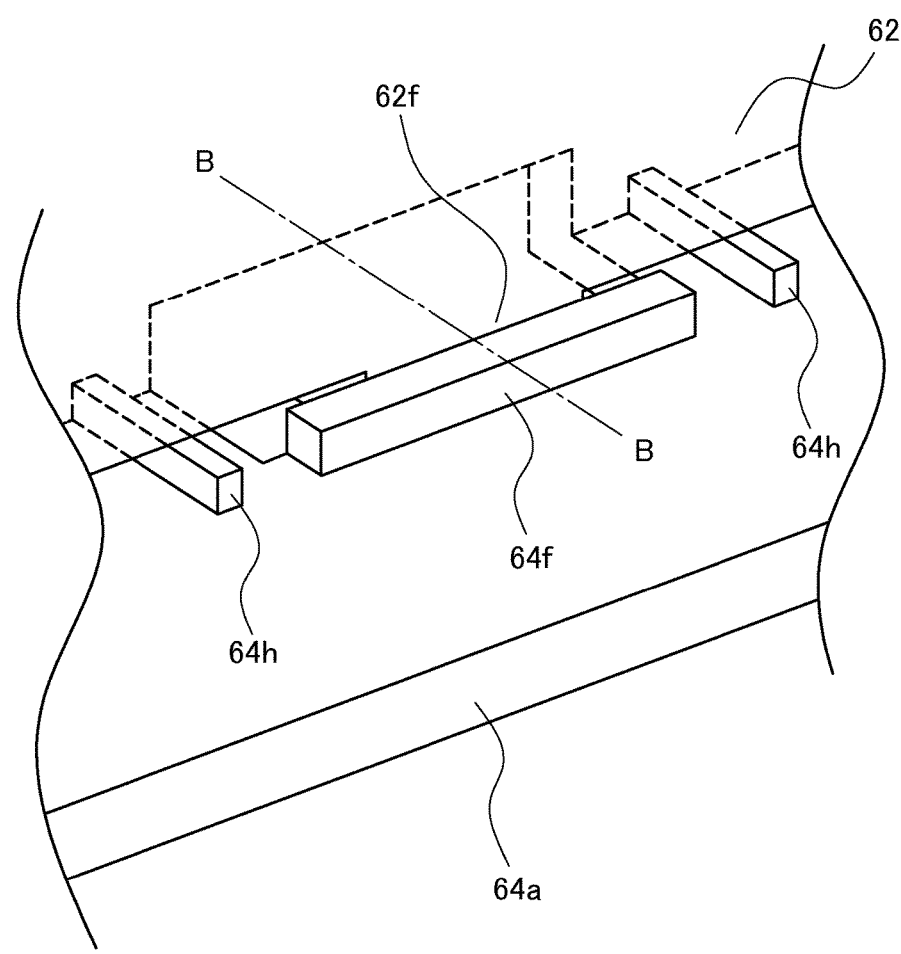
FIG. 32 is an enlarged perspective view of a range Z of FIG. 29.
Figure 33:
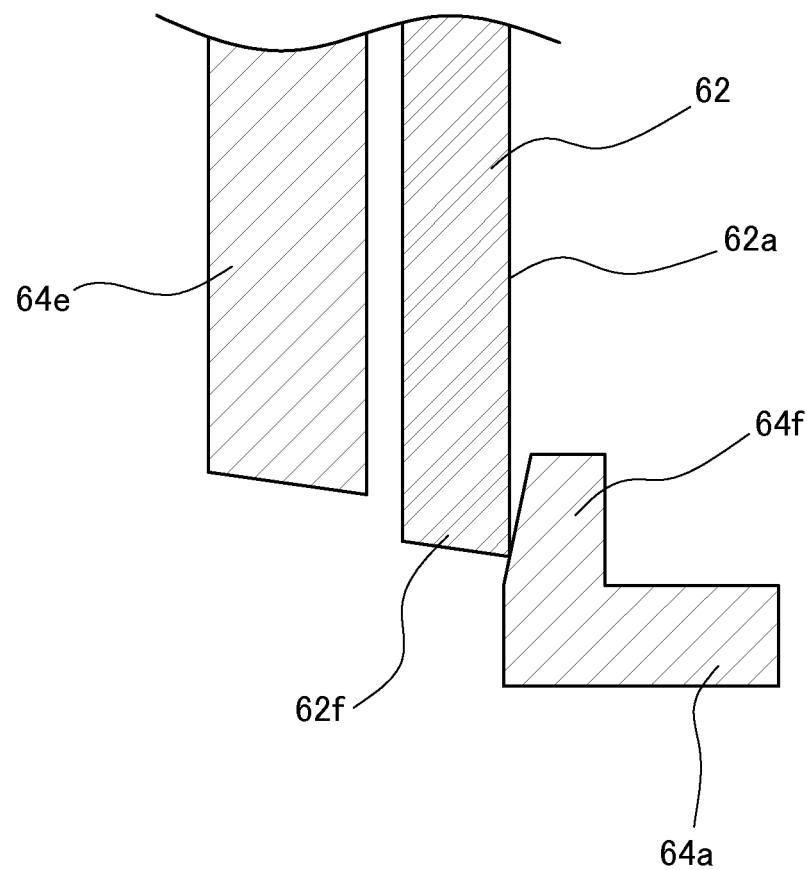
FIG. 33 is a schematic view showing a section taken along the line B-B of FIG. 32.

Similarly, in a lower part of the outer edge of the light guiding body 62, lower side projections 62f slightly protruding downward are formed as shown in FIGS. 29, 32, and 33. Engagement convex portions 64f formed in the holder 63 as engagement projections are engaged with the lower side projections 62f. Specifically, as shown in FIGS. 32 and 33, each of the engagement convex portions 64f is engaged with a surface of each of the lower side projections 62f provided on the same side as the light emission surface 62a. That is, the lower side projections 62f correspond to parts of the outer edge of the light guiding body 62, the part with which the engagement projections formed in the holder 63 are engaged.

In the modified example, the plurality of (six in the modified example) upper side projections 62e and the plurality of (six in the modified example) lower side projections 62f are formed on the outer edge of the light guiding body 62 and respectively provided side by side along the longitudinal direction of the light guiding body 62. Positions where the upper side projections 62e are provided and positions where the lower side projections 62f are provided substantially match each other in the longitudinal direction of the light guiding body 62.

The light guiding body 62 is manufactured by the injection molding as described above. At the time of taking out the injection-molded light guiding body 62 from a mold, push-out pins, that is, ejector pins are pressed onto some points of the light guiding body 62. When the ejector pins are pressed immediately after the injection molding, a cavity or a so-called burr is sometimes generated in the parts. If the ejector pins are pressed onto the light emission surface 62a of the light guiding body 62 and the cavity or the burr is generated, the intensity of the light emitted from the parts of the light emission surface 62a onto which the ejector pins are pressed is differentiated from intensity of light emitted from the other parts so that the intensity of the emitted light may be varied.

Thus, in the modified example, the ejector pins are set to be pressed onto the parts out of the light emission surface 62a, more specifically speaking, the lower side projections 62f described above. Since the ejector pins are pressed onto the parts of the light guiding body 62 different from the light emission surface 62a in such a way, the light emission from the light emission surface 62a can be suppressed from being influenced. The parts onto which the ejector pins are pressed are not limited to the lower side projections 62f but may be the upper side projections 62e or both the upper side projections 62e and the lower side projections 62f.

Next, the light guiding body holding portion 64 of the holder 63 will be described. The light guiding body holding portion 64 has the frame wall 64a shown in FIG. 23 and the like, and a bottom wall 64e shown in FIG. 28 and the like. The frame wall 64a stands on a surface (surface facing the interior side of the vehicle) of the bottom wall 64e to be along an outer shape of the light guiding plate serving as the light guiding body 62. As shown in FIG. 18, protruding claws 45 formed for fitting the light emitting ornament 41 into the accommodation case 43 are provided on a back surface of the bottom wall 64e.

Further, the light guiding body holding portion 64 has the engagement claw portions 64d and the engagement convex portion 64f serving as the engagement projections to be engaged with the outer edge of the light guiding body 62 at the time of assembling the light guiding body 62 to the light guiding body holding portion 64 as shown in FIGS. 23, 24, and 27. The engagement claw portions 64d are claw portions having the hook shaped leading ends, provided in an upper end of the light guiding body holding portion 64, and the leading ends extend to be placed on the front side of the surface of the bottom wall 64e. The plurality of engagement claw portions 64d are formed in the longitudinal direction of the light guiding body holding portion 64, and specifically arranged at positions corresponding to the upper side projections 62e when the light guiding body 62 is held by the light guiding body holding portion 64.

When the light guiding body 62 is brought close to the light guiding body holding portion 64 from the front side of the light guiding body holding portion 64, the engagement claw portions 64d are pressed onto the upper side projections 62e of the light guiding body 62 and elastically deformed in such a manner that the leading ends are brought up. After that, when the light guiding body 62 reaches an assembling position in the light guiding body holding portion 64, the engagement claw portions 64d are restored to the original state so that the leading ends thereof are hooked onto the locking surfaces of the upper side projections 62e provided on the same side as the light emission surface 62a as shown in FIGS. 30 and 31.

Further, as shown in FIGS. 27, 29, and 30, each of portal enclosing portions 64g that enclose the engagement claw portions 64d is provided for each of the engagement claw portions 64d. The enclosing portions 64g are provided for suppressing the light advancing in the light guiding body 62 from being leaked out through the upper side projections 62e and the engagement claw portions 64d engaged with the upper side projections. By providing such enclosing portions 64g, even when the above engagement claw portions 64d are provided in the holder 63, the leakage of the light from the engagement claw portions 64d can be suppressed. Thus, while suppressing the leakage of the light, the light guiding body 62 can be assembled to the holder 63.

The engagement convex portions 64f are substantially rectangular parallelepiped locking portions, provided in a lower end of the light guiding body holding portion 64. More specifically speaking, the engagement convex portions protrude upward from a region placed on the lower side of an inner side surface of the frame wall 64a as shown in FIGS. 27 and 32. The plurality of engagement convex portions 64f is formed in the longitudinal direction of the light guiding body holding portion 64. Specifically, the engagement convex portions are arranged at the positions corresponding to the lower side projections 62f when the light guiding body 62 is held by the light guiding body holding portion 64.

When the light guiding body 62 is brought close to the light guiding body holding portion 64 from the front side of the light guiding body holding portion 64 and reaches a predetermined assembling position, as shown in FIGS. 32 and 33, the engagement convex portions 64f are abutted with the surfaces of the lower side projections 62f provided on the same side of the light emission surface 62a so that the lower side projections 62f are locked onto the engagement convex portions 64f.

As shown in FIG. 32, height adjustment convex portions 64h having smaller height than the engagement convex portions 64f are provided at both side positions of each of the engagement convex portions 64f. At the time of assembling the light guiding body 62 to the light guiding body holding portion 64, the height adjustment convex portions 64h are butted with the lower end of the light guiding body 62 to determine a position in the up and down direction of the light guiding body 62.

Further, as shown in FIGS. 23 and 24, a plurality of linear abutment ribs 64i along the height direction of the light guiding body holding portion 64 is formed on a surface (surface facing the interior side of the vehicle) of the bottom wall 64e in the longitudinal direction of the light guiding body holding portion 64. The abutment ribs 64i correspond to an abutment portion. As shown in FIG. 28, in a state where the engagement claw portions 64d are hooked onto the locking surfaces of the upper side projections 62e of the light guiding body 62 provided on the same side as the light emission surface 62a, the abutment ribs are abutted with the back surface of the light guiding body 62, that is, the surface placed on the opposite side of the light emission surface 62a.

That is, when the light guiding body 62 is held by the light guiding body holding portion 64, the engagement claw portions 64d are abutted with the locking surfaces of the upper side projections 62e serving as surfaces placed on the same side as the light emission surface 62a. When this is described in a plain way, the light guiding body 62 is sandwiched between the engagement claw portions 64d and the abutment ribs 64i in a state where the light guiding body is held by the light guiding body holding portion 64. Thereby, in the modified example, even when a member such as an unwoven cloth is not used in the configuration that the snap-fit assembling method is adopted, the backlash of the light guiding body 62 can be suppressed after assembling to the holder 63.

As shown in FIG. 28, in a state where the light guiding body 62 is held by the light guiding body holding portion 64, a region of the back surface of the light guiding body 62 with which the abutment ribs 64i are abutted is placed at a position excluding regions where the prism portions 62d described above are formed in the longitudinal direction of the light guiding body holding portion 64. This is because when the abutment ribs 64i come into the prism portions 62d of the wedge shaped cutouts, light reflection in the prism portions 62d is not properly performed, and an effect obtained by providing the prism portions 62d is not easily exerted.

When a protruding amount of the abutment ribs 64i (referred to as the height of the ribs below) is excessively increased, a sink is generated in the bottom wall 64e of the light guiding body holding portion 64. Therefore, the height of the ribs is desirably set as one third or less of thickness of the bottom wall 64e, more desirably one tenth or less.

As described above, the abutment ribs 64i are provided at plural points in the longitudinal direction of the light guiding body holding portion 64. However, when the number of the abutment ribs 64i is excessively increased, the light leaked out from the light guiding body 62 is butted with and reflected on not flat parts of the surface of the bottom wall 64e but the abutment ribs 64i. Thus, there is a possibility that the reflected light harmfully influences the light emission from the light guiding body 62. Therefore, regarding the number of the abutment ribs 64i and a pitch between the ribs, ranges with which the light emission from the light guiding body 62 is not harmfully influenced are specified by optical simulation so that optimal values within the ranges are set.

Next, an installing method of the light emitting ornament 41 in the modified example will be described.

The light emitting ornament 41 is one example of the vehicle decorative component as descried above, in particular the vehicle decorative component used as the door lining component, and is attached to the accommodation case 43 provided in the door lining main body 42. More specifically speaking, the light emitting ornament 41 is set up by successively assembling the constituent components of the light emitting ornament 41, and the set-up light emitting ornament 41 is installed in the door lining main body 42.

Regarding an installing task of the light emitting ornament 41, the task is desirably easier and the manufacturing man-hours are desirably smaller. During the installing task of the light emitting ornament 41, in a stage of setting up the light emitting ornament 41, when the directions of assembling the constituent components of the light emitting ornament 41 are diverse, time and effort such as changing postures of the components to match the assembling directions every time the constituent components are assembled are required, and hence not preferable in terms of working efficiency.

The light emitting ornament 41 has the lamp 61, the light guiding body 62, and the holder 63 as the constituent components, and the lamp 61 and the light guiding body 62 are attached to the holder 63 in a state where the lamp and the light guiding body are adjacent to each other as described above. Further, the protruding portion 62b protrudes toward the lamp 61 in the end of the light guiding body 62 on the side adjacent to the lamp 61. For efficiently letting the light from the lamp 61 incident on the light guiding body 62, the lamp 61 and the light guiding body 62 are assembled to the holder 63 in such a manner that the clearance between the protruding portion 62b and the lamp 61 becomes a predetermined value. At this time, depending on an assembling method of assembling the lamp 61 and the light guiding body 62 to the holder 63, the lamp 61 interferes with the above protruding portion 62b, and there is a fear that the lamp 61 and the light guiding body 62 cannot be properly assembled to the holder 63. Such a failure is more remarkably caused in a case where the above clearance is set to be a shorter distance for the purpose of more effectively performing the incidence of the light on the light guiding body 62 from the lamp 61 or the like.

Thus, with the installing method of the light emitting ornament 41 according to the modified example, the light emitting ornament 41 can be more easily set up and more easily installed in the door lining main body 42. Further, with the installing method of the light emitting ornament 41 according to the modified example, the interference between the lamp 61 and the protruding portion 62b of the light guiding body 62 can be avoided and the lamp 61 and the light guiding body 62 can be properly assembled to the holder 63. Hereinafter, the installing method of the light emitting ornament 41 according to the modified example will be described in detail with reference to FIG. 18.

In the installing method of the light emitting ornament 41 according to the modified example, as shown in FIG. 18, firstly, a light source unit set-up step of setting up the light source unit 60 by assembling the lamp 61 and the light guiding body 62 to the holder 63 is performed. This step corresponds to an irradiation body set-up step.

Next, an ornament unit assembling step of assembling the ornament unit 50 to the holder 63 of the set-up light source unit 60 is performed. This step corresponds to a transmissive body assembling step. At the time point when this step is completed, the light emitting ornament 41 is temporarily assembled.

After that, a holder fixing step of fixing the holder 63 to which the light source unit 60 and the ornament unit 50 are assembled to the door lining main body 42 is performed. More specifically speaking, in this step, the light emitting ornament 41 temporarily assembled in the previous step is fitted in and fixed to the accommodation case 43.

In the installing method of the light emitting ornament 41 according to the modified example, as shown in FIG. 18, in the light source unit set-up step described above, the light guiding body 62 is brought close to the holder 63 from the front side of the holder 63 and assembled to the light guiding body holding portion 64. The front side of the holder 63 indicates the front side when seen from the surface on the opposite side of the back surface side fixed to the door lining main body 42 in the holder 63.

In the ornament unit assembling step, as shown in FIG. 18, the ornament unit 50 is brought close and assembled to the holder 63 from the front side of the light guiding body 62. The front side of the light guiding body 62 indicates the front side when seen from the light emission surface 62a of the light guiding body 62 assembled to the light guiding body holding portion 64.

Further, in the holder fixing step, as shown in FIG. 18, the temporarily assembled light emitting ornament 41 is brought close to the door lining main body 42 from the front side of the door lining main body 42 and fitted into the accommodation case 43. The front side of the door lining main body 42 indicates the front side when seen from an opening of the accommodation case 43.

As described above, in the installing method of the light emitting ornament 41 according to the modified example, a task of assembling the light guiding body 62 to the holder 63, a task of assembling the ornament unit 50 to the holder 63 of the light source unit 60, and a task of fitting the temporarily assembled light emitting ornament 41 into the accommodation case 43 are all performed in the same direction, specifically, in the same orientation. Strictly speaking, in the installing method of the light emitting ornament 41 according to the modified example, when a certain component (referred to as the to-be-assembled component below) is assembled to the other component, the to-be-assembled component is brought close and assembled to the other component from the front side when seen from the other component. When the assembling directions and the orientations are matched, the above tasks can be more easily performed, and the manufacturing man-hours can also be reduced. As a result, in the installing method of the light emitting ornament 41 according to the modified example, the light emitting ornament 41 can be more easily set up and more easily installed in the door lining main body 42.

Further, in the installing method of the light emitting ornament 41 according to the modified example, as shown in FIG. 18, in the light source unit set-up step, the light guiding body 62 is firstly assembled to the light guiding body holding portion 64 of the holder 63. After that, the lamp 61 is brought close to the holder 63 from the side of the holder 63 and assembled to the lamp holding portion 65 of the holder 63 adjacently to the protruding portion 62b of the light guiding body 62.

As described above, in the installing method of the light emitting ornament 41 according to the modified example, the light guiding body 62 including the protruding portion 62b is firstly assembled to the holder 63, and then the lamp 61 is moved toward the end on the side where the protruding portion 62b is placed from the side of the holder 63, and arranged at the position adjacent to the protruding portion 62b at the end. By such procedure, in the installing method of the light emitting ornament 41 according to the modified example, the interference between the lamp 61 and the protruding portion 62b of the light guiding body 62 can be avoided, and the lamp 61 and the light guiding body 62 can be properly assembled to the holder 63.

Other Use of Vehicle Decorative Component

In the above embodiment, as one example of the vehicle decorative component, the ornament that functions as the interior illumination of the vehicle is taken as an example and described. However, the use of the vehicle decorative component according to the present invention is not limited to the interior illumination. Specifically speaking, in the vehicle decorative component described herein, the light emitting region 1a emits the light in a period during which the light source provided inside irradiates the light, and the light emitting region 1a does not emit the light and but harmonizes (synchronizes) with the adjacent non-light emitting region 1b in the other periods. Desirably, such a property is actively utilized and the vehicle decorative component according to the present invention is used for multiple purposes.

Hereinafter, another use of the vehicle decorative component according to the present invention will be described with reference to FIG. 34.

Figure 34:
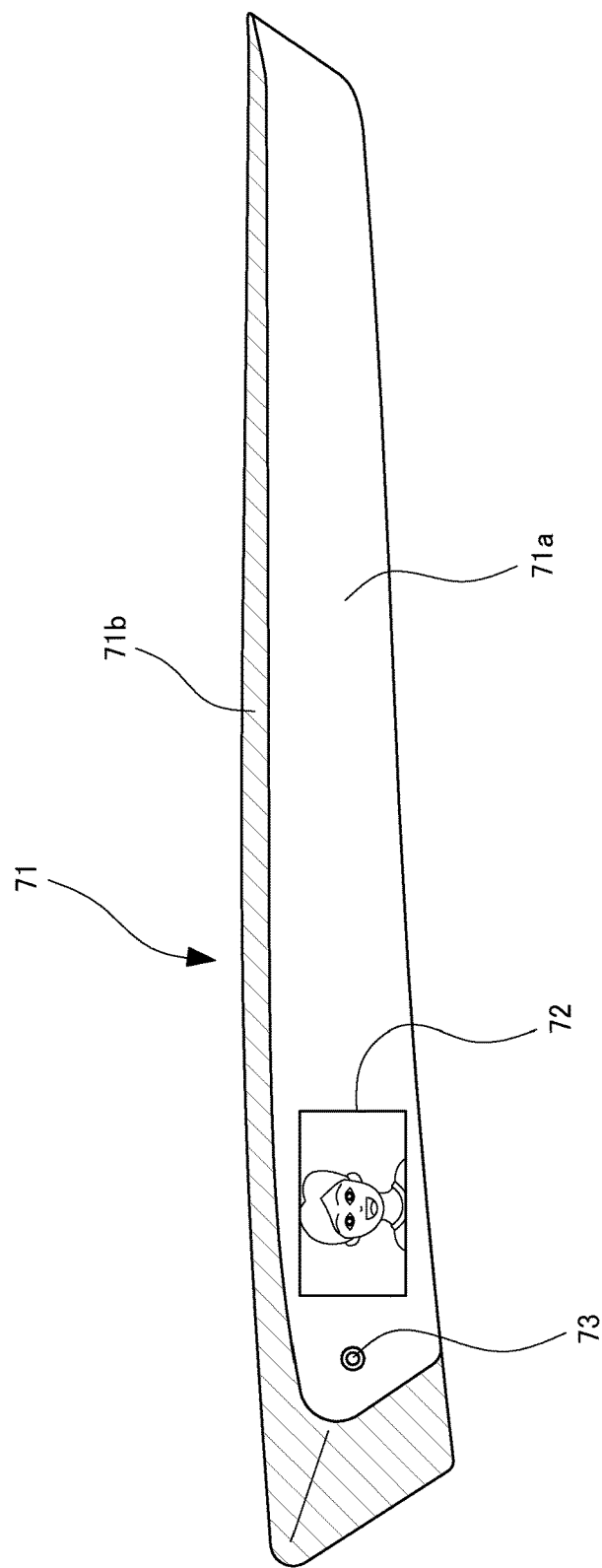
FIG. 34 is an illustrative view relating to one example of a use of the vehicle decorative component.

As another use of the vehicle decorative component according to the present invention, as shown in FIG. 34, an information display screen is provided in a light emitting ornament 71 corresponding to the vehicle decorative component so that information is displayed on the display screen. In more detail, a touch panel 72 serving as the information display screen is formed in a light emitting region 71a of the light emitting ornament 71 shown in FIG. 34. A structure of the light emitting ornament 71 shown in FIG. 34 is the substantially same as the already-described structure of the light emitting ornament 1 except the point that the touch panel 72 is formed. For example, the light source unit 30 serving as an irradiation body is also assembled to the light emitting ornament 71 shown in FIG. 34.

In the light emitting ornament 71 shown in FIG. 34, in a period during which the light source unit 30 irradiates the light, the touch panel 72 is lit and the information is displayed on the panel 72. In a period during which the light source unit 30 does not irradiate the light, the touch panel 72 is turned off and the light emitting region 71a including the panel 72 harmonizes (synchronizes) with a non-light emitting region 71b.

At least one information among still image information, moving image information, and text information is displayed on the touch panel 72. The still image includes a picture, a pattern, a photograph, and a single-color-painted image. Regarding the information to be displayed on the touch panel 72, a recording medium such as a memory card may be installed on the side of a vehicle body and the information may be read and acquired from the recording medium. Alternatively, the information may be acquired by receiving a signal from a smartphone or a tablet terminal on the side of the vehicle body. A wireless LAN function may be disposed in the vehicle body and the information may be acquired via the internet.

By displaying various information on the touch panel 72, comfort in an interior of the vehicle can be improved. That is, for example, when a passenger of the vehicle displays still images and moving images of his/her preference on the touch panel 72, an entertainment or amusement property in the interior of the vehicle is enhanced for the passenger. When information of homepages and advertisement of enterprises are displayed on the above touch panel 72 by connecting to the internet, the information can be acquired in the vehicle so that convenience for the passenger is improved.

Further, the information displayed on the above touch panel 72 is further preferably switched by a switching operation performed by the passenger of the vehicle. That is, it is thought that the information to be displayed on the touch panel 72 is switched by the passenger touching the touch panel 72, more specifically flicking like quickly moving a finger on the panel. With such a configuration, the passenger switches the information to be displayed on the touch panel 72 depending on his/her mood or a situation. Thus, the comfort in the interior of the vehicle can be improved.

By making use of advantages of the above touch panel 72, for example, the existing operation switch panel of a car audio system, a car navigation system, and the like can be replaced with the above touch panel 72. In such a way, by replacing the conventional operation switch panel with the touch panel 72, effects of reducing the number of components, ensuring a vehicle interior space, and the like can also be obtained. Further, a design property is improved more than the conventional operation switch panel.

As a technique of realizing the above configuration, a known technique regarding the touch panel 72 can be utilized. In order to suppress an unintentional change in the information displayed on the touch panel 72 by accidentally touching the touch panel 72 or the like, a lock cancellation button 73 may be provided in the vicinity of the touch panel 72. That is, unless the lock cancellation button 73 is pressed, switching of the information displayed on the panel 72 may be limited even upon touching the touch panel 72. Thereby, the comfort in the interior of the vehicle is furthermore improved for the passenger.

Further, as shown in FIG. 34, in the structure that width in the up and down direction of the light emitting region 71a is changed in the longitudinal direction of the light emitting ornament 71, the touch panel 72 may be installed in a wider region (region on the front side in FIG. 34). Thereby, an installment space can be more widely ensured so that the touch panel 72 can be easily installed.

The uses of the vehicle decorative component described so far are mainly applied to the side of a front passenger seat or a rear seat of the vehicle. On the side of a driver seat of the vehicle, maintenance of a favorable driving state of the passenger (strictly speaking, the driver) is given priority over improvement of the entertainment property in the interior of the vehicle. Therefore, the vehicle decorative component installed near the driver seat is used for notifying of a state of the driver or alarming the driver.

Specifically speaking, a measurement device (not shown) that measures concentration of the driver may be disposed in the driver seat, the light emitting region of the vehicle decorative component may emit the light in conjunction with a measurement result of the device, and further, a light emission color may be changed in accordance with intensity of the concentration. With such a configuration, for example when the concentration of the driver is lowered, the driver himself/herself and his/her fellow passenger can be notified of that fact. An alcohol drinking determination device (not shown) that detects alcohol concentration from the breath of the driver may be disposed in the driver seat, and in a case where the alcohol concentration measured by the device exceeds a reference value, the light emitting region of the vehicle decorative component may strongly emit the light. With such a configuration, for example when the driver drives the vehicle under the influence of alcohol, a person outside the vehicle can be notified of that fact.

Further, in a vehicle in which a driving mode is selectable, the light emitting region of the vehicle decorative component may emit the light with a color in accordance with the currently selected driving mode. With such a configuration, the driver himself/herself, his/her fellow passenger, and a person outside the vehicle can be notified of the currently selected driving mode.

As described so far, the use of the vehicle decorative component according to the present invention is not limited for the illumination but includes information presenting use for presenting various information. In a case where the vehicle decorative component according to and embodiment of the present invention is used for information presenting use, there is a need for letting the light emitting region emit the light with higher intensity to show more vividly. Therefore, as a base material forming the light emitting region (specifically, the ornament base material 11), a base material molded with a resin material not containing a diffusion material or a resin material containing a black pigment instead of a diffusing agent is preferably utilized.

OTHER EMBODIMENTS

In the above embodiment, the example of the vehicle decorative component of the present invention is described. However, the above embodiment is not to limit the present invention but to facilitate understanding of the present invention. The present invention can be changed and improved without departing from the gist thereof, and the present invention includes equivalent items thereof as a matter of course. Materials, arrangement positions, shapes, and the like of the members described above do not limit the present invention but are only examples for exerting the effects of the present invention.

In the above embodiment, as the component that irradiates the light toward the front side of the light emitting region 1a (irradiation body of the present invention), the lamp 31 and the light guiding body 32 are used. That is, in the above embodiment, the case where a surface-emission body is used as the irradiation body is described. However, the present invention is not limited to this. For example, the irradiation body may be an irradiation body including only the lamp 31 (that is, the point-emission body in which no light guiding body 32 is used). Alternatively, instead of the lamp 31 and the light guiding body 32, an irradiation body in which an organic EL serves as a light source may be used.

In the above embodiment, the light source unit 30 is assembled to the ornament unit 10 by the snap-fit method, and the ornament unit 10 is fixed to the lower base 4 by screwing and the snap-fit method. However, the present invention is not limited to this but a fastening method, a fixing method, and an assembling method between the members can be arbitrarily decided. For example, the light source unit 30 may be assembled to the ornament unit 10 by screwing or may be fixed by using an adhesive such as a hot-melt adhesive.

In the above embodiment, the case where an attachment position of the vehicle decorative component is set to be the position adjacent to the pull handle 5 in the vehicle door is described. However, the attachment position of the vehicle decorative component is not limited to the above position but may be other positions. In a case where the vehicle decorative component is installed in a part facing the interior side of the vehicle door, a region where attachment of the vehicle decorative component is to be avoided exists in the structure. For example, when the vehicle decorative component is installed in a region where the side impact pad is arranged between the door inner panel and the lower base 4 (range denoted by the reference sign T1 in FIG. 1), the light source unit 30 and the side impact pad interfere with each other. Thus, installment of the vehicle decorative component in such a point is to be avoided. For the same reason, the installment of the vehicle decorative component is also to be avoided in a region where the speaker is arranged between the inner panel and the lower base 4 (range denoted by the reference sign T2 in FIG. 1) and a region where the switch panel embedded in the door lining such as the door armrest 3 is arranged (range denoted by the reference sign T3 in FIG. 1).

A region where a pocket portion is formed, more specifically, a region where the pocket rim 2 is attached and a pocket is formed, and a region where a pull pocket is formed between the lower base 4 and the door armrest 3 (range denoted by the reference sign T4 in FIG. 1) exist in the vehicle door. When the vehicle decorative component is installed in such a pocket formation region, there is a fear that an accommodation space between a pocket wall and the door inner panel cannot be sufficiently ensured. Accordingly, the vehicle door is enlarged to the vehicle interior side. Similarly, when the vehicle decorative component is installed in the region where the pull handle 5 is arranged, a gap between the pull handle 5 and the door inner panel is extended. Thus, the region where the pull handle 5 is arranged is enlarged to the vehicle interior side. Therefore, the installment of the vehicle decorative component is also to be avoided in the region where the pocket portion is formed and the region where the pull handle 5 is arranged.

By installing the vehicle decorative component excluding the regions described so far, without deteriorating functions of the parts of the vehicle door, the vehicle decorative component can be properly installed while suppressing unnecessary enlargement of the parts of the vehicle door.

In the above embodiment, the case where the vehicle decorative component of the present invention is used as the interior component of the vehicle door (specifically, the vehicle door lining R) is described. However, the vehicle decorative component of the present invention is not utilized and limited only to the vehicle door lining R but can be applied to a part formed by a resin component that exerts a decorative function. For example, as shown in FIG. 11, light emitting ornaments 101, 102, 103, and 104 can be utilized as interior components for seat back boards attached to back surfaces of a seat S1 of the driver seat and a seat S2 of the front passenger seat (gray-colored parts in FIG. 11 correspond to the light emitting region 1a). In particular, in the light emitting ornaments 103 and 104 attached to rear surfaces of headrests of the seats S1 and S2, the touch panel 72 serving as the information display screen described above may be formed.

Figure 12:
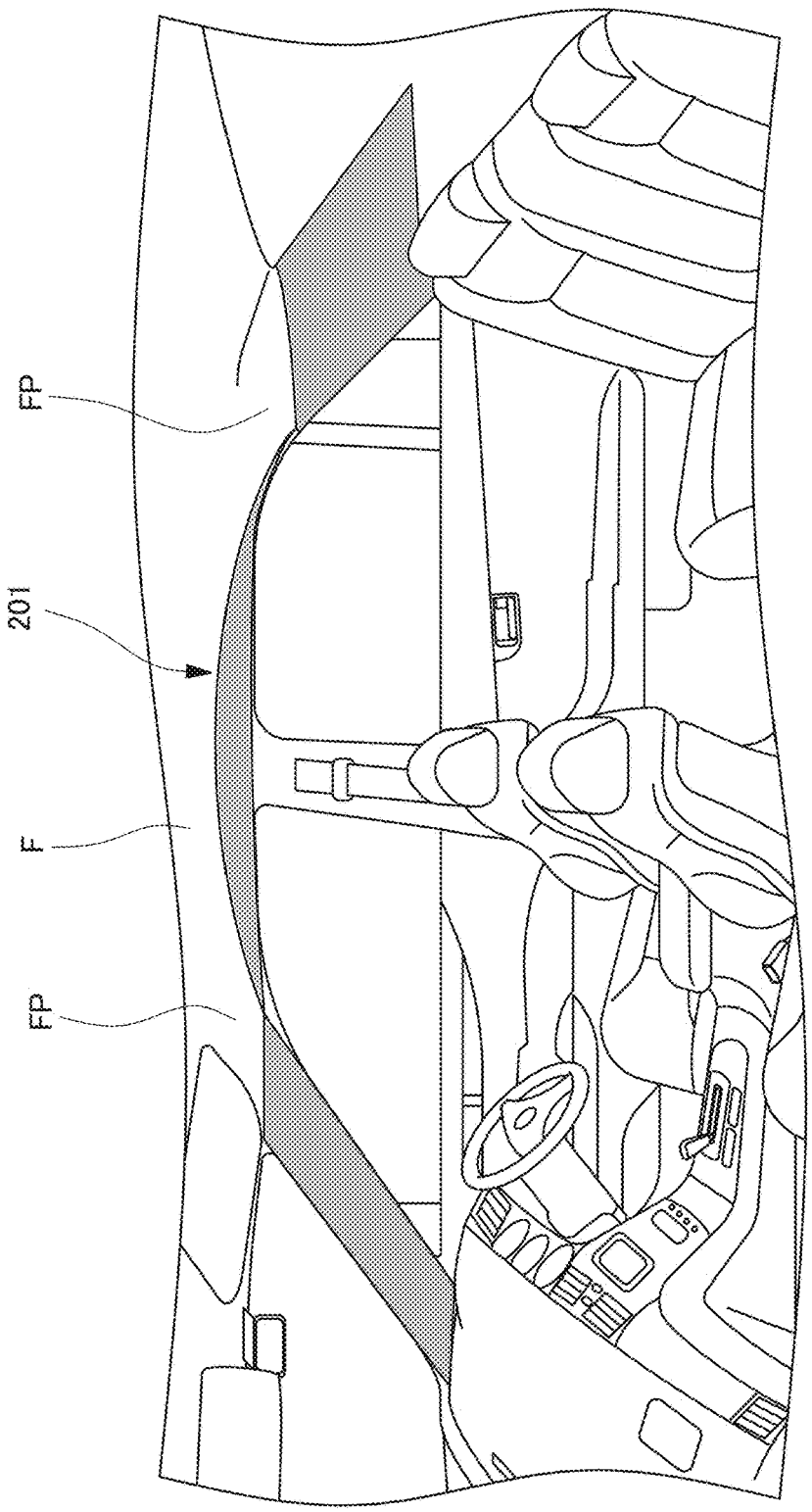
FIG. 12 is a perspective view showing a third application example regarding the vehicle decorative component.

As shown in FIG. 12, a light emitting component 201 can also be utilized as an interior component for a roof F attached to right and left side parts of the vehicle and roof pillars FP that support the roof F (gray-colored parts in FIG. 12 correspond to the light emitting region 1a).

Figure 13:
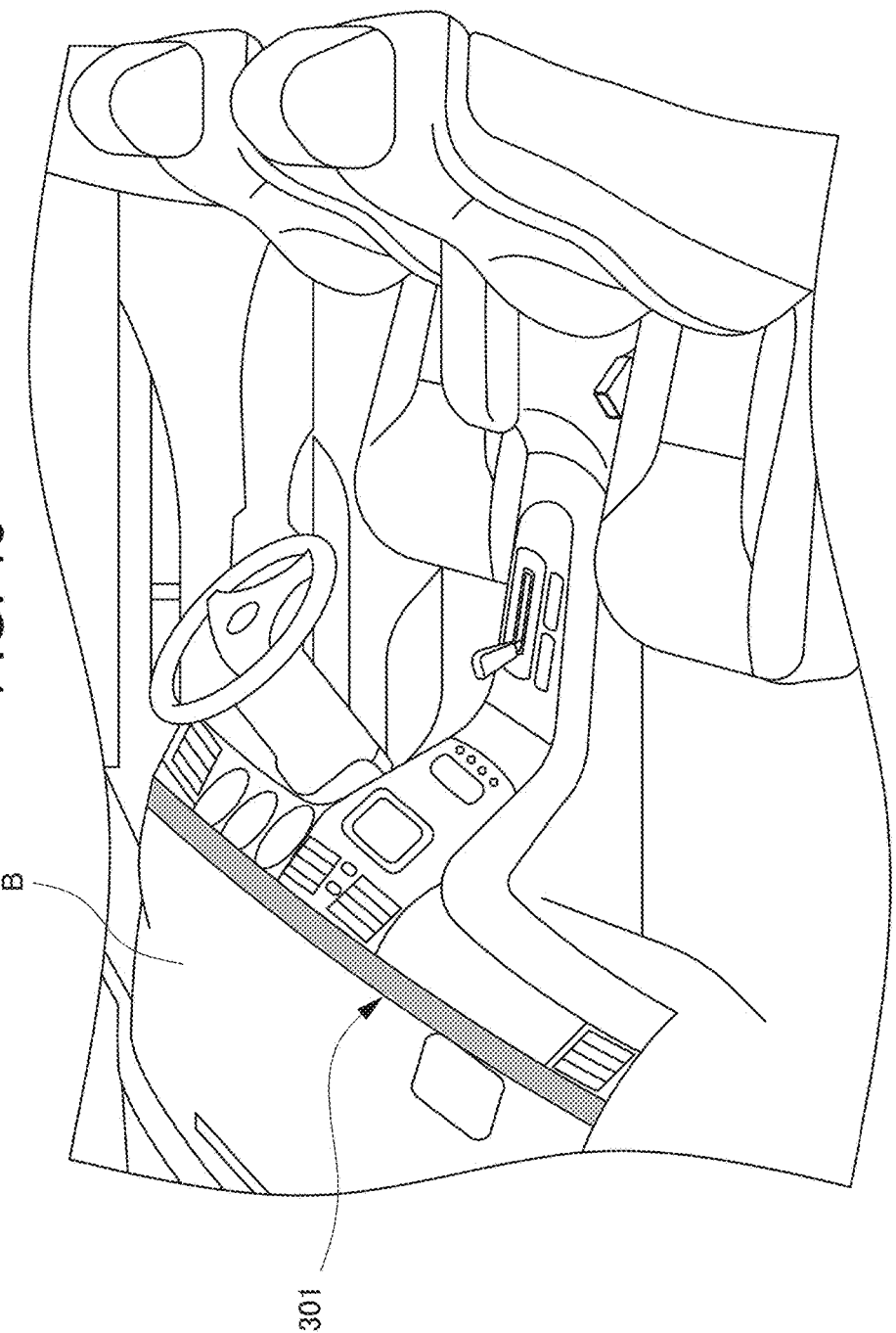
FIG. 13 is a perspective view showing a fourth application example regarding the vehicle decorative component.
Figure 14:
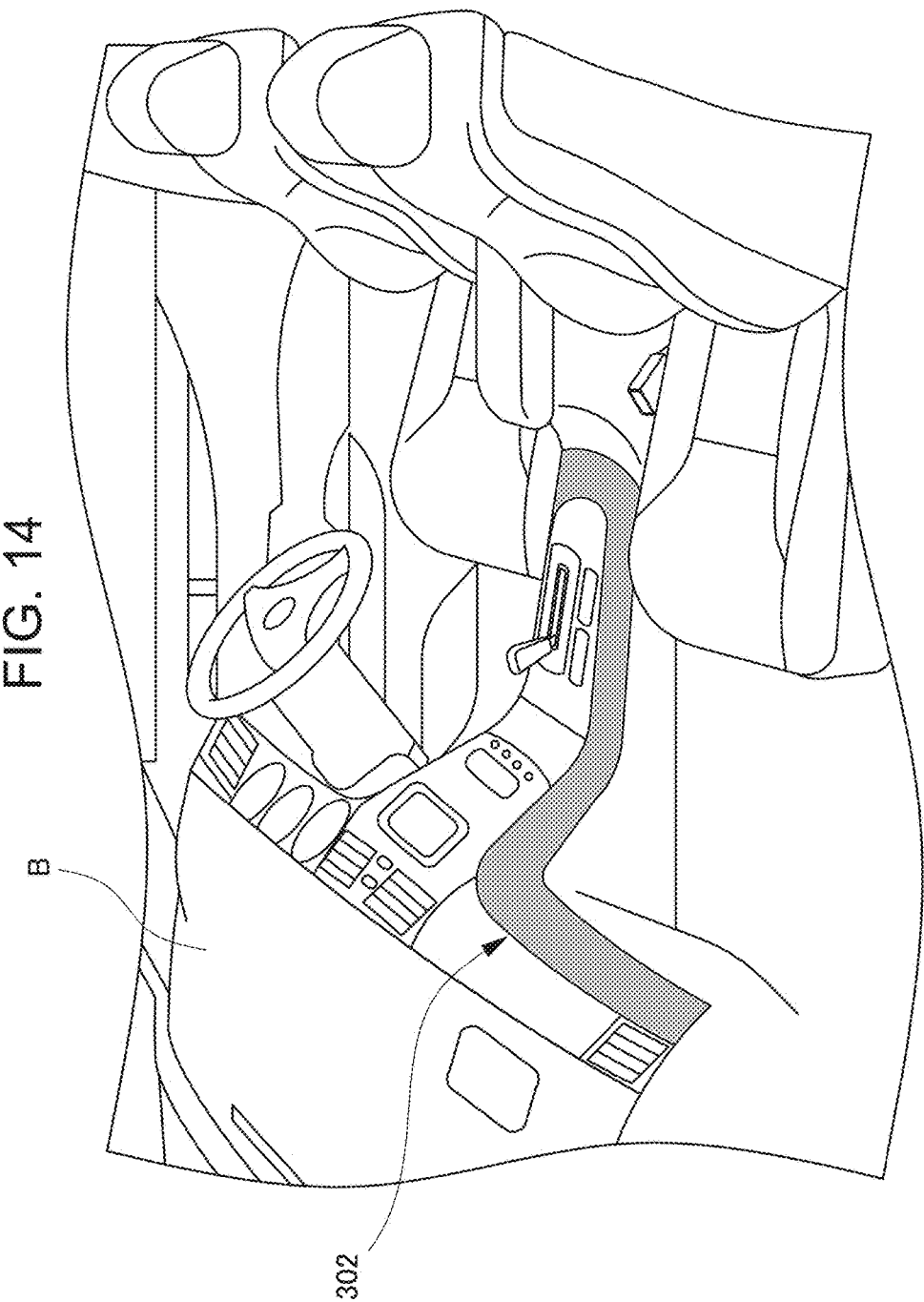
FIG. 14 is a perspective view showing a fifth application example regarding the vehicle decorative component.
Figure 15:
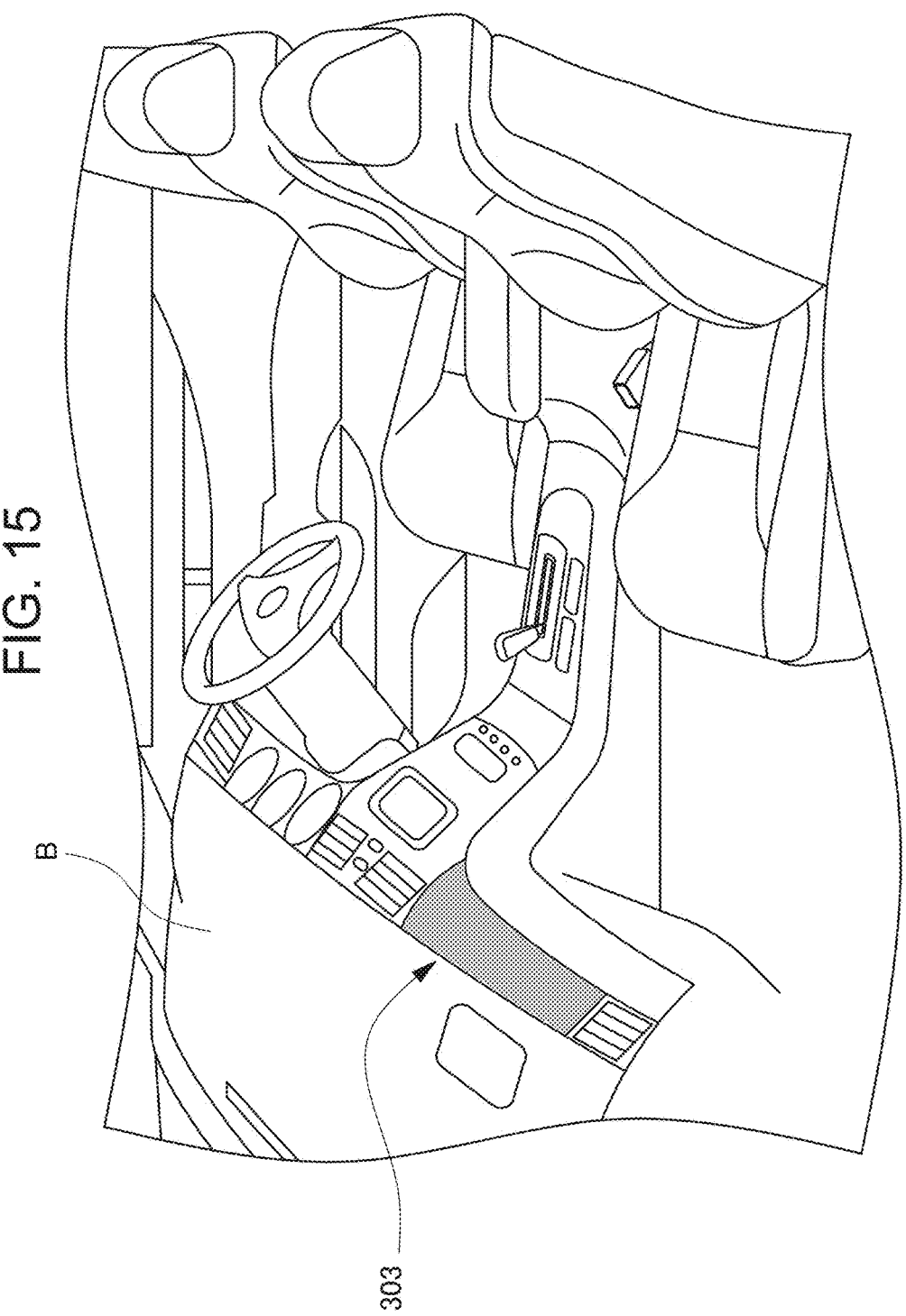
FIG. 15 is a perspective view showing a sixth application example regarding the vehicle decorative component.

Further, as shown in FIGS. 13 to 15, light emitting ornaments 301, 302, and 303 can also be utilized as interior members for a dashboard B placed on the front side of the driver seat and peripheries thereof (gray-colored parts in FIGS. 13 to 15 correspond to the light emitting region 1a).

Figure 16:
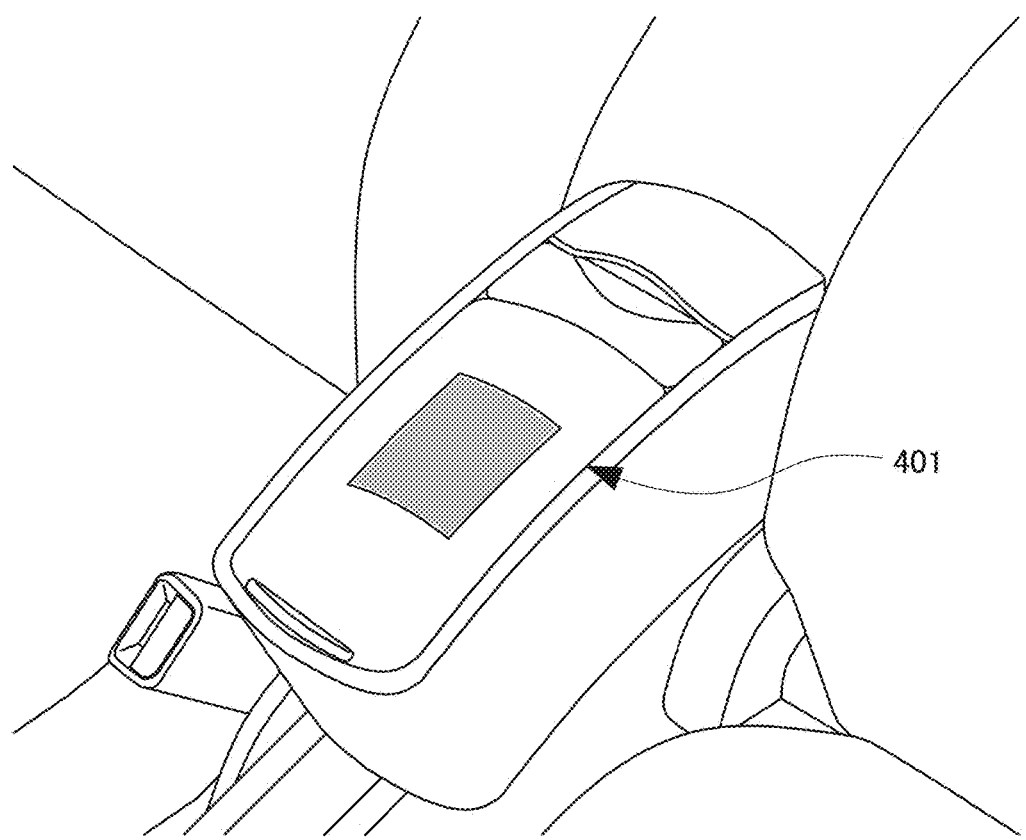
FIG. 16 is a perspective view showing a seventh application example regarding the vehicle decorative component.

Further, as shown in FIG. 16, a light emitting component 401 can also be utilized as a decorative component of a console box provided between the seats (a gray-colored part in FIG. 16 corresponds to the light emitting region 1a). For example, when the light emitting ornament 401 in which the touch panel 72 serving as the information display screen described above is formed is installed on an upper surface of the console box, the passenger seated next to the console box can watch images and moving images displayed on the touch panel 72 or see advertisement or information such as news displayed on the touch panel 72. The direction of operating the above touch panel 72 by the passenger for switching the information to be displayed (that is, the direction of moving the finger as a flicking operation) is favorably along the front to back direction or the width direction of the vehicle.

The positions of the light emitting ornaments shown in FIGS. 11 to 16 are not limited to the gray-colored parts in the figures but only one example.

TABLE OF REFERENCE CHARACTERS

1 light emitting ornament
1a light emitting region
1b non-light emitting region
R vehicle door lining
2 pocket rim
3 door armrest
4 lower base
4a, 4c boss hole
4b, 4d fitting hole
5 pull handle
10 ornament unit
10a light emittable region
11 ornament base material
12 decorative film
12a pattern layer
12b blocking layer
12c transmissive portion
12d blocking portion
12e adhesive layer
13 boss
14 engagement projection
15 rib
16 claw portion
16a hook shaped portion
16b surrounding portion
30 light source unit
31 lamp
31a jack
31b connector
32 light guiding body
32a light emission surface
33 holder
34 engagement hole forming portion
34a engagement hole
35 boss
36 engagement projection
41 light emitting ornament
42 door lining main body
42a step portion
43 accommodation case
43a bottom wall
44 screw
45 protruding claw
50 ornament unit
50a light emittable region
50b non-light emitting region
50c step portion
60 light source unit
61 lamp
62 light guiding body
62a light emission surface
62b protruding portion
62c convex portion
62d prism portion
62e upper side projection
62f lower side projection
63 holder
64 light guiding body holding portion
64a frame wall
64b cutout
64c positioning hole
64d engagement claw portion
64e bottom wall
64f engagement convex portion
64g enclosing portion
64h height adjustment convex portion
64i abutment rib
65 lamp holding portion
71 light emitting ornament
71a light emitting region
71b non-light emitting region
72 touch panel
73 lock cancellation button H harness
101, 102, light emitting ornament
103, 104,
201, 301,
302, 303,
401
S1 seat of driver seat
S2 seat of front passenger seat
F roof
FP roof pillar
B dashboard

The invention claimed is:

1. A vehicle decorative component installed on an indoor side of a vehicle, the vehicle decorative component comprising:
   a light emitting region that emits light, wherein the light emitting region comprises:
      an irradiation body that irradiates the light toward a front side of the light emitting region;
      a transmissive body through which the light emitted from the irradiation body is transmitted at a front position of the irradiation body; and
      a decorative layer provided at a front position of the transmissive body in a state where a surface is exposed; and
   wherein:
      a decoration style of the exposed surface of the decorative layer is a same style as a decoration style of a surface of a non-light emitting region adjacent to the light emitting region;
      the decorative layer is a decorative film attached to the transmissive body;
      the decorative film has a transmissive portion through which the light transmitted through the transmissive body is transmitted, a blocking portion by which the light transmitted through the transmissive body is blocked, and a pattern layer which is translucent;
      the transmissive portion and the blocking portion are provided in a part of the decorative film that faces the transmissive body; and
      the pattern layer is a part exposed on the indoor side of the decorate film and is overlapped on both the transmissive portion and the blocking portion to cover both the transmissive portion and the blocking portion;
      the irradiation body has a light source, and a light guiding body including a light emission surface that emits the light from the light source;
      the light source and the light guiding body are integrated as a light source unit;
      the non-light emitting region is adjacent to the light emitting region;
      the transmissive body, the decorative layer, and the non-light emitting region are integrated as a decorative unit;
      the light source unit is arranged at a position sandwiched between a base member to which the vehicle decorative component is attached and the decorative unit;
      the decorative unit comprises a rib that extends from an opposing surface of the decorative unit to the base member and that has an annular shape;
      an inner side of the rib surrounds the light source unit along an outer peripheral edge of the light source unit when the light source unit is assembled to the decorative unit; and
      the light guiding body and the transmissive body are disposed separated from each other at a predetermined distance by the rib between the light guiding body and the transmissive body.

2. The vehicle decorative component according to claim 1, wherein:
   the vehicle decorative component is installed on an indoor side of the vehicle;
   on a back surface of the decorative film positioned opposite of the exposed surface on the indoor side, a part corresponding to the transmissive portion is transparent, and a part corresponding to the blocking portion is a color-painted part.

3. The vehicle decorative component according to claim 1, wherein the transmissive body is formed as a resin molded item containing a diffusion material.

4. The vehicle decorative component according to claim 1 wherein at least a part of the rib that surrounds the light source unit when the light source unit is assembled to the decorative unit extends from a part of the opposing surface of the decorative unit to the base member, the part where the non-light emitting region is placed.

5. The vehicle decorative component according to claim 1, wherein the light source unit has a light source unit side fixing portion formed on a surface of the light guiding body on the opposite side of the light emission surface, and is fixed to the base member by fastening the light source unit side fixing portion and the base member.

6. The vehicle decorative component according to claim 1, wherein:
   the decorative unit has a fixing portion that fixes the light source unit;
   the light source unit has an engaged portion with which the fixing portion is engageable; and
   by engaging the fixing portion with the engaged portion, the light source unit is assembled to the decorative unit.

7. The vehicle decorative component according to claim 1, wherein the decorative unit has a decorative unit side fixing portion extending from an opposing surface of the non-light emitting region to the base member, and is fixed to the base member by fastening the decorative unit side fixing portion and the base member.

8. The vehicle decorative component according to claim 1, wherein:
   the light guiding body is an elongated light guiding plate;
   the longitudinal direction of the light guiding plate is along the front to back direction of the vehicle in a state where the vehicle decorative component is installed in the vehicle; and
   a power input portion of the light source is attached to a side of an end placed on the front side in the front to back direction of the vehicle among both ends in the longitudinal direction of the light guiding plate.

9. The vehicle decorative component according to claim 1, wherein:
   an information display screen that displays at least one information among still image information, moving image information, and text information is formed in the light emitting region;
   the at least one information is displayed on the information display screen when the irradiation body irradiates the light; and
   the information to be displayed on the information display screen is switched by a switching operation performed by a passenger of the vehicle.

10. The vehicle decorative component according to claim 1, wherein:

the irradiation body comprises:
  a light source;
  a light guiding body including a light emission surface that emits the light from the light source; and
  a holder that holds the light source and the light guiding body; and
  the holder comprises: a claw portion to be hooked onto a locking surface provided in an outer edge of the light guiding body on a same side as the light emission surface; and
  an abutment portion to be abutted with a surface of the light guiding body provided on the opposite side of the light emission surface in a state where the claw portion is hooked onto the locking surface.

11. The vehicle decorative component according to claim 10, wherein the holder further has an enclosing portion that encloses the claw portion in order to suppress leakage of the light from the claw portion.

12. The vehicle decorative component according to claim 1, wherein:
  the irradiation body comprises a light source, and a light guiding body that emits the light from the light source;
  the light source and the light guiding body are arranged at positions adjacent to each other; and
  a protruding portion protruding toward the light source is formed in an end of the light guiding body on the side adjacent to the light source.

13. The vehicle decorative component according to claim 12, wherein:
  the irradiation body further comprises a holder that holds the light source and the light guiding body;
  the holder comprises a positioning hole formed in order to position the light guiding body; and
  the light guiding body comprises a convex portion protruding in the direction crossing the protruding direction of the protruding portion in the end on the side adjacent to the light source, and is positioned with respect to the holder by fitting the convex portion into the positioning hole.

14. The vehicle decorative component according to claim 1, wherein:
  the irradiation body comprises:
    a light source;
    an injection-molded light guiding body including a light emission surface that emits the light from the light source; and
    a holder that holds the light source and the injection-molded light guiding body;
    wherein: the holder comprises an engagement projection to be engaged with an outer edge of the injection-molded light guiding body at a time of assembling the injection-molded light guiding body to the holder; and
    a part of the outer edge with which the engagement projection is engaged is a part onto which a push-out pin is pressed at a time of taking out the injection-molded light guiding body from a mold.

15. The vehicle decorative component according to claim 1, wherein:
  the vehicle decorative component is installed in a region in a part of a door of the vehicle facing an indoor side of the vehicle, the region excluding:
    a region where a side impact pad is arranged between an inner panel of the door and a lower base;
    a region where a speaker is arranged between the inner panel and the lower base;
    a region where a pull handle of the door is arranged;
    a region where a switch panel embedded in a door lining of the door is arranged; and
    a region where a pocket portion is formed in the door.

* * * * *